(12) United States Patent
Yamamoto et al.

(10) Patent No.: US 7,676,512 B2
(45) Date of Patent: Mar. 9, 2010

(54) DOCUMENT MANAGEMENT SERVER, INFORMATION TERMINAL APPARATUS, IMAGE FORMING APPARATUS, DOCUMENT MANAGING METHOD, AND PROGRAM

(75) Inventors: Hiroshi Yamamoto, Saitama (JP); Michihiro Yoshida, Kanagawa (JP); Hiroyoshi Kuroda, Kanagawa (JP); Minoru Sakai, Kanagawa (JP); Takashi Nakashima, Tokyo (JP); Hiroyoshi Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 552 days.

(21) Appl. No.: 11/443,551

(22) Filed: May 31, 2006

(65) Prior Publication Data

US 2006/0274367 A1 Dec. 7, 2006

(30) Foreign Application Priority Data

| May 31, 2005 | (JP) | ............................. 2005-160765 |
| May 31, 2005 | (JP) | ............................. 2005-160766 |
| May 31, 2005 | (JP) | ............................. 2005-160767 |
| May 31, 2005 | (JP) | ............................. 2005-160771 |
| May 31, 2005 | (JP) | ............................. 2005-160772 |

(51) Int. Cl.
*G06F 7/00* (2006.01)
*G06F 17/30* (2006.01)
*G06F 17/00* (2006.01)
*G06F 3/00* (2006.01)
*G06F 9/44* (2006.01)
*G06F 9/46* (2006.01)
*G06F 13/00* (2006.01)

(52) U.S. Cl. ...................... 707/608; 707/784; 715/200; 719/318; 358/1.15

(58) Field of Classification Search ................... 707/9, 707/104.1, 102, 1, 200; 715/200; 358/1.15, 358/1.5; 719/318
See application file for complete search history.

(56) References Cited

U.S. PATENT DOCUMENTS

2002/0019827 A1* 2/2002 Shiman et al. .............. 707/200
2003/0046639 A1* 3/2003 Fai et al. ..................... 715/513
2004/0039779 A1* 2/2004 Amstrong et al. ........... 709/204

FOREIGN PATENT DOCUMENTS

JP      2004-171571      6/2004

* cited by examiner

*Primary Examiner*—James Trujillo
*Assistant Examiner*—Bruce M Moser
(74) *Attorney, Agent, or Firm*—Morrison & Foerster LLP

(57) ABSTRACT

When a certain file is updated, a document management server determines whether a "registration state information mail" is set for that file, and after that, performs "self information mail" setting processing. Computer requests the document management server to transmit an electronic file, and prints and displays the electronic file according to an operation definition corresponding to the file format of the received electronic file. MFP inquires whether the document to be displayed is an electronic file stored in the document management server or an electronic file recorded on an external storage medium. Further, in response to an operation of a touch panel, MFP changes a magnifying power of display data, and rotates an image to change the direction by setting the central position of the rotation to a display center of an image being currently displayed.

10 Claims, 36 Drawing Sheets

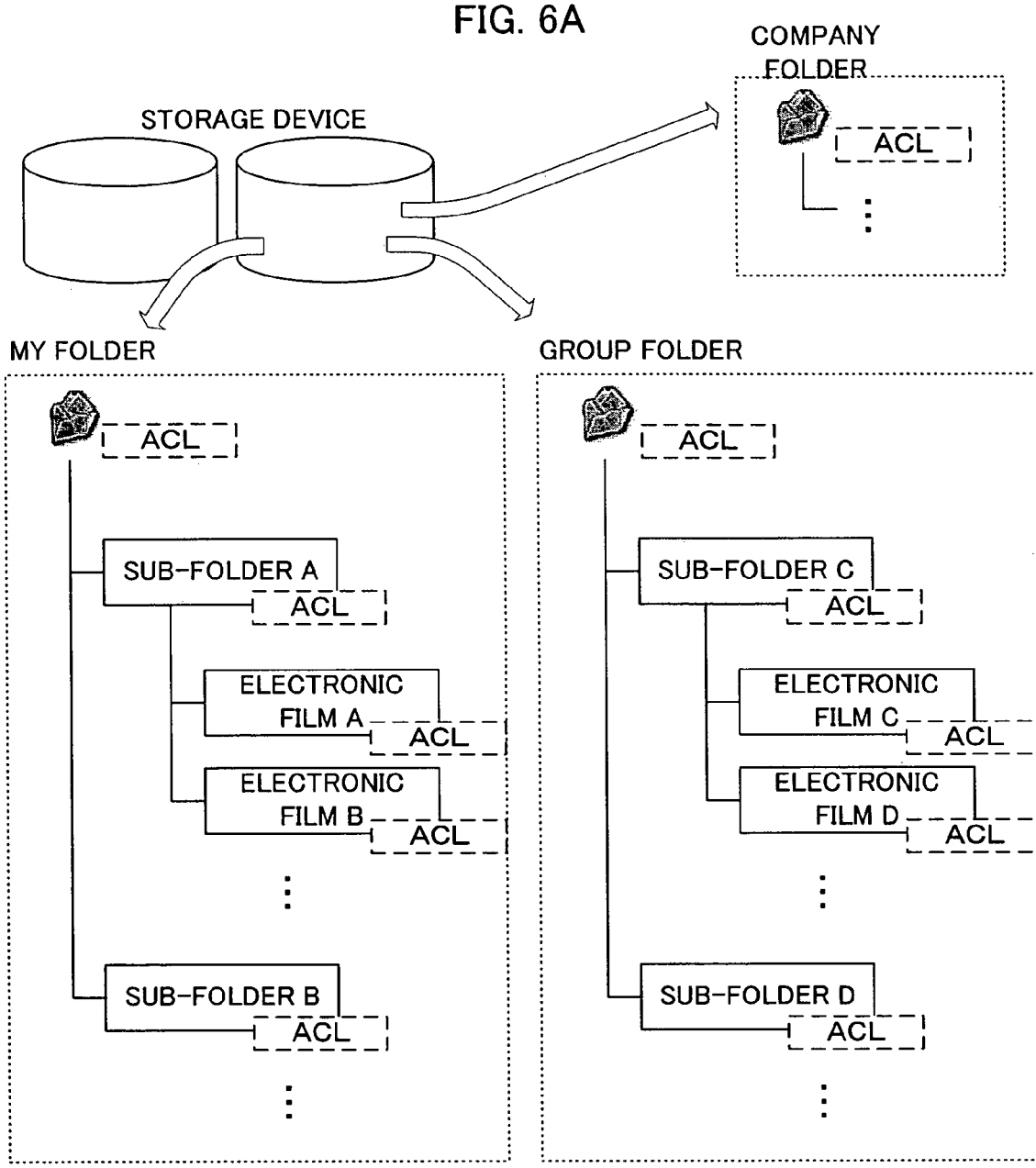

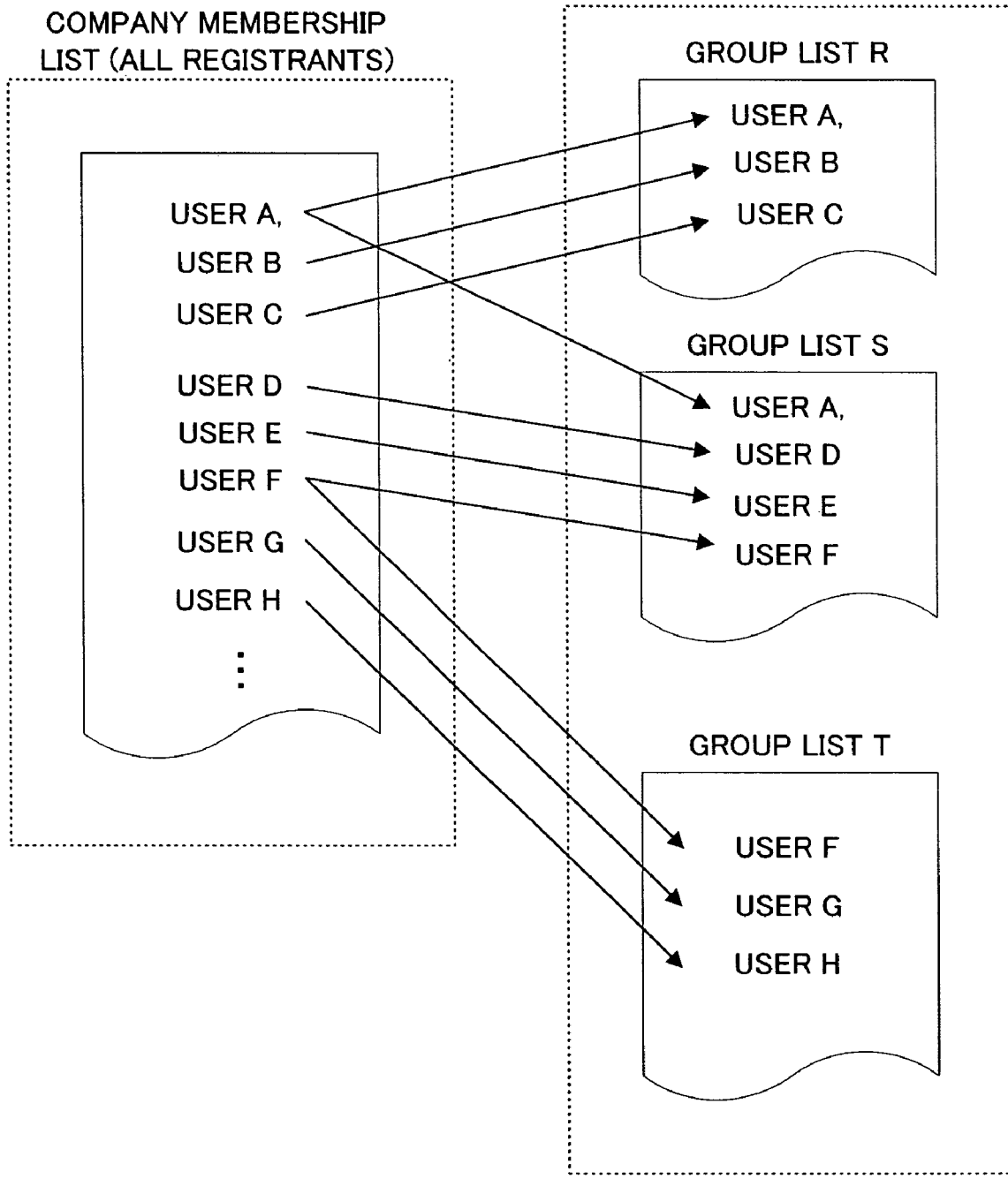

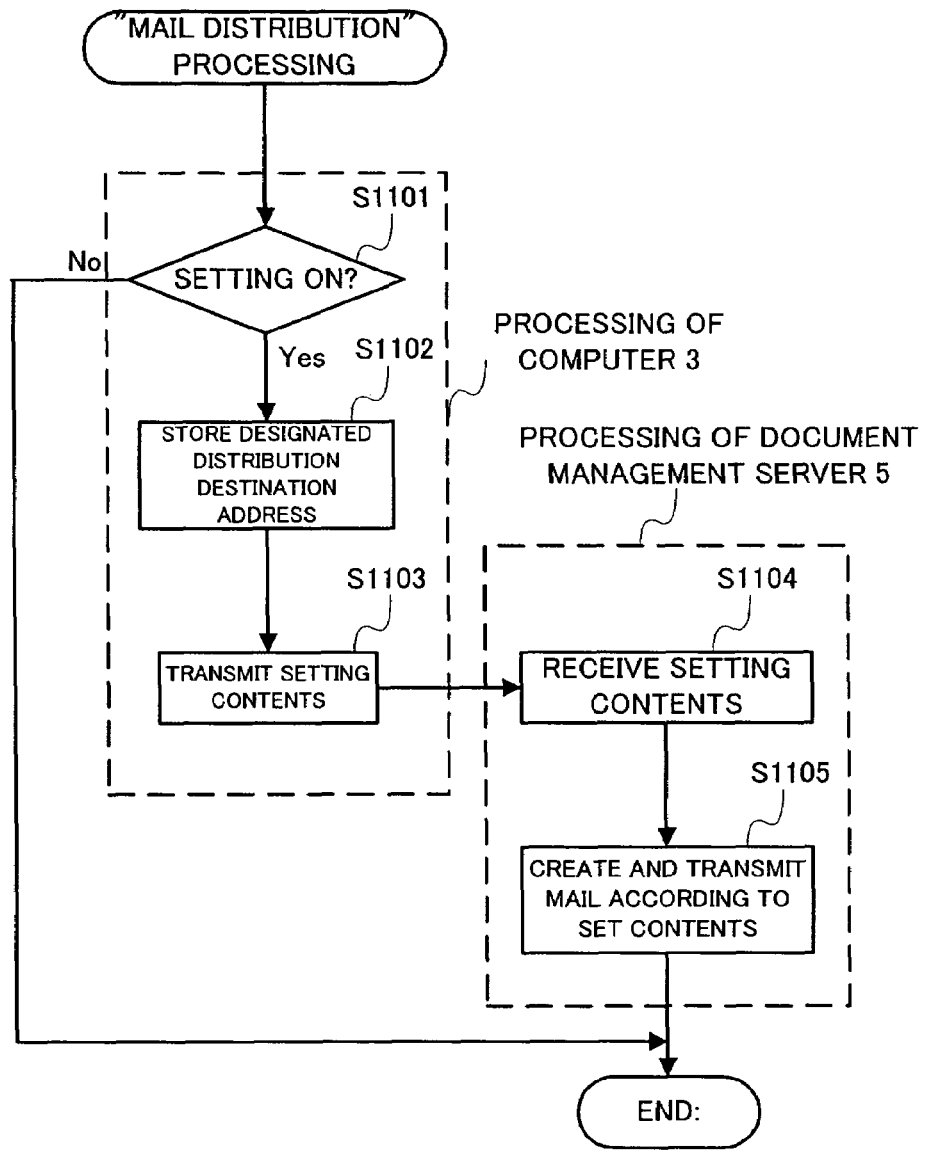

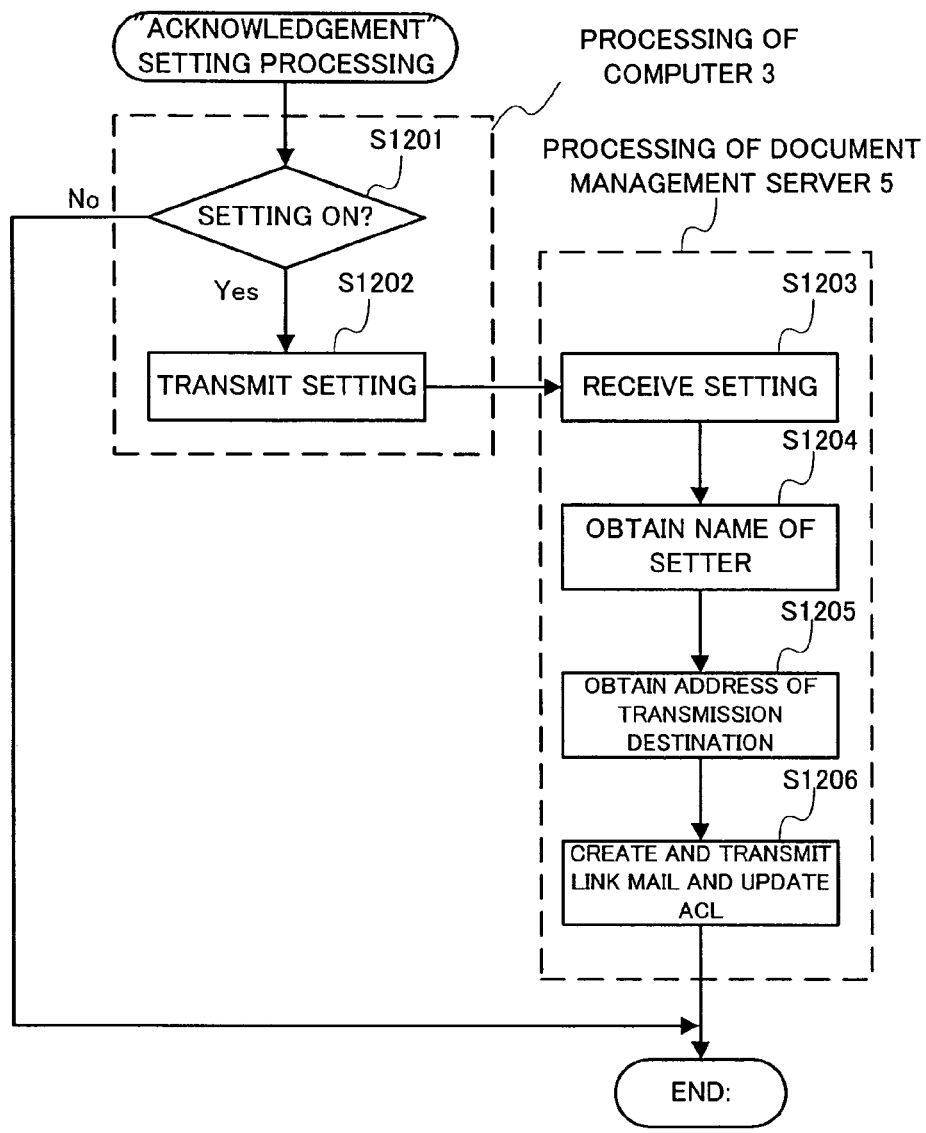

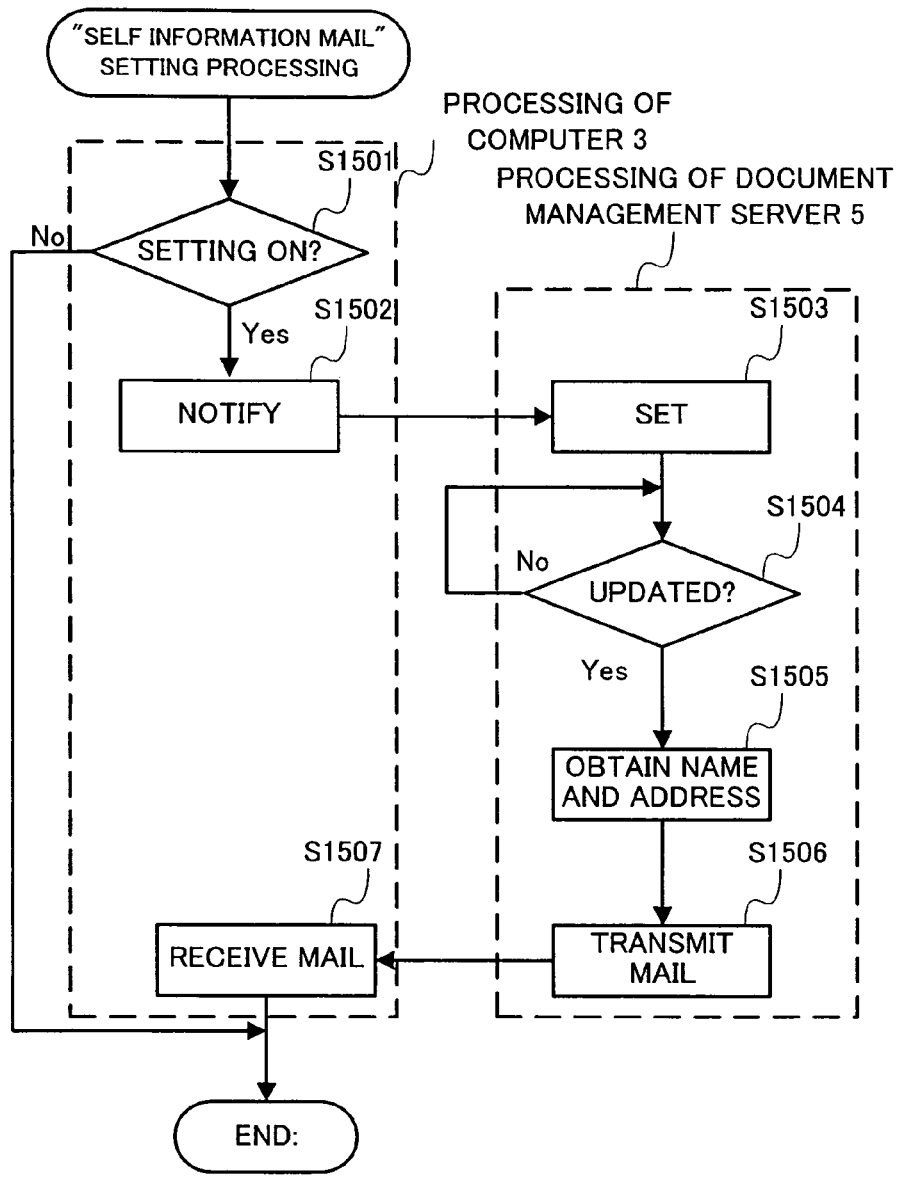

FIG. 15A  Touch Here

FIG. 15B

| DOCUMENT MANAGEMENT | SCANNER |
|---|---|
| COPY | PRINTER |
| FAX | |

FIG. 15C

| REGISTER | REFERENCE |
|---|---|
| PRINT | EXTRACT |
| DELETE | |

FIG. 15D

| ID | |
|---|---|
| PASSWORD | |

FIG. 15E

BY WHICH WAY DO YOU REGISTER?

| SCANNER | STORAGE MEDIA |

FIG. 15F

BY WHICH WAY DO YOU REGISTER?

| DOCUMENT MANAGEMENT SERVER | STORAGE MEDIA |

FIG. 15G

OPTION SETTING
DO YOU SHARE REGISTERED FILE?

| YES | NO |

FIG. 15H

OPTION SETTING
DO YOU CARRY OUT FILE HISTORY MANAGEMENT?

| YES | NO |

FIG. 15I

OPTION SETTING
DO YOU CARRY OUT MAIL DISTRIBUTION?

| YES | NO |

FIG. 15J

OPTION SETTING
PLEASE INPUT MAIL ADDRESS OF DISTRIBUTION DESTINATION.

| EXTENSION | DEFINITION OF OPERATION CORRESPONDING TO EXTENSION |
|---|---|
| TXT | OPEN FILE BY TEXT EDITOR TO PRINT |
| BMP | OPEN FILE BY IMAGING SOFTWARE TO PRINT |
| JPG | MAKE IT IMPOSSIBLE TO SELECT COLOR DISPLAY AND POSSIBLE TO SELECT ONLY MONOCHROME AND DISPLAY BY IMAGE VIEWER |
| XYZ | OPEN FILE BY SPREADSHEET SOFTWARE TO PRINT ONLY FIRST SHEET |
| (ABSENCE) | NOTIFY ABSENCE OF FILE |
| ⋮ | ⋮ |

| EXTENSION | DEFINITION OF OPERATION CORRESPONDING TO EXTENSION |
|---|---|
| XYZ | OPEN FILE BY SPREADSHEET SOFTWARE TO DISPLAY ALL PAGES AND PRINT ONLY FIRST SHEET |
| ⋮ | ⋮ |

FIG. 36

| EXTENSION | APPLICATION CORRESPONDING TO EXTENSION |
|---|---|
| TXT | TEXT EDITOR |
| BMP | IMAGING SOFTWARE |
| JPG | IMAGE VIEWER |
| XYZ | SPREADSHEET SOFTWARE |
| ⋮ | ⋮ |

DOCUMENT MANAGEMENT SERVER, INFORMATION TERMINAL APPARATUS, IMAGE FORMING APPARATUS, DOCUMENT MANAGING METHOD, AND PROGRAM

BACKGROUND OF THE INVENTION

1. Field of the Invention

The present invention relates to a document management server, information terminal apparatus, image forming apparatus, document managing method, and program.

2. Description of the Related Art

In recent years, document management servers for collectively managing documents stored in various devices have been proposed and put to practical use.

For example, Unexamined Japanese Patent Application KOKAI Publication No. 2004-171571 discloses a document management system having a configuration in which an application apparatus such as an image processing apparatus (for example, MFP (Multi-Function Peripheral)) and a document management server are connected to each other via a network. According to this document management system, a user can operate the MFP and manage (refer to, display, print, register, delete) documents within authorization given to the MFP.

By the way, the document management system disclosed in Unexamined Japanese Patent Application KOKAI Publication No. 2004-171571 allows multiple users to use managed documents. Accordingly, there is a case in which a certain user, who can use a document, changes the contents of the document. In such a case, it is preferable that other users, who can use this document, be informed of the change in the contents by mail.

Moreover, there is a case in which there is a document in which one user has a particularly interesting among the managed documents. In the case where the other user gains access to such the document, one sometimes desires to be informed of this fact by mail. However, in such the case, when mail is sent to the certain user, multiple mails are resultantly transmitted to the user to cause a problem in notification of the document management cannot be appropriately transmitted.

Furthermore, for example, it is assumed that the user desires to print a document in a predetermined print format using certain software from a client apparatus. The user first searches a target document. Then, when the user starts the software corresponding to the file format to perform reading and further carry out printing using the software, the user inputs setting items (for example, the number of colors, font, paper size, etc.), and performs printing. However, in the case where the number of printing electronic files is large or kinds of setting items are decided, it is extremely troublesome for the user to perform a series of these operations. Moreover, when the electronic file created in a predetermined file format is printed, it is difficult to limit the items whose setting can be set by the user to correspond to the file format. It is also difficult for the user to automatically perform a desired operation.

Furthermore, when the client apparatus is MFP, the document can be printed but cannot be referenced (displayed). In other words, the conventional MFP can input identification information of the document from an operation panel, read the document from the document management server, and print the document. However, the contents of the document themselves cannot be displayed on a screen (operation screen) which the MFP includes.

Accordingly, unless a file name of a document to be desirably printed is not memorized before operating the MFP, there occurs a problem in which the document cannot be specified or designated.

SUMMARY OF THE INVENTION

In view of the aforementioned circumstances, an object of the present invention is to provide a document management server capable of appropriately performing operations of document management, document managing method, information terminal apparatus, image forming apparatus, and program.

In order to attain the above object, a document management server according to a first aspect of the present invention stores a plurality of files. The document management server includes a user information storage section that stores user information of a user, who can operate a file; a first setting section that sets a notification of a file to be sent to a user excepting users, who operate the file, among users stored in the user information storage section when the file is operated; a second setting section that sets a notification to be sent to a user when a predetermined file is operated by user setting; and a transmitting section that transmits notification information, which indicates that a predetermined file is operated, to the users set by the first and second setting sections based on the first and second setting sections when the predetermined file is operated. When the same user exists in users set by the first setting section and users set by the second setting section, the transmitting section may transmit notification information of either of users to the user.

Moreover, the notification information may have the same contents.

The user information storage section may include an address list storage section that stores a basic address list and an edit address list that is edited to an address of a user who has a predetermined relationship with the user from an address of the basic address list. The document management server may further includes a receiving section that receives address acquisition request information for requesting acquisition of an address and model information of an information terminal from the information terminal connected via a network by user; and a deciding section that decides an address list to be transmitted to the information terminal from the address list stored in the address list storage section based on the received model information when the receiving section receives the address acquisition request information and the model information. The transmitting section may transmit the address list decided by the deciding section to the information terminal.

Moreover, the deciding section may decide whether an address list to be transmitted to the information terminal should be the basic address list and the edit address list or the edit address list.

Furthermore, the document management server may further include an address list setting section that sets an address list to be transmitted to the information terminal. The deciding section may decide an address list to be transmitted to the information terminal from the address list stored in the address list storage section based on the model information received by the receiving section and the address setting section.

Moreover, the receiving section may receive a transmitting file and user information for specifying a sender of the file. The transmitting section may further include a transmission success or failure determining section that determines whether transmission of the file succeeds and transmits a message, which indicates success or failure of file transmission determined by the transmission success or failure determining section, to the address of the sender specified by the user identification information.

Furthermore, the user information storage section may store multiple user identification information and notification addresses to be associated with each other. The transmitting section may obtain a notification address corresponding to the user identification information stored in the user information storage section and transmit the message, which indicates success or failure of file transmission determined by the transmission success or failure determining section, to the obtained notification address.

Moreover, the receiving section may receive address information of a distribution destination. The document management server may further include a determining section that determines whether the address information of the distribution destination is a predetermined user; and a creating section that creates a mail with link information that allows the specified file to be viewed when the determining section determines that the address information of the distribution destination is a predetermined user, and creates a mail to which the specified file is attached when the determining section determines that the address information of the distribution destination is a non-predetermined user.

Furthermore, the creating section may include an acknowledgement information generating section that generates acknowledgement information for receiving a notification of completion of reception of the file. The transmitting section may further include an acknowledgment transmitting section that transmits the file, the acknowledgement information generated by the acknowledgement information generating section, and the mail created by the mail creating section to the notification address. The receiving section may receive the acknowledgement information that notifies completion of reception of the file. The acknowledgement transmitting section may transmit a message, which indicates that the file is received at the transmission destination, to the notification address of a user who transmits the acknowledgement information.

In order to attain the above object, an information terminal apparatus according to a second aspect of the present invention includes a file selection section that requests a file selected from files stored in a document management server to be transmitted; a file receiving section that receives the file requested by the file selection section; a file determining section that extracts information for identifying the file from the file to determine a file format of the file when the file receiving section receives the file; an operation definition section that prestores information indicating execution of predetermined processing to be associated with the file format of the file determined by the file determining section; an operation execution section that executes the predetermined processing defined by the operation definition section; an operation instruction section that instructs the operation execution section to execute a predetermined operation based on the file format of the file determined by the file determining section and information stored in the operation definition section; and an operation execution data output section that outputs data containing all or partial input data of the file.

Moreover, information for identifying the file extracted by the file determining section may be a filename extension portion of the file. The file determining section may determine a file format of the file based on the extension portion.

Furthermore, the operation execution section may extract or process all or partial data contained in the file to generate print data, and print the file based on the file format of the file determined by the file determining section.

Moreover, the information terminal apparatus may further include a print setting section that sets a print setting for which a file print section performs printing by a user. The operation execution section may decide items of the print setting that the print setting section can set based on the file format of the file determined by the file determining section.

Furthermore, the operation execution data output section may include a file print section that prints data containing all or partial input data, and an output section that outputs data containing all or partial input data in the form of image and voice.

In order to attain the above object, an image forming apparatus according to a third aspect of the present invention includes a display panel; a display instruction section that instructs file contents to be displayed on the display panel; a display control section that displays the file contents on the display panel in response to an instruction from the display instruction section; a print section; a print instruction section that instructs the file contents to be printed; and a print control section that instructs the print section to print the file contents in response to an instruction from the print instruction section wherein the display instruction section and the print, instruction section are selectable.

Moreover, the display panel may include a touch panel display device. The display instruction section and the print instruction section may include a display section that displays instruction input selection items to designate display and print, and a section that detects an operator's operation to the touch panel display device.

Furthermore, the display panel may include a dot matrix display deice. The display control section may display a thumbnail image of a designated document.

Moreover, the display control section may display contents of the designated document in a window of the display panel, and change any of a position, a direction, and a size of a window on the document according to an instruction in response to an external operation.

Furthermore, the image forming apparatus may further include an interface to which an external storage media is detachably attached; a communications section connected to a server apparatus that stores a file via communications; and a file selection section that selects either one of a file stored on the storage media connected to the interface and a file connected to the communications section via communications as a display target by the display section or a print target by the print section.

Moreover, the image forming apparatus may further include a determining section that determines whether the file selected by the file selection section has a file format serving as the display target by the display section. The display control section may perform a predetermined error display on the display panel without reading the file when the determining section determines that the file has no file format serving as the display target by the display section.

A document managing method according to a fourth aspect of the present invention includes a user information storing step of storing user information of a user, who can operate a file; a first setting step of setting a notification of a file to be sent to a user excepting users, who operate the file, among users stored in the user information storage section when the file is operated; a second setting step of setting a notification to be sent to a user when a predetermined file is operated by user setting; and a transmitting step of transmitting notification information, which indicates that a predetermined file is operated, to the users set by the first and second setting steps based on the first and second setting steps when the predetermined file is operated. When the same user exists in users set by the first setting step and users set by the second setting step, the transmitting step transmits notification information of either of users to the user.

A program according to a fifth aspect of the present invention causes a computer to function as a user information storage section that stores user information of a user, who can operate a file; a first setting section that sets a notification of a file to be sent to a user excepting users, who operate the file, among users stored in the user information storage section when the file is operated; a second setting section that sets a notification to be sent to a user when a predetermined file is operated by user setting; and a transmitting section that transmits notification information, which indicates that a predetermined file is operated, to the users set by the first and second setting sections based on the first and second setting sections when the predetermined file is operated. When the same user exists in users set by the first setting section and users set by the second setting section, the transmitting section transmits notification information of either of users to the user.

According to the present invention, it is possible to appropriately perform operations of document management.

BRIEF DESCRIPTION OF THE DRAWINGS

These objects and other objects and advantages of the present invention will become more apparent upon reading of the following detailed description and the accompanying drawings in which:

FIG. 6A is a view explaining functions of a contents manager;

FIG. 6B is a view illustrating an example of information that an access control list stores;

FIG. 7 is a view explaining functions of a membership list manager;

FIG. 9A is a flowchart explaining "mail distribution" setting processing;

FIG. 9B is a view illustrating a specific example of a mail distributed in the "mail distribution" setting processing;

FIG. 10A is a flowchart explaining "acknowledgment" setting processing;

FIG. 10B is a view illustrating a specific example of a mail distributed in the "acknowledgement" setting processing;

FIG. 13A is a flowchart explaining "self information mail" setting processing;

FIG. 13B is a view illustrating a specific example of a mail distributed in the "self information mail" setting processing;

FIG. 15A is a view illustrating an example of a service start screen output to a display device connected to the MFP or computer;

FIG. 15B is a view illustrating an example of a function selection screen output to the display device connected to the MFP or computer;

FIG. 15C is a view illustrating an example of a specific function corresponding to a button selected on the screen of FIG. 15B;

FIG. 15D is a view illustrating an example of a login and password input screen output to the display device connected to the MFP or computer;

FIG. 15E is a view illustrating an example of a screen for selecting a document to be registered;

FIG. 15F is a view illustrating an example of a screen for selecting a registration destination of the document selected in FIG. 15E;

FIG. 15G is a view illustrating an example of a screen for selecting whether or not the document registered in FIG. 15E should be shared;

FIG. 15H is a view illustrating an example of a screen for selecting whether or not history management of the document registered in FIG. 15E should be carried out;

FIG. 15I is a view illustrating an example of a screen for selecting whether or not mail distribution should be carried out when the document registered in FIG. 15E is referred to, etc.;

FIG. 15J is a view showing an example of a screen for inputting an address for distributing the registered document via e-mail to a user other than company members;

FIG. 32 is a view illustrating an example of information indicating operation definitions that an operation definition section stores;

FIG. 34 is a view illustrating an example of information indicating operation definitions that the operation definition section stores;

FIG. 36 is a view illustrating a relationship between each extension and each application.

DETAILED DESCRIPTION OF THE PREFERRED EMBODIMENT

Figure 1:
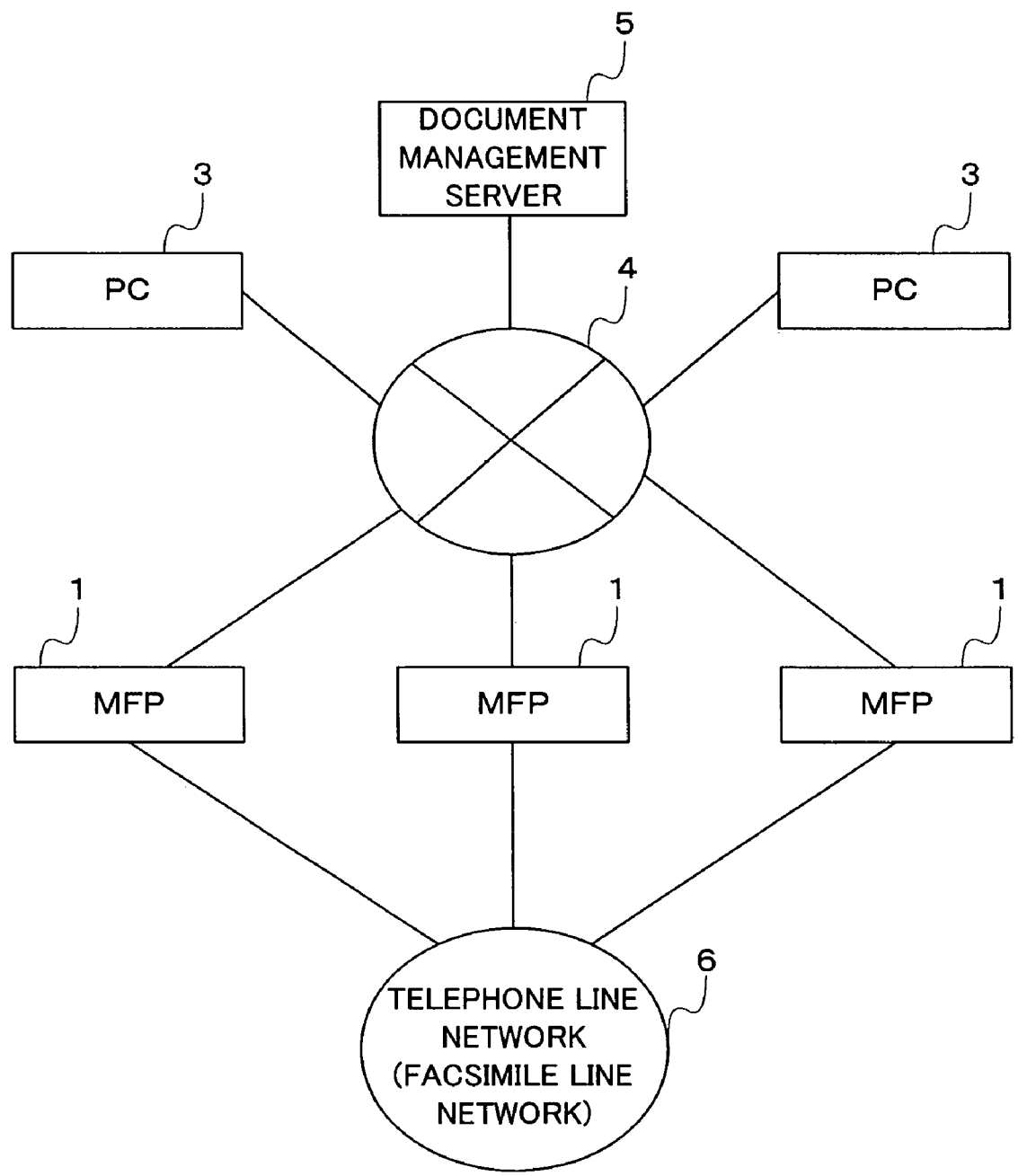
FIG. 1 is a view explaining an outline of a document management system.

The following will explain a document management system according to an embodiment of the present invention using FIG. 1. It is noted that an information terminal according to the present invention is configured in the form of a Multi Function Peripheral <MFP> (for example, device having printing, copy, facsimile and other communication functions). Accordingly, in the following explanation, the information terminal according to the present invention is expressed as MFP 1.

A document management system shown in FIG. 1 is a system that provides various services to be described later to members, who are registered in the system in advance (hereinafter referred to as a membership organization), and employees, who belong to the membership organization (hereinafter referred to as members). The system includes MFPs 1, computers 3, a network 4, a document management server 5, and a telephone network 6. ① The membership organization can provide opportunities (e.g., reference, registration, cancellation, printing, etc.) for operating documents stored in the document management server 5 to the members via the network 4 by the method of this system to be described later. ② A manager of the membership organization can grasp a document utilization state of each member. ③ A service provider of the document management system can check the utilization state of the respective members and charge the membership organization for the service fee.

The MFP 1 shown in FIG. 1 is a Multi-Function Peripheral having multiple functions including a printer unit, a scan unit, etc. However, a scanner, a copy machine, a printer, a facsimile machine may be used single or in combination. Moreover, the MFP 1 includes a display section that can display various kinds of information for operating the respective functions (e.g., reference, printing, registration, cancellation, and the like) to be described later. In the present embodiment, a touch-panel display is used. Further, the MFP 1 includes a device that can attach an external storage media and has a media slot, which enables data delivery between the external storage media and the MFP 1. CD (Compact Disk) media such as USB memory, memory card, CD-ROM, and DVD (Digital Versatile Disk) such as DVD-ROM can be read through the present media slot.

Furthermore, an application for "referencing" or "printing" a file downloaded from the document management server 5 is installed into the MFP 1. Then, the application reads the downloaded file and generates data for displaying. Moreover, the MFP 1 is equipped with an image processor that converts display data into second display data, which is suited for the display section of the MFP 1, and displays the resultant data on the display section.

In addition, the MFP 1 may be set up at a place where one has gone such as satellite office, convenience store, post office, and the like, in addition to the main office. The point is that the MFP 1 may be connected to the document management server 5 via the network 4.

Figure 2:
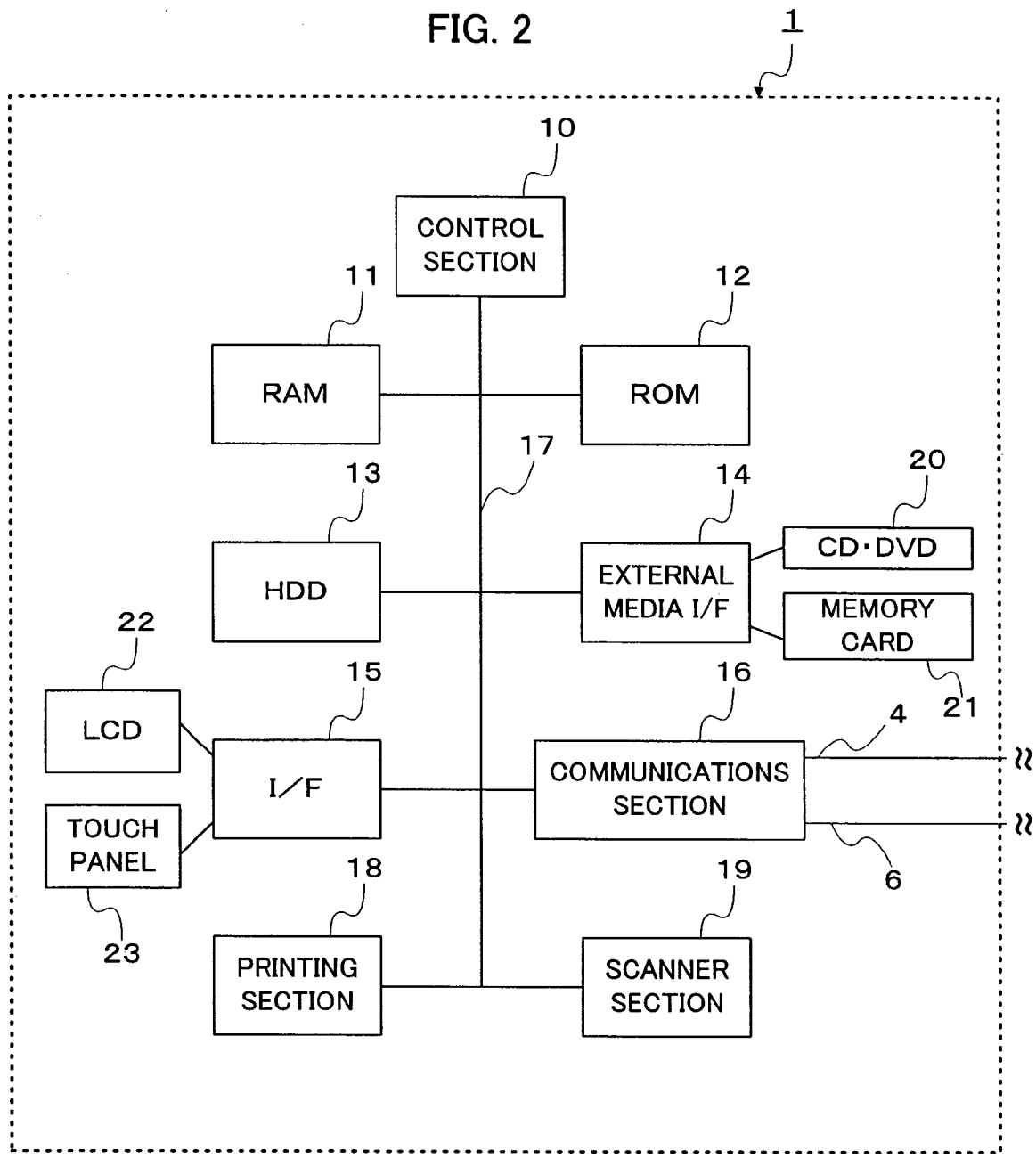
FIG. 2 is a view explaining a configuration of a multi-function peripheral (MFP)

The MFP 1 shown in FIG. 1 includes a control section 10, a RAM (Random Access Memory) 11, a ROM (Read Only Memory) 12, a HDD (Hard Disk Drive) 13, an external media I/F (InterFace) 14, an I/F 15, a communications section 16, a system bus 17, a printing section 18, a scanner section 19, a CD/DVD drive 20, a memory card 21, a LCD (Liquid Crystal Display 22, and a touch panel 23 as shown in FIG. 2.

The control section 10 is composed of a CPU (Central Processing Unit) and the like, and controls an operation of the MFP 1. For example, the control section 10 launches a predetermined application (for example, spreadsheet application, word processing application, etc.) installed in the HDD 13 in advance and executes an operation (referencing, printing, etc.) to the electronic file.

The RAM (Random Access Memory) 11 is a volatile memory that temporarily stores data (for example, data of a document file) necessary for processing to be executed by the control section 10.

The ROM (Read Only Memory) 12 is an involatile memory that stores a program for which the control section 10 controls the entirety of the MFP 1. For example, the ROM 12 stores a program for which the control section 10 controls an operation of transmitting and receiving a predetermined file from and to the document management server 5.

The HDD (Hard Disk Drive) 13 stores data necessary for the control section 10 to perform a predetermined operation. For example, the HDD 13 stores parameters for executing processing for a file format of, e.g., a text file, an image file, etc.

Moreover, the HDD 13 stores a predetermined software application for which the MFP 1 executes various kinds of operations (for example, referencing, and printing) to the electronic file. Then, the control section 10 reads the predetermined software application stored in the HDD 13 and develops the read application in the RAM 11, and executes various kinds of operations to the electronic file using the software application. Additionally, in the present embodiment, although the predetermined software application is stored in the HDD 13, this may be stored in the ROM 12.

The external media I/F 14 is a driver that is used for various kinds of storage media such as CD (Compact Disk) media, DVD (Digital Versatile Disk) media, USB (Universal Serial Bus) memory, memory card, and the like. The control section 10 writes the created file to the external media using the external media I/F 14.

The I/F 15 is an interface between an input device such as the touch panel 23 and the control section 10. A user touches a predetermined location of the touch panel 23 with his/her finger to make it possible to input necessary information to the MFP 1.

The I/F 15 is also an interface between an output device such as LCD (Liquid Crystal Display 22 and the control section 10. The user can recognize the operation state (for example, details on the print setting, details on display setting, error message, etc.) of MFP 1 by viewing an image and a message displayed on the LCD 22. Here, the LCD 22 is a dot-matrix type display device that enables to display arbitrary characters, marks, numerals, and graphics. It is noted that the LCD generally has a middle screen size.

Additionally, the I/F 15 may have an input device such as a keyboard, a mouse, etc.

The communications section 16 is an interface, which is composed of an NIC (Network Interface Card) and a modem, and connects the MFP 1 to the network 4 or telephone network (facsimile network) 6. Then, the communications section 16 performs communication with the network 4 based on TCP/IP protocol or facsimile communication with the telephone network 6. It is noted that the communications section 16 may be, for example, a modem device, an infrared communication device, etc., and the MFP 1 having no facsimile function may not be connected to the telephone network 6.

The system bus 17 is a transmission path through which commands and data are transferred among the control section 10, RAM 11, ROM 12, HDD 13, external media I/F 14, I/F 15, communications section 16, printing section 18, and scanner section 19.

The printing section 18 is a printer device that prints data of the file. The user performs an operation using the input device such as the touch panel 23 to make it possible to print data of a desired file. It is noted that the printing section 18 includes a device having a function of copying paper document, picture, and photograph.

The scanner section 19 is a scanner device that scans the paper document, picture, and photograph and converts them to digital data, and stores the result.

The CD/DVD drive 20 is a device that reads data recorded on the media such as CD and DVD. When the control section 10 detects that the CD or DVD is installed in the CD/DVD drive 20, the CD/DVD drive 20 starts to read the CD or DVD.

The memory card 21 is a portable storage medium that stores edited document data to mail the document data from the MFP 1 on the road. The user places the memory card 21 to the MFP 1 set up at the convenience store or the like and mails the edited document data through a predetermined procedure.

Figure 3:
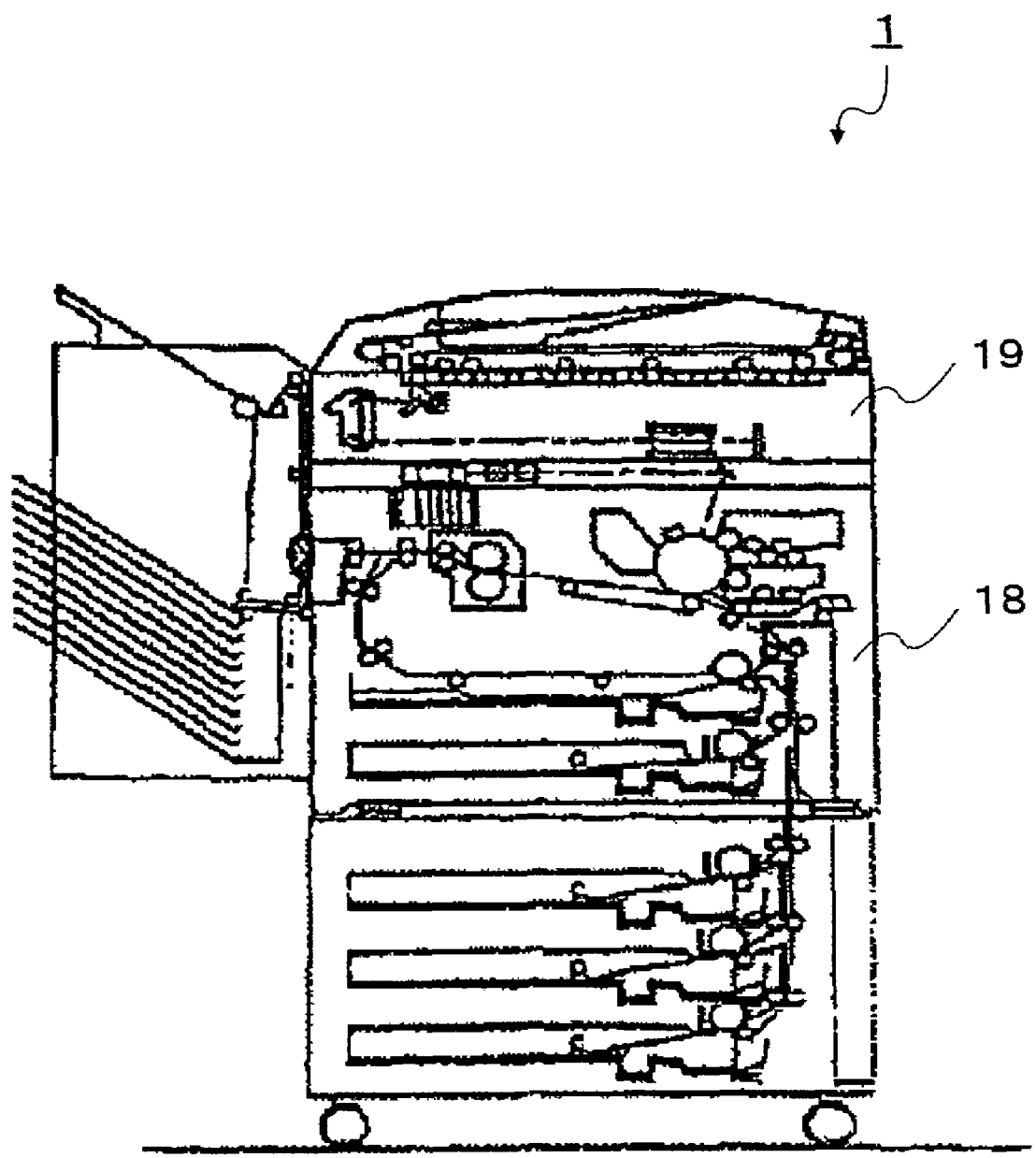
FIG. 3 is a view explaining an external appearance of the multi-function peripheral.

More specifically, as illustrated in FIG. 3, the MFP 1 according to this embodiment includes the printing section 18 with a paper feeding section, a print engine that can performs printing and copying, the scanner section 19 with a scanner function, and the communications section 16, which is not illustrated in the figure.

Each computer 3 illustrated in FIG. 1 is a PC (Personal Computer) for which the member registered in the document management system uses this system on the road. Software for using the document management system is preinstalled in the computer 3.

The network 4 interconnects the MFP 1, computer 3, and document management server 5 and mediates data communication thereamong. In the present embodiment, the network 4 is a network through which data is transmitted based on a communication program such as TCP/IP (Transmission Control Protocol/Internet Protocol). In addition, other protocols may be used. Moreover, either a local area network or a wide area network may be used as the network 4. A communication means such as a Virtual Private Network (VPN) and a wireless connection can be used in the same way.

Figure 5:
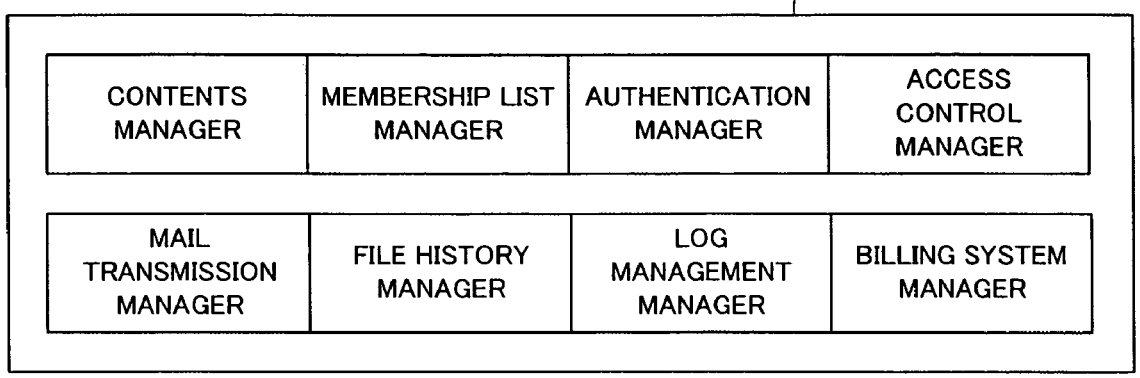
FIG. 5 is a view explaining functions that a document management server has.

The document management server 5 is connected to the MFP 1 and the computer 3 via the network 4, and performs various kinds of document management in response to the request of document operations from the MFP 1 and the computer 3. Moreover, as illustrated in FIG. 5, the document management server 5 includes functions for grasping users, who are called as a contents manager, a membership list manager, an authentication manager, an access control manager, a mail transmission manager, a file history manager, a log management manager, and a billing system manager, and for managing a file edit history, and a system using time. The respective manager functions will be described later.

Figure 4:
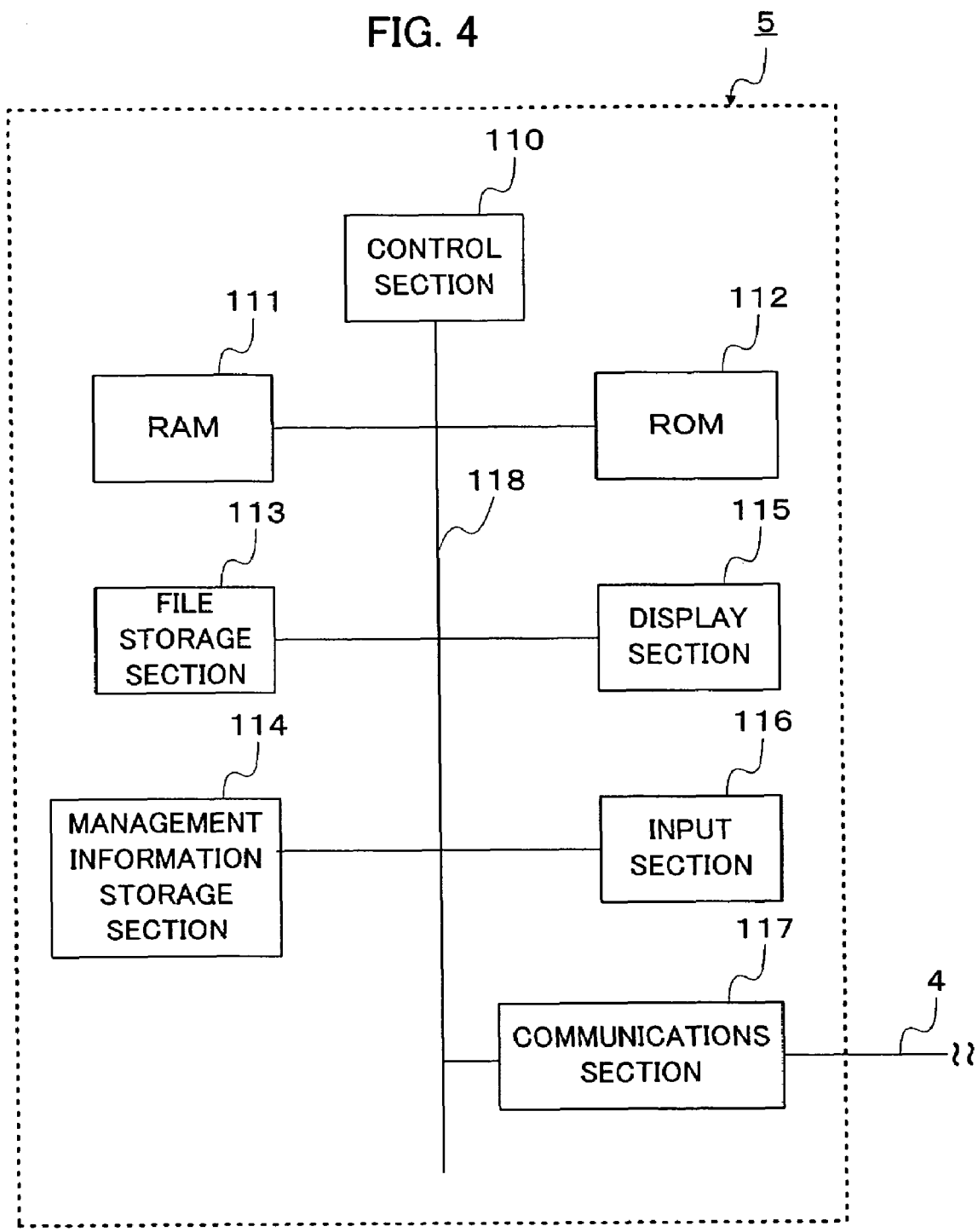
FIG. 4 is a view explaining a configuration of a computer used in the document management system.

The physical configuration of the document management server 5 shown in FIG. 1 is composed of a control section 110, a RAM 111, a ROM 112, a file storage section 113, a management information storage section 114, a display section 115, an input section 116, a communications section 117, and a bus 118 as illustrated in FIG. 4.

The control section 110 includes a CPU (Central Processing Unit) and the like, and controls the entirety of the document management server 5. Particularly, in this embodiment, as illustrated in FIG. 5, the control section 110 operates as each of the functions including the contents manager, the membership list manager, the authentication manager, the access control manager, the mail transmission manager, the file history manager, the log management manager, and the billing system manager. The specific contents of each manager will be described later.

The RAM (Random Access Memory) 111 is a volatile memory that temporarily stores data (for example, data of a document file, and mail) necessary for processing to be executed by the control section 110.

The ROM (Read Only Memory) 112 is an involatile memory that stores a program for which the control section 110 controls the entirety of the document management server 5. In the present embodiment, the ROM 112 stores an operation program for which the control section 110 functions as each of the contents manager, the membership list manager, the authentication manager, the access control manager, the mail transmission manager, the file history manager, the log management manager, and the billing system manager.

The file storage section 113 includes a hard disk device and the like, and stores a document (e.g., document, table, figure that are created by the member of the membership organization) managed by the document management server 5.

The management information storage section 114 includes a hard disk device and the like, and stores information for managing the membership organization and the members who can use the document management server 5. For example, as illustrated in FIG. 8, the management information storage section 114 stores a user ID (member identification information of, e.g., employee number) of each member of the preregistered membership organization, and a password, a name, an affiliated organization, a nickname, a billing address, usage history information, etc. are registered on one or multiple records based on the ID as a key.

Here, the user ID is identification information that specifies a person who uses the document management system. The password is authentication information of the person (who uses the MFP 1 or computer 3). The name is the name of the person who has the user ID. The affiliated organization is information of the organization to which the member belongs, for example, a name of company where the member works and a name of department to which the member belongs. The billing address is information that specifies a party to be charged for member service fee, for example, an accounting department of the company where the member works. A nickname is information, which is inserted to the main body of an e-mail message to make it possible to distinguish a sender of e-mail. Namely, a mail address unique to each of the MFP 1 and the computer 3 is given thereto. Then, when the e-mail is transmitted from each of these devices, each e-mail address of these devices is set in a transmission field of e-mail. However, a recipient cannot specify a sender from a mail sent from the device that an unspecified person uses. Accordingly, in the present embodiment, the document management server 5 inserts the nickname in the main body of a mail to recognize the sender. It is noted that a mail address or the autonym may be used as the nickname. This mail address is an address to which a result (particularly, failure) of transmission of data or the file is notified. A contact address includes a telephone number, a facsimile number, and an individual mail address.

Moreover, the usage history information is the history indicating the number of times and how much hours the user having the ID used the document management system. Billing information is information of service fees of the document management system used by the member.

The display section 115 is an output device such as the LCD (Liquid Crystal Display).

The input section 116 is an input device that inputs a mail address such as a keyboard, a mouse, etc.

The communications section 117 is an interface, which includes an NIC (Network Interface Card) and connects the document management server 5 to the network 4. The communications section 116 may include, for example, a modem device, an infrared communication device, etc.

The system bus 118 is a transmission path through which commands and data are transferred among the control section 110, RAM 111, ROM 112, file storage section 113, the management information storage section 114, the display section 115, the input section 116, and the communications section 117.

An operation will be next given of each manager of the control section 110 shown in FIG. 5.

The contents manager restricts the kinds of files stored in the document management server 5 and the user's access to the folder that stores files.

The contents manager can be connected to one or multiples storage devices (file storage section 113) as illustrated in FIG. 6A. Then, the contents manager can generate multiple folders in the storage device having one file, and can save the multiple files in the folders. Regarding the created folder, the number of folders corresponding to the number of operations may be prepared according to the file operation (the right to generate, update, and view). As mentioned above, the right to access to the folder or file is set, thereby making it possible to set various kinds of notification services such as "acknowledgment", "registration state information mail", and "self information mail" to be described later for each file.

The membership list manager stores the membership organization using the document management system and each member's affiliation to be associated with each other.

Figure 8A:
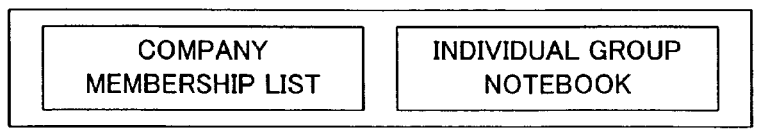
FIG. 8A is a view illustrating an example of information of a membership organization list that the membership list manager stores.

The membership list manager saves information list (hereinafter referred to as membership organization list) such as addresses of all members who belong to the membership organization in the management information storage section 114 as illustrated in FIG. 8A. Also, the membership list manager classifies the members of the membership organization into certain groups (e.g., sales department, planning department, etc.) and saves them. Moreover, the membership list manager saves members registered in the membership group list and an individual and group notebook, which can set the relation with a member belonging to another group, in the management information storage section 114.

Figure 8B:
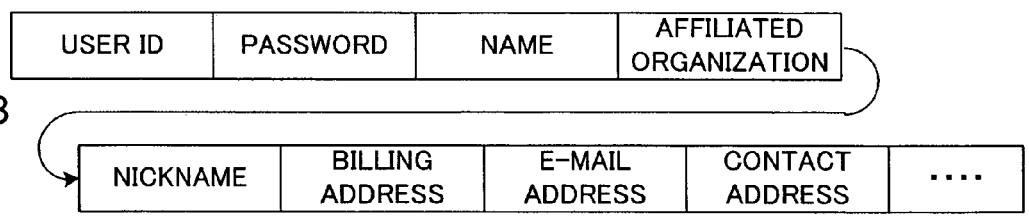
FIG. 8B is a view illustrating an example of information stored in a company membership list in the membership organization list.

More specifically, with respect to all members, user ID, password, name, affiliation organization (company, etc.), nickname, billing address, e-mail address, contact address (address, telephone number, facsimile number, network address (e.g., Notes mail address)) are saved in a company membership list as illustrated FIG. 8B. Moreover, multiple grouped lists (group lists) can be registered in the individual and group notebook as illustrated in FIG. 7. The member of the membership organization can copy member information registered in another group list of the company membership list, or change his/her nickname, or update his/her name, affiliation organization, contact address and save them.

The authentication manager performs processing for authenticating the user of the document management system.

The authentication manager determines whether login information (user ID and password) input from the MFP 1 or computer 3 is registered in the membership list manager in advance, thereby performing authentication of the member. Then, the authentication manager sends the authentication result to the MFP 1 or computer 3.

The access control manager determines whether the user, who was authenticated by the authentication manager, can gain access to a predetermined file, such as whether the user can refer to the file of the document management server 5, or whether the user can update the file.

More specifically, the access control manager restricts access to the file or folder (e.g., update and refers to the file) from the MFP 1 or computer 3 operated by the user. Moreover, when receiving a request for referring to the file or folder from the MFP 1 or computer 3, the access control manager determines whether the file or folder is accessible by the user, and transmits only the folder or file, which the user is allowed to access, to the information terminal.

For example, although a "company folder" and a "my folder" are described as folder names in FIG. 6A, the corresponding names are not always saved in the contents manager. Namely, "company code (e.g., COM0001)" and "user ID (e.g., USER0001)" may be saved in placed of the "company folder" and the "my folder", respectively. In this case, when the file name or the folder name is transmitted to the MFP 1 or computer 3 and the file name or folder name is displayed on the screen of the MFP 1 or computer 3, there may be provided a converting section that converts the name from "COM0001" to "company folder." This configuration makes it easy to view the file name or folder name displayed on the display of the computer 3 or the like.

When the file stored in the document management server 5 is updated or a new file is created, the mail transmission manager performs processing for notifying a predetermined user of the update of the file or the creation of the new file.

The mail transmission manager creates mail according to instructions from the MFP 1 or computer 3 operated by the member and instructions from the contents manager, and sends a notification to a predetermined member via a mail server.

The file history manager cyclically stores the file stored in the document management server 5.

The log management manager stores the function used by the user of the document management system and notifies it to the billing system manager to be described later.

Figure 8C:
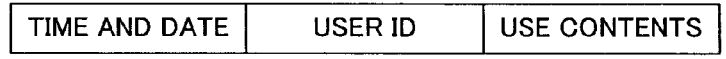
FIG. 8C is a view illustrating information of system usage history stored in a log management manager.

More specifically, the log management manager saves the history in which the MFP 1 and the computer 3 connected via the network 4 used the server to be described later as illustrated in FIG. 8C. For example, the log management manager records the respective items on a predetermined file in such a way that the time when the service is started and ended is set to "time and date", the user ID of the member, who has used the service, is set to "user ID" and the function of the used service such as "mail distribution function" is set to "use contents", and saves the file. Then, the log management manager transmits the history information to the billing system manager.

Upon reception of notification from the log management manager, the billing system manager performs billing processing based on the kind of function, time, etc of the document management system, which were used by the member of the membership organization.

Figure 8D:
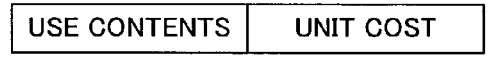
FIG. 8D is a view illustrating an example of billing information stored in the billing system manager.

For example, the billing system manager determines the function used by the user for each user, who has logged in the document management system from the MFP 1 or computer 3, and creates billing information by referring to a unit cost according to the contents as shown in FIG. 8D within a predetermined time limit of settlement.

Sequentially, a functional configuration of the document management server 5 will be explained. The document management server 5 includes a file management function, a security function, a mail transmission and reception function, and a history management function in terms of the function.

First, the file management function, which is performed by the contents manager, will be explained using FIG. 6A.

The contents manager of the document management server 5 saves the file created by the MFP 1 or computer 3 in the folder of the storage device (file storage section). Moreover, the member of the membership organization or the manager of the document management system can further generate a folder in the folder to make it possible to register the file in the folder classified by use. Additionally, in the present embodiment, to make it easy to understand the invention, the following will explain the configurations of these folders and files to be stored in the folders using the case in which "company folder", "group folder and "my folder" are created by way of example.

First, the company folder will be explained. The company folder is a folder, which all members registered in the company membership list shown in FIG. 7 can access, and each member can freely operates the files in the folder. Accordingly, the members registered in the company membership list share the files created in the company folder.

Moreover, the group folder is a folder, which only a specified member among the company members shown in FIG. 7 can access. The manager of the document management system can select a member, who will use the group folder, from these members, and cause the member to operate the file and folder. For example, the manager can generate a group folder for each department such as a folder for sales department, a folder for product planning, etc., under the company folder, and such group folders can be accessed by only the member, who belongs to the corresponding department. Then, the member of the business department can provide such setting that the member of the sales department cannot gain access to the folder for product planning. The manager first creates the group folder and sets a member who can use. After that, the set member can freely generate or delete a folder or file.

Further, my folder is a folder for which only an individual member of the company members uses. This folder is automatically created in the storage device of the document management server 5 when the user logs in using the computer 3 for the first time. In my folder, only the member himself/herself, who has created my folder, can operate the file or folder. It is noted that my folder may be pre-created in an initial state, but in the present embodiment, my folder is automatically created when the member logs in the document management server 5 for the first time in order to save creation time. Also, in the present embodiment, in order to prevent outsiders, e.g., employees of the company, except the members from logging in, at the time of logging in the document management server 5 for the first time, a login from only the computer 3 is allowed and a login from the MFP 1 is not allowed.

Moreover, the contents manager provides notification services such as "acknowledgment", "registration state information mail", and "self information mail" to each saved file.

The "acknowledgment" is a service that transmits the following mail. Namely, when the file saved by the contents manager is operated (for example, it is registered), mail, which indicates that the file is registered, is transmitted to the member, who is set in an ACL (Access Control List) of the file, and when the member, who has received the mail, gains access to the file, mail, which indicates that the contents of the file are confirmed, is transmitted to the mail sender. It is noted that ACL includes information indicating a file, a file ID of the folder, or a folder ID that sets access permission and the contents of the access permission (e.g., file creation and update are possible, only file reference is possible, user ID of member) as illustrated in FIG. 6B.

Moreover, the "registration state information mail" is a service that transmits the following mail. Namely, when it is detected that the file saved by the contents manager is operated (e.g., it is registered), mail, which indicates that the file is registered, is transmitted to the member, who is set in the ACL of the file.

Still moreover, the "self information mail" is a service that transmits the following mail. Namely, when the file, which is saved by the contents manager, is operated (e.g., it is updated) by the other member, who is set in the ACL of the file, mail, which indicates that the file is updated, is transmitted. More specifically, when the user ID of the member, who has set the "self information mail", is set in the ACL of the file saved by the contents manager and the member except the user ID operates (e.g., updates) the file, mail, which indicates that the file is updated, is transmitted to the member having the user ID who has set the "self information mail."

In addition, the contents manager may create a file for thumbnail display corresponding to the saved file, and save the file. At the time of using the "reference" function to be described later, the file for thumbnail display is transmitted to the MFP 1 or computer 3 from the document management server 5 to carry out thumbnail display, thereby preventing the member from erroneously downloading the file from the document management server 5 to the computer 3.

Regarding the aforementioned file operation, the right of access to the file and folder can be set by an access restricting section (security function) to be explained below.

An explanation will be next given of the security function in the present document management system. The security function includes security of the file itself or folder itself when the file or folder is created or referenced, and security of the member in accessing a certain file or folder. The following will explain these functions.

The access control manager of the document management server 5 restricts the user of the folder or file based on the ACL (Access Control List) shown in FIG. 6B. The access control manager restricts viewing, correction, registration, cancellation, printing (one or all of these is referred to as operation) of the folder or file. The member having the right of access to the file or folder is thus individually set, thereby making it possible to restrict the user, which can share or operate the folder or file, and prevent the member who has no access permission from erroneously tampering the document. More specifically, the access control manager restricts access to the file or folder by referring to the right of access to the folder or file, which is preset in ACL by the manager.

In the present embodiment, the right of access to the company folder or the file in the company folder is given to all the company members in the initial state of the document management system. Moreover, the right of access to my folder or the file stored in my folder is given to only the member who has created my folder or the file stored in my folder. Still moreover, the right of access to the group folder or the file stored in the group folder is given to only the member who belongs to the group.

When a new folder or file is created, the access control manager provides such setting that the ACL of the upper folder is automatically inherited. Also, the ACL of the file stored in the company folder can grant the access permission to multiple members at one time using the input section that the MFP 1 or computer 3 includes.

An explanation will be next given of the mail transmission and reception function in the present document management system.

The mail transmission manager of the document management server 5 transmits mail to the member of the membership organization registered in advance or an input address (not a member of the membership organization, hereinafter referred to as non-member) based on a mail transmission instruction from the contents manager. It is noted that transmission is performed via a mail server. The mail transmission manager includes a "mail distribution" function. The "mail distribution" function is a function that transmits the mail, which is created by each function of "acknowledgment", "registration state information mail", "self information mail", to a predetermined member. Sequentially, an explanation will be given of each function of the "mail distribution", "acknowledgment", "registration state information mail", "self information mail", which the document management server 5 includes, using FIGS. 9 to 13.

First, the "mail distribution" function will be explained using FIG. 9A.

The "mail distribution" function is a function that sends, from the document management server 5, information of file registration and reference and the like with an attachment of a file itself to a user address of a member belonging to the membership organization or other e-mail address (non-member) at a file registration (including update) time or reference time based on a request from the MFP 1 or computer 3.

Mail distribution processing shown in FIG. 9A is started upon detection of the operation of the touch panel 23 of the MFP 1 or computer 3 at the time of "registration" (including update) and "reference" to be described later. The MFP 1 or computer 3 determines whether an option of "mail distribution" is set to ON in connection with the file saved by the document management server 5 (step S1101). Then, when The MFP 1 or computer 3 determines that the option of "mail distribution" is set to ON (step S1101: Yes), the MFP 1 or computer 3 stores a mail address of a transmission destination designated by the MFP 1 or computer 3 (step S1102). This mail address may be input after obtaining an address list stored in the membership list manager of the document management server 5 and selecting the address therefrom, or this mail address may be manually input. On the other hand, when the MFP 1 or computer 3 does not determine that the option of "mail distribution" is set to ON (step S1101: No), the MFP 1 or computer 3 ends the mail distribution processing.

Next, the MFP 1 or computer 3 sends completion of the "mail distribution" option, that is, "registration" processing and "reference" processing, the transmission instruction of mail (hereinafter referred to as distribution mail) to be distributed by setting the option of "mail distribution" to ON, and the mail address stored in step S1102 to the document management server 5 (step S1103). When the above processing is ended, processing that is carried out by the MFP 1 or computer 3 is ended. Sequentially, when receiving the reception of notification of option setting of the "mail distribution" (step S1104), the mail distribution manager of the document management server 5 creates a file attachment mail and transmits the mail to the mail address notified in step S1103 (step S1105).

It is noted that a message that specifies an event that triggers the transmission of mail (message, e.g., an attached document is newly registered by A, the following document is updated by B, an attached file is referenced by C) is described in the body of the mail as illustrated in FIG. 9B.

Sequentially, the "acknowledgment" function will be explained. The "acknowledgment" function is composed of an "acknowledgment" setting function and an "acknowledgment" execution function. First, the "acknowledgment" setting function will be explained using FIG. 10A. Also, the "acknowledgment" execution function will be explained using FIG. 1A.

First, the "acknowledgment" setting function is a function that transmits mail, which includes link information to the file saved by the document management server 5, to a predetermined mail address based on the instruction from the MFP 1 or computer 3.

The MFP 1 or computer 3 determines whether the option of "acknowledgment" is set to ON at the time of the file "registration" (including update), "reference", etc., (step S1201). Then, when detecting that the option of "acknowledgment" is set to ON (step S1201: Yes), the MFP 1 or computer 3 notifies the document management server 5 that the option of "acknowledgment" is set to ON (step S1202). On the other hand, when it is not detected that the option of "acknowledgment" is set to ON (step S1201: No), the MFP 1 or computer 3 ends the acknowledgment setting processing. When step S1202 is ended, processing to be carried out by the MFP 1 or computer 3 is ended. Then, processing goes to processing in the document management server 5.

When receiving a notification that the setting of "acknowledgment" of the file is set to ON (step S1203), the mail transmission manager of the document management server 5 accesses the membership list manager and obtains a name of a setter, who has set the "acknowledgment", from the user ID used when logging in the MFP 1 or computer 3 (step S1204). Then, the mail transmission manager obtains an address of the member (member who is allowed to access this document) set in the ACL (Access Control List) of the relevant file (step S1205).

Next, the mail transmission manager creates mail in which the name of the setter, who has set the "acknowledgment", and link destination information to the file are described as illustrated in FIG. 10B. Then, the mail transmission manager transmits the mail to the address of the member set in the ACL of the file. Moreover, the contents manager of the document management server 5 writes the user ID of the member, who has set the "acknowledgment", in the ALC of the file in which the "acknowledgment" is set (step S1206).

Figures 11A, 11B:
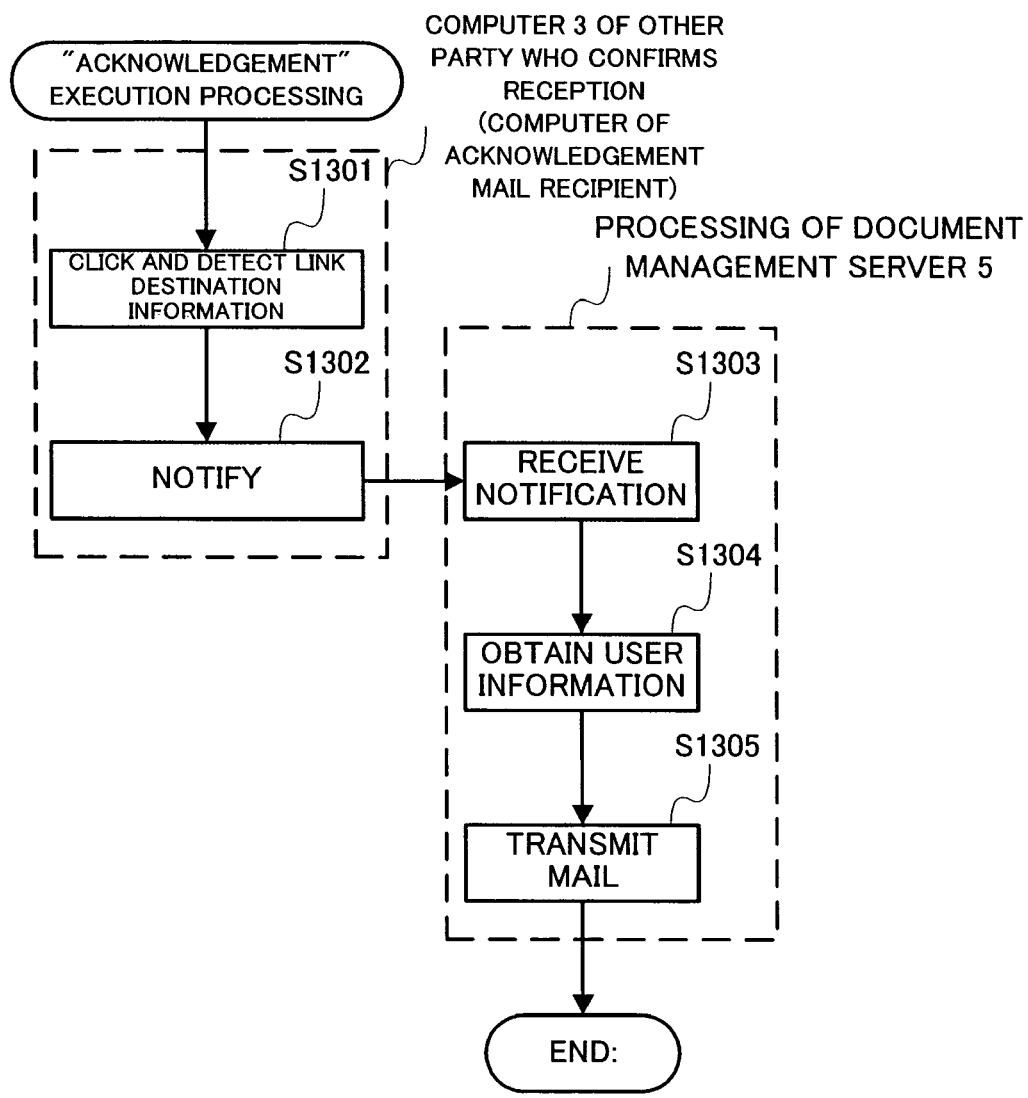
FIG. 11A is a flowchart explaining "acknowledgement" execution processing.
FIG. 11B is a view illustrating a specific example of a mail distributed in the "acknowledgement" execution processing.

Sequentially, the "acknowledgment" execution function will be explained using FIG. 11A. The "acknowledgment" execution function is a function that transmits an acknowledgment mail to the setter, who has set the "acknowledgment", when a recipient, who has received a mail with link sent by the "acknowledgment" execution function, gains access to a link destination described in the mail.

When the member, who has received the acknowledgment mail, clicks link destination information of the mail sent by the "acknowledgment" setting processing, the computer 3 detects the click operation (step S1301). Then, the computer 3 notifies the document management server 5 of the access to the transmitted file (step S1302). When receiving the notification, the contents manager of the document management server 5 notifies the mail distribution manager of the reception of the notification (step S1303). Then, the mail distribution manager stores the user ID of the member having the address obtained in step S1205. Then, the mail distribution manager gains access to the membership list manager to obtain the name of the member who has accessed the relevant file (step S1304). After that, the mail distribution manager inserts the name of the member, who has accessed the file, in the mail to be transmitted, and creates a mail illustrated in FIG. 11B, and sends the mail to the address of the member, who has set the "acknowledgment" (step S1305).

Figures 12A, 12B:
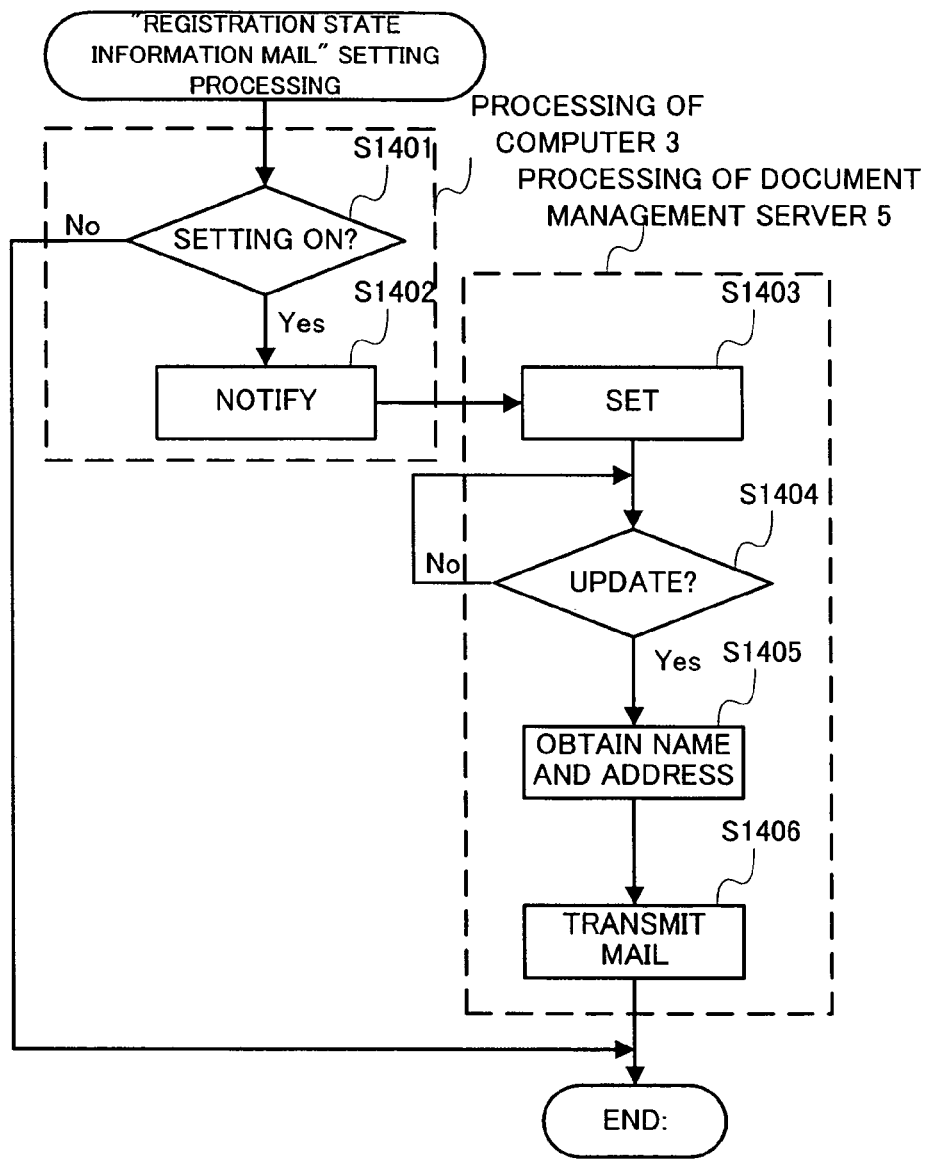
FIG. 12A is a flowchart explaining "registration state information mail" setting processing.
FIG. 12B is a view illustrating a specific example of a mail distributed in the "registration state information mail" setting processing.

Sequentially, an explanation will be given of "registration state information mail" setting processing using FIG. 12A.

The "registration state information mail" is a function that sends notification in which the file is operated (e.g., registered and referenced) to the address of each member set in the ACL of the relevant file when the file is operated (e.g., registered and referenced).

The MFP 1 or computer 3 determines whether the option of "registration state information mail" is set to ON at the time of "registration" and "reference" (step S1401). Then, when detecting that the option of "registration state information mail" is set to ON (step S1401: Yes), the computer 3 notifies the document management server 5 that the "registration state information mail" of the relevant file is set to ON (step S1402). On the other hand, when it is not detected that the option of "registration state information mail" is set to ON (step S1401: No), this processing is ended.

Then, when receiving the file in which "registration state information mail" is set to ON from the computer 3 in step S1402, the contents manager of the document management server 5 saves setting information of the option (step S1403). After saving the option setting, the contents manager determines whether there is an update of the file (including an overwriting of the file, a deletion thereof, etc.) from the member (step S1404).

Additionally, in step S1401, when processing such as "registration", "reference" etc., is performed from the computer 3, it is detected that the option of "registration state information mail" is set to ON. However, in step S1404, when it is detected that the file is updated, it may be determined whether the "registration state information mail" is set to the file.

Then, when it is determined that the file to which the "registration state information mail" is set is updated (step S1404: Yes), the user ID of the member, who has updated the file, is notified to the mail distribution manager in order to send the "registration state information mail."

Next, the mail distribution manager accesses the membership list manager and obtains (1) a name and an address corresponding to the user ID of the member, who has updated the file, and (2) an address of the member set in ACL of the file, from the membership list manager (step S1405). Then, the mail distribution manager inserts the name of the member obtained from the membership list manager and a link destination of the file to create mail as illustrated in FIG. 12B, and transmits the mail to the address of the member set in ACL of the file (step S1406). In this example, although the mail is transmitted to all members set in the ACL, the mail may be distributed to the member, who has set the "registration state information mail" to ON, among the members set in the ACL. It is noted that an important update such as deletion is desirably notified to all members without condition.

Sequentially, "self information mail" setting processing will be explained using FIG. 13A.

The "self information mail" is a function that sends notification in which the file is operated (e.g., updated) to the address of the member preset in the file when the file is updated. The member can set the option of "self information mail" to ON in connection with a certain file by executing the "self information mail" setting processing from the MFP 1 or computer 3. The computer 3 determines whether this setting is performed. Then, the computer 3 determines whether the "self information mail" setting is ON (step S1501). Then, when determining that the "self information mail" setting is ON (step S1501: Yes), the computer 3 notifies the document management server 5 that the "self information mail" of that file is set to ON (step S1502). On the other hand, when it is not determined that the "self information mail" setting is ON, the "self information mail" setting processing is ended.

Then, when receiving the notification in which the "self information mail" is set from the computer 3, the contents manager of the document management server 5 saves the user ID of the member, who has set the "self information mail" (step S1503). Then, the contents manager determines whether the file is updated (including overwriting and deletion of the file) (step S1504). In this example, when a predetermined operation is performed from the computer 3, the setting of the "self information mail" is notified to the document management server 5. However, the following processing may be carried out. Namely, when a certain member updates a file, it is determined whether the "self information mail" is set, and when the "self information mail" is set, processing goes to step S1505.

In connection with the file in which the "self information mail" is set, when the update is detected (step S1504: Yes), the user ID of the member, who has updated the file, is notified to the mail distribution manager. Then, the mail distribution manager accesses the membership list manager and obtains a name and an address corresponding to the user ID of the member, who has updated the file. Then, the mail distribution manager obtains the address of the member who has determined that the "self information mail" is set in step S1501 (step S1505).

Then, the mail distribution manager inserts the name of the member and the link destination of the file set in step S1505 into a mail to create the mail as shown in FIG. 13B. After that, the mail distribution manager transmits the mail to the address of the member who has set the "self information mail" (step S1506). The member who has set the "self information mail" recognizes that the file has been updated by receiving the mail (step S1507).

In the present embodiment, when the option of "mail distribution" is set to the document management server 5, the mail distribution manager sends the notification with the attachment of a file itself regardless of whether the user is the member or non-member. However, other configuration may be possible. Namely, when receiving address information of the transmission destination from the computer 3, the document management server 5 determines whether the address indicates the member of the company membership or the non-member, and when it is determined that the address indicates the member of the membership organization, the document management server 5 may send mail with a link, and when it is determined that the address indicates the nonmember, the document management server 5 may send a notification with an attachment of a file itself.

Moreover, in the present embodiment, when the option of "mail distribution" is set, the mail distribution manger accesses the membership list manager to obtain the address list and select the address. However, when the transmission destination of mail is the member of the membership organization, only the user ID and name of the member of at least the membership organization may be obtained and this configuration can bring efficiency to member distribution processing.

Moreover, in the present embodiment, when the option of "acknowledgment" is set, the mail distribution manager accesses the membership list manager and refers to a preset ACL, and transmits mail with "acknowledgment" to the member registered in the ACL. The above configuration makes it possible to request the member of the company membership registered in the ACL to confirm the file by the simple operation, and this makes it possible to recognize whether the file is accessed.

Moreover, in the present embodiment, the "mail distribution" transmission destination and the "acknowledgment" transmission destination are registered to be different from each other in the document management server 5. Namely, in the case of the "mail distribution", the mail can be transmitted to all users having mail addresses regardless of whether they are member or not. However, in the case of the "acknowledgment", the mail can be transmitted to only the member of the company membership. This configuration eliminates the need for ensuring the security such as restriction on the access to the file at the link destination at the time of transmitting the mail with link to the nonmember.

Furthermore, both the "registration state information mail" and the "self information mail" can be set to the file. However, in the case where both are set thereto, transmission of both mails will lead to transmission of numerous mails having the same effect of a message and apply a load on the network. For this reason, in the case where both the "registration state information mail" and the "self information mail" are set, only either of two may be configured to be transmitted. Moreover, if the contents of the "registration state information mail" are the same as those of the "self information mail", user's confusion can be prevented even if only one mail is transmitted.

Figure 14:
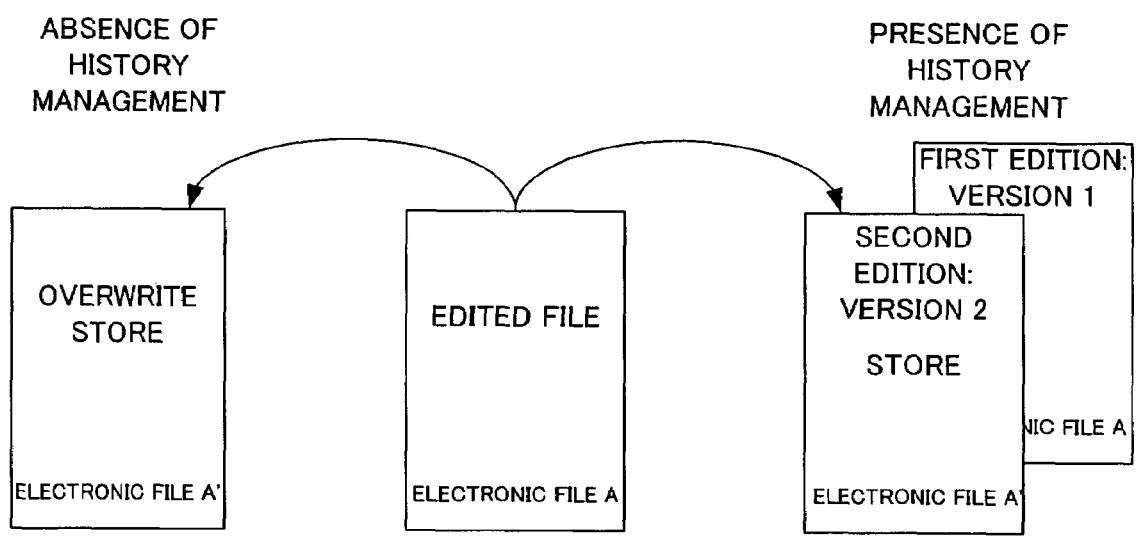
FIG. 14 is a view explaining a function of a file history management.

An explanation will be next given of a file history management in the present document management system with reference to FIG. 14.

It is assumed that a mode of "history management" is set and a certain file (file A) is operated from the MFP 1 or computer 3. When the file history manager of the document management server 5 saves the file A, for example, two times though a file name, which is displayed on the display of the MFP 1 or computer 3, is the same, two kinds of files including the file (file A) saved first time and a file (file A') saved second time can be saved.

Moreover, when the file A' is updated and saved, the file (file A') saved second time is overwritten on the file (file A) saved first time. A file (file A"), which is obtained by updating the file A' and saving the updated file, is overwritten on the file (file A') saved second time. Thus, in connection with one file, files for two histories (two cycles) are automatically saved. Additionally, in the explanation given below, a first file is assumed to version 0, and each version of the file can be referred, extracted, and printed. On the other hand, when a mode of "no history management" is set, the history management is not carried out and only the latest file is saved in the document management server 5. In addition, whether or not the history of the file is managed can be set when the file is registered in the document management server 5 or updated. In the present embodiment, the history of the file is not managed in the initial state. Moreover, as described later, each history file can be operated from the computer 3, but each history file is prohibited from being operated from the MFP 1. The reason is as follows. Namely, for example, in a case where the MFP 1 is set up at the convenience store, there is a possibility that a user, except the members of the membership organization who use the document management system, will misuse the document management system using the MFP 1.

The following will explain a relationship between the file history management and an operation in mailing the file.

The file history manager saves a file cyclically and performs "mail distribution" processing, so that a file can be transmitted to a predetermined member. However, since the operation of the document management server 5 differs between a case in which the MFP 1 is operated to instruct a file transmission and a case in which the computer 3 is operated to instruct a file transmission, the following will explain the contents of transmission.

<Case of operation from MFP 1>

Case where mail distribution is performed at a file referring (displaying) time (case where the contents of the file is displayed to transmit the file):

A file of the latest version (namely, 0) is always attached to mail to be distributed. For example, if the relevant file is overwritten when the history management is OFF, the file is transmitted, and even if there is a file of a version other than the latest version when the history management is ON, the file of the latest version 0 is always sent.

Case where mail distribution is performed at a file registration time (case where a file is newly registered and the registered file is transmitted):

The same as the case at the file referring time.

<Case of operation from Computer 3>

Case where mail is distributed without designating the version at a file referring time:

A file of the latest version (namely, 0) is always attached to mail to be distributed. For example, if the relevant file is overwritten when the history management is OFF, the file is transmitted. Also, even when a file of a version other than the latest version is created when the historical management is ON, the file of the latest version 0 is always sent.

Case where mail is distributed after designating the version at a file referring time:

Mail to which a file of a designated version (e.g., 0 (latest)), 1 (one previous version), 2 (two previous version), 3 (three previous version) and the like) is attached is transmitted.

Case where mail distribution is performed at a file registration time:

A file of the latest version (namely, 0), that is, a file registered this time is always attached to mail to be distributed. Even if the relevant file is overwritten when the history management is OFF or a file of other version is created when the history management is ON, the file of the latest version registered this time is sent.

This configuration enables the member of the membership organization to designate a specific version of the file, which is historically managed by the file history manager, and transmit the file of the version to a predetermined member. Moreover, the file of the latest version can be always transmitted. Still moreover, the history management is not carried out from a specific information terminal apparatus (for example, MFP 1), thereby preventing the file from being occupied by the MFP 1 for a long time.

In the present embodiment, the notification is made using the latest version. In this case, when some of files are deleted, the latest version of the residual files is opened. Additionally, when the files of all versions are deleted, an error message indicating that "there is no file" is displayed. Moreover, the file of the specified version except the latest one is transmitted. In this case, when the specific version is deleted, an error message indicating that "there is no file" is displayed. However, when deletion of the file is detected, mail indicating that the file is deleted may be transmitted to the transmission destination of the relevant mail. This prevents unnecessary access to the document management server 5 from the information terminal.

Moreover, the notification is made using the specified version. In this case, when the file of the relevant version is deleted, the file of the latest version may be displayed.

An explanation will be next given of the procedure of using each function of the document management server 5 from the MFP 1. First of all, explanation will be given of processing from an initial state to selection of each function.

(Opening)

On power-on, the MFP 1 displays an opening screen on the display section and waits for an operation from a user. Also, the present opening screen is displayed when no operation is input for several minutes in a state that a screen is moved to the other screen or when end of each function is input. In the present embodiment, as illustrated in FIG. 15A, "Touch Here" (start button) for instructing the start of the service is placed at a central portion of the screen and the MFP 1 waits for the user input. When the start button is pressed, a function selection screen is displayed.

(Function Selection)

After detecting the depress of the start button, the function selection screen is displayed as illustrated in FIG. 15B, and the MFP 1 waits for the user input. In the present embodiment, when a button corresponding to each function is selected on the function selection screen, function buttons for selecting the respective functions of "register", "print", "delete", "reference", and "extract" are arranged as illustrated in FIG. 15C. When each of the function buttons is depressed, function selection information is notified to the document management server 5 via the network 4. After that, a login screen is displayed.

(Login)

After detecting the depression of each function button, a login and password input screen is displayed as illustrated in FIG. 15D, and the MFP 1 waits for user input of login information. When login information, namely, "user ID" and "password" are input from the user, the login information is transmitted to the document management server 5 and the MFP 1 waits for an authentication result. When receiving a notification that authentication is OK, the MFP 1 displays an operation screen according to each function to be described later. Additionally, when receiving a notification that authentication is NG, the MFP 1 displays a screen that urges the user to input login information without displaying the screen for operating the function.

An explanation will be next given of each function illustrated in FIG. 15C. The function of "register from MFP" will be first explained using FIG. 16.

The function of "register from MFP" is a function that scans a document such as paper by a scanner included in the MFP 1 and saves scanned image data in the document management server 5 or on the storage media attached to the device connected to the external media I/F 14 of the MFP 1. Also, this is a function that saves the file saved on the storage media attached to the device connected to the external media I/F 14 of the MFP 1 to the document management server 5. The detailed description will be given as follows.

Figure 16:
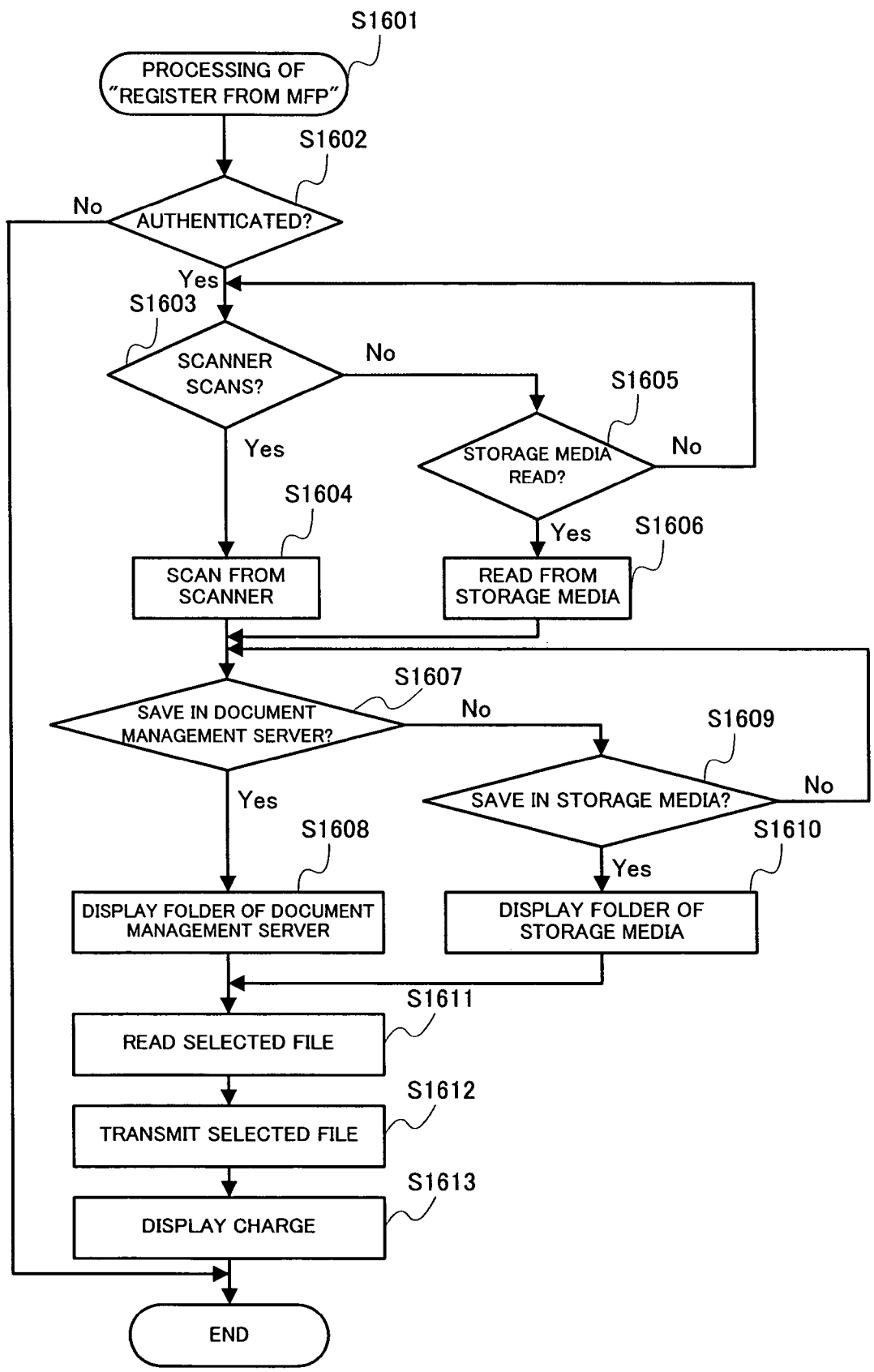
FIG. 16 is a flowchart explaining the processing of "register from MFP"

When "register" is selected on the aforementioned function selection screen (FIG. 15C), the control section 10 starts processing of a flowchart in FIG. 16 (step S1601) to first perform authentication processing using the screen of FIG. 15D to determine whether authentication is OK (step S1602). Then, when authentication is OK (step 1602: Yes), the MFP 1 displays a screen as illustrated in FIG. 15E to select (A) an image file, which is obtained by scanning a document such as paper set in the scanner, or (B) an electronic file, which is saved on storage media 20 and 21 attached to the external media I/F 14 of the MFP 1, on a display section composed of the LCD 22, and waits for user input (step S1603).

When the control section 10 detects that "(A) document such as paper set in the scanner" is selected (step S1603: Yes), the MFP 1 drives the scanner section 19 to read data and create file including the relevant data (step S1604). On the other hand, when "(B) storage media" is selected (step S1603: No and step S1605: Yes), the MFP 1 read the file from the storage media 20 and 21 (step S1606). In addition, when neither "(A) document such as paper set in the scanner" nor "(B) storage media" is selected (step S1605: No), the MFP 1 displays the screen in FIG. 15E and is standby.

Next, the MFP 1 (control section 10) displays a screen of FIG. 15F and causes the user to select whether the file should be saved to (a) the document management server 5 or (b) on the storage media 20 and 21 attached to the MFP 1 (step S1607).

When "saving to the document management server" is selected (step S1607: Yes), the MFP 1 gains access to a saving location of the selected file and displays folder information of a storage destination (step S1608). On the other hand, when "storage media" is selected (step S1607: No and step S1609: Yes), the MFP 1 gains access to the storage media and displays a folder of the storage destination (step S1610). In addition, when neither "saving to the document management server" nor "storage media" is selected (step S1609: No), the MFP 1 displays the screen in FIG. 15F and is standby.

After that, when the user selects a certain folder from among the folders displayed in step S1608 or step S1610, the MFP 1 reads (A) the image file obtained by scanning the document such as paper set in the scanner or (B) the file saved on the storage media attached to the MFP 1 (step S1611). Then, the MFP 1 transmits the read file to the document management server 5 (step S1612). After transmitting the file, the MFP 1 receives billing information from the document management server 5 and displays a charge on the display screen (step S1613).

Additionally, at the time of using the function of "register from MFP", when (A) image data obtained from the document such as paper set in the scanner is selected, a setting screen for scanner conditions may be displayed to set scanner conditions. The following scanner conditions may be settable. Namely, the scanner condition includes a kind of document (kind of document to be scanned), identification between top and bottom (top and bottom of the document is automatically identified), the number of documents (the number of documents to be scanned), storage format (format of file to be stored after scanning), scanning resolution (resolution at a scanning time), document surface (document is one-sided or two-sided), image quality (image quality and compression rate when color scanning and storage are performed), and the like.

Moreover, in the present embodiment, at the time of using the function of "register from MFP", when (a) "saving to the document management server" is selected, various kinds of setting screens that can set the file saved as illustrated in FIGS. 15G to 15J are displayed to make it possible to set a file registration option. The following registration options may be settable. Namely, the registration option includes sharing of document (access right is given to all members), history management (file history is managed), registration expiration date (expiration date of the file to be stored is set), mail distribution (mail attached to the file is distributed simultaneously with the registration of the file), acknowledgement (mail with a link of the file is distributed to all members set in the ACL of the relevant file simultaneously with saving the file, and when the member receives the mail and accesses the link destination, acknowledgement mail is sent thereto), registration state information notification ("registration state information mail" is set to be transmitted simultaneously with saving the file, and when there is an operation of the relevant file, such mail is notified to all members set in the ACL), and the like.

An explanation will be next given of the function of "print from MFP." The function of "print from MFP" is a function that prints a file saved in the file storage section 113 of the document management server 5 or a file saved on the memory card 21 onto a storage media such as paper by the printing section 18 of the MFP 1.

Figure 17:
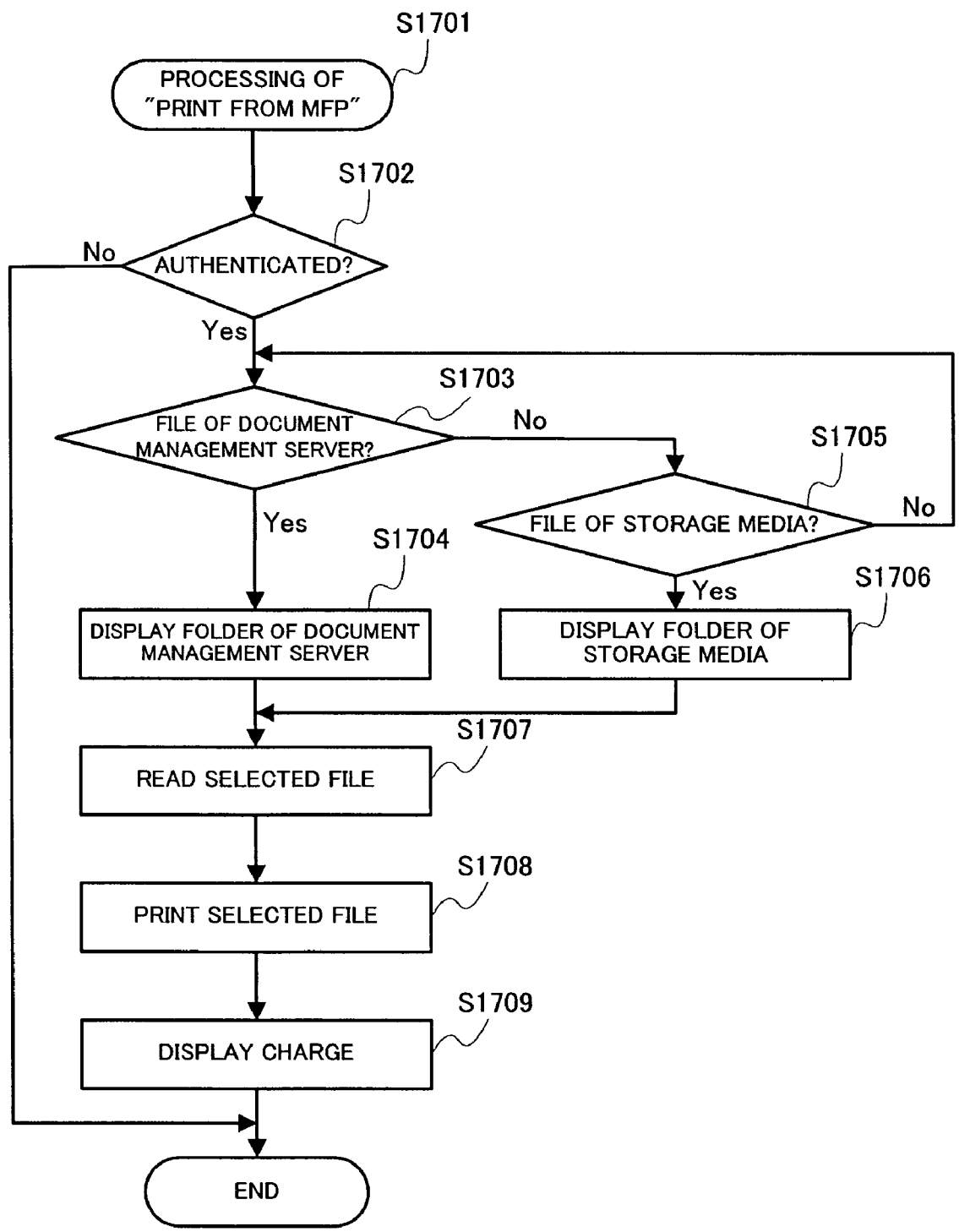
FIG. 17 is a flowchart explaining the processing of "print from MFP"

The following will explain the function of "print from MFP" of the MFP 1 using FIG. 17.

When detecting that "print from MFP" is selected on the aforementioned function selection screen (FIG. 15C), the control section 10 starts the flow of FIG. 17 (step S1701), and determines whether authentication is OK by authentication processing using the authentication screen of FIG. 15D (step S1702). Then, when authentication is OK (step S1702: Yes), the MFP 1 displays a screen for selecting a location where the file is saved on the display. The user operates this screen to make it possible to select whether (a) the electronic file saved in the file storage section 113 of the document management server 5 should be printed or (b) the electronic file saved on the storage media attached to the MFP 1 should be printed.

When "the electronic file saved in the document management server" is selected (step S1703: Yes), the MFP 1 gains access to the saving location of the selected file and displays folder information of the storage destination (step S1704). On the other hand, when "storage media" is selected (step S1703: No and step S1705: Yes), the MFP 1 gains access to the attached storage media and displays folder information of the storage destination (step S1706). In addition, when neither "electronic file saved in the document management server" nor "storage media" is selected (step S1705: No), the MFP 1 returns the screen to the screen displayed after authentication is OK.

After that, when the user selects a certain folder from among the folders displayed in step S1703 or step S1705, the MFP 1 reads (A) the file saved in the selected folder of the document management server 5 or (B) the file saved on the storage media attached to the MFP 1 (step S1707). Then, the MFP 1 prints the file (step S1708). After printing the electronic file, the MFP 1 receives billing information from the document management server 5 and displays a charge on the display screen (step S1709).

At the time of using the function of "print from MFP", when the file is selected, a setting screen for printing conditions may be displayed to set the file printing conditions. The following printing conditions may be settable. Namely, the printing condition includes a color selection (monochrome printing or color printing), the number of sets (the number of paper sheet to be printed), layout (one page is printed in one page or multiple pages are printed in one page), print size (automatic or each paper is selected), print surface (singe-side printing or duplex printing), and the like.

An explanation will be next given of the function of "delete from MFP." The function of "delete from MFP" is a function that deletes a file saved in the document storage server 5 or an electronic file selected after accessing the file saved on the storage media attached to the MFP 1.

Figure 18:
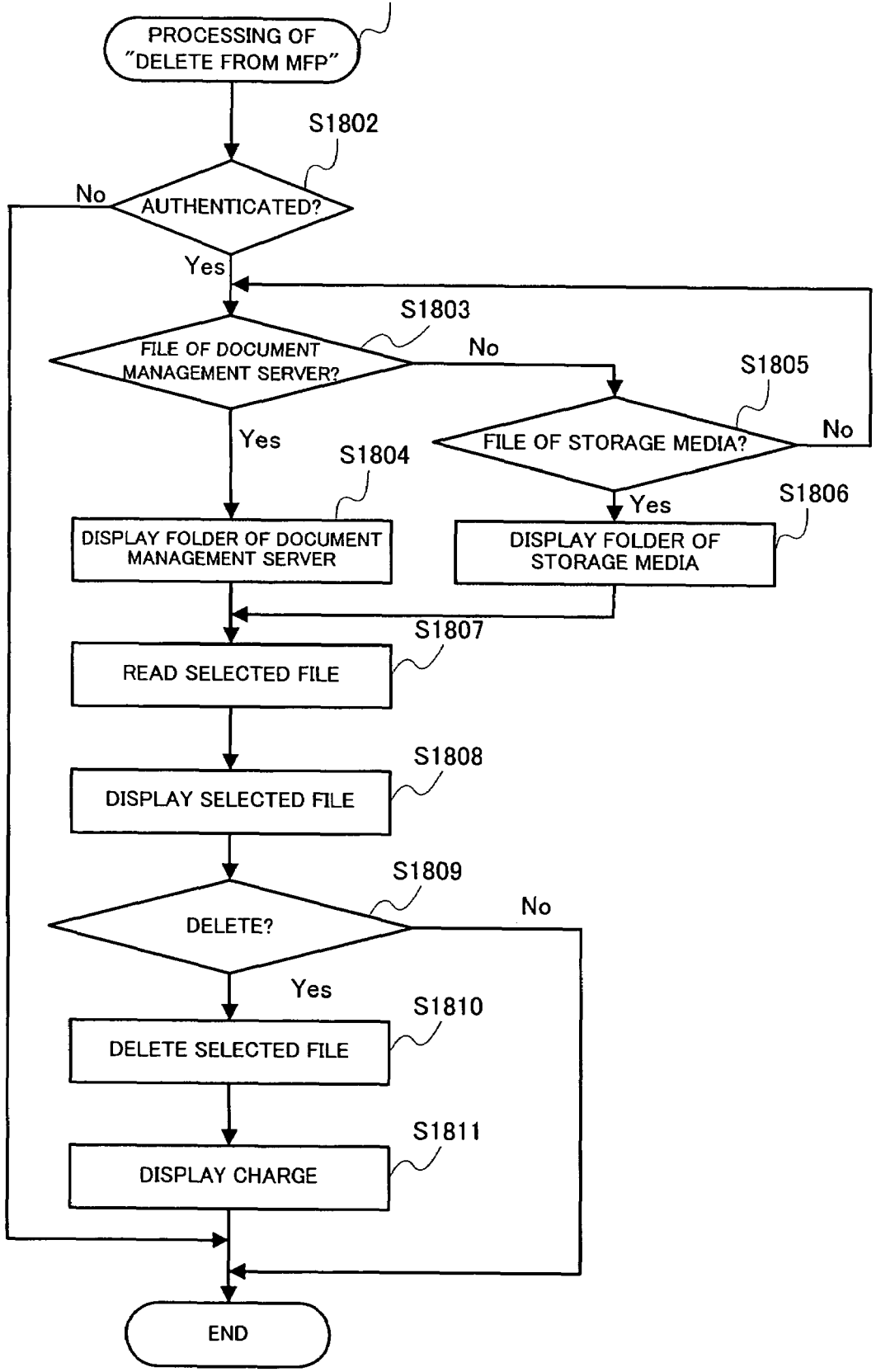
FIG. 18 is a flowchart explaining the processing of "delete from MFP"

The following will explain the function of "delete from MFP" of the MFP 1 using FIG. 18.

When detecting that "delete from MFP" is selected on the aforementioned function selection screen (FIG. 15C), the control section 10 starts processing of FIG. 18 (step S1801), and determines whether authentication is OK (step S1802). Then, when authentication is OK (step S1802: Yes), the MFP 1 displays a screen for selecting a location where the file is saved on the display. From this screen, it is selected whether (a) the file saved in the document management server 5 should be deleted or (b) the file saved on the storage media attached to the MFP 1 should be deleted.

When "the electronic file saved in the document management server" is selected (step S1803: Yes), the MFP 1 gains access to the saving location of the selected file and displays folder information of the storage destination (step S1804). On the other hand, when "storage media" is selected (step S1803: No and step S1805: Yes), the MFP 1 gains access to the attached storage media and displays folder information of the storage destination (step S1806). In addition, when neither "electronic file saved in the document management server" nor "storage media" is selected (step S1805: No), the MFP 1 returns the screen to the screen displayed after authentication is OK.

After that, when the user inputs a folder selection, the MFP 1 reads (A) the file saved in the selected folder of the document management server 5 or (B) the file saved on the storage media attached to the MFP 1 (step S1807). Moreover, the MFP 1 displays the contents of the file by previewing (step S1808). Then, the MFP 1 determines whether an instruction to delete the file is received (step S1809). After that, when determining that an instruction to delete the file is received (step S1809: Yes), the MFP 1 deletes the instructed file (step S1810). After deleting the relevant electronic file, the MFP 1 receives billing information from the document management server 5 and displays a charge on the display screen (step S1811).

An explanation will be next given of the function of "reference from MFP." "Reference from MFP" is a function that displays an electronic file saved in the document management file 5 or the storage media attached to the MFP 1 on the display section of the MFP 1.

Figure 19:
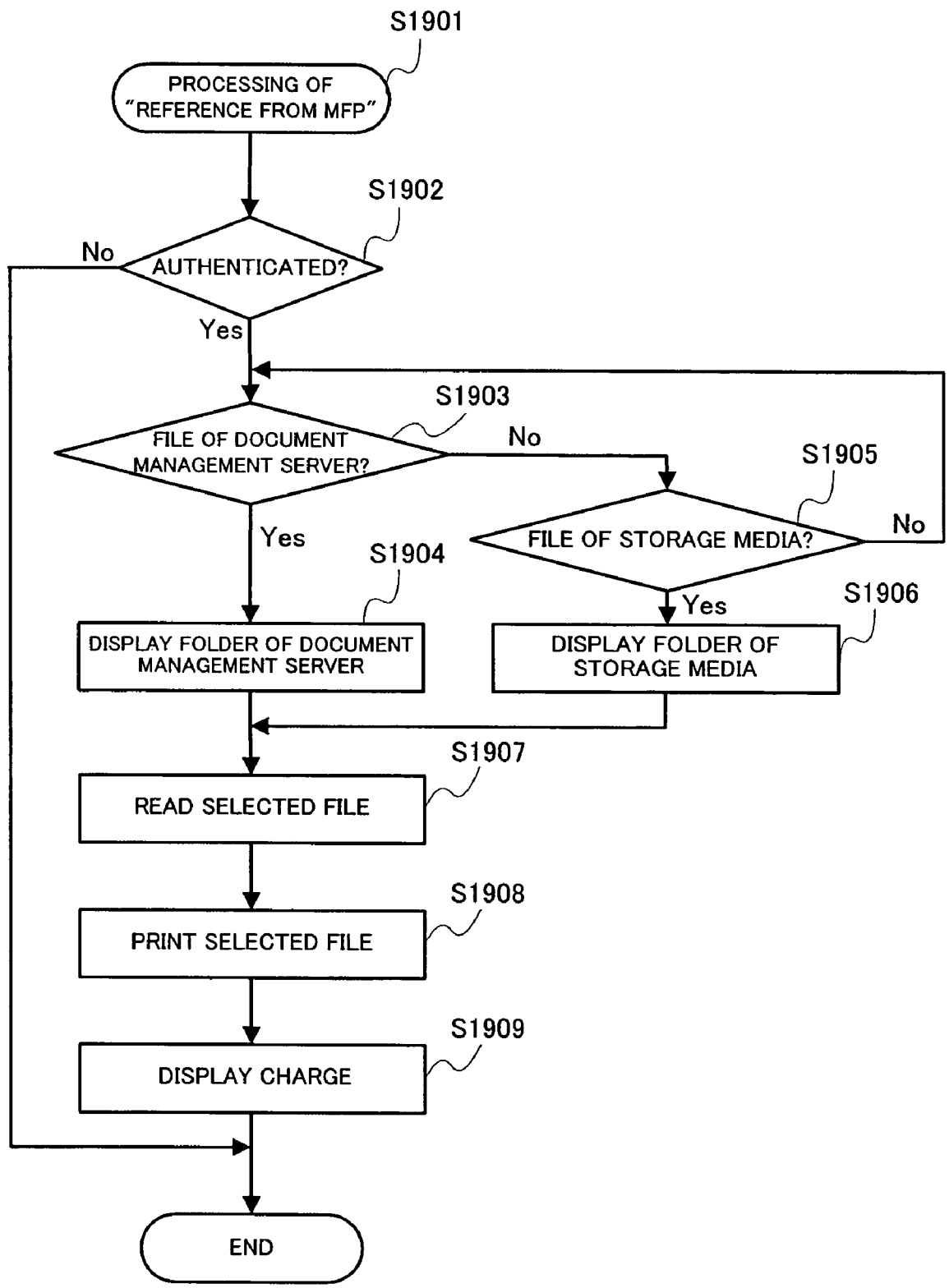
FIG. 19 is a flowchart explaining the processing of "reference from MFP"

The following will explain the function of "reference from MFP" of the MFP 1 using FIG. 19.

When detecting that "reference from MFP" is selected on the aforementioned function selection screen, the control section 10 starts processing (step S1901), and determines whether authentication is OK (step S1902). Then, when authentication is OK (step S1902: Yes), the MFP 1 displays a screen for selecting a location where the file is saved on the display. From this screen, the user can select whether (a) the file saved in the document management server 5 should be referenced or (b) the file saved on the storage media attached to the MFP 1 should be referenced. It is noted that when authentication is not OK (step S1902: No), "reference processing from MPF" is ended.

When "the electronic file saved in the document management server" is selected (step S1903: Yes), the MFP 1 gains access to the saving location of the selected file and displays folder information of the storage destination (step S1904). On the other hand, when "storage media" is selected (step S1903: No and step S1905: Yes), the MFP 1 gains access to the attached storage media and displays folder information of the storage destination (step S1906). In addition, when neither "electronic file saved in the document management server" nor "storage media" is selected (step S1905: No), the MFP 1 returns the screen to the screen displayed after authentication is OK.

After that, when detecting that the folder is selected, the control section 10 reads (A) the file saved in the selected electronic folder of the document management server 5 or (B) the file saved on the storage media attached to the MFP 1 (step S1907). Moreover, the MFP 1 displays the contents of the file by previewing (step S1908). After displaying the contents of the file, the MFP 1 receives billing information from the document management server 5 and displays a charge on the display screen (step S1909).

At the time of using the function of "reference from MFP", when (a) "reference to the file saved in the document management server" is selected, various kinds of setting screens that can set the file saved as illustrated in FIGS. 15G to 15J are displayed to make it possible to set a file registration option. The same registration option as used in the function of "registration from MFP" can be set. Namely, sharing of document, history management, registration expiration date, mail distribution, acknowledgement, registration state information notification, and the like may be set.

An explanation will be next given of the function of "extract from MFP." "Extract from MFP" is a function that saves the file saved in the document management server 5 in the storage media attached to the MFP 1.

Figure 20:
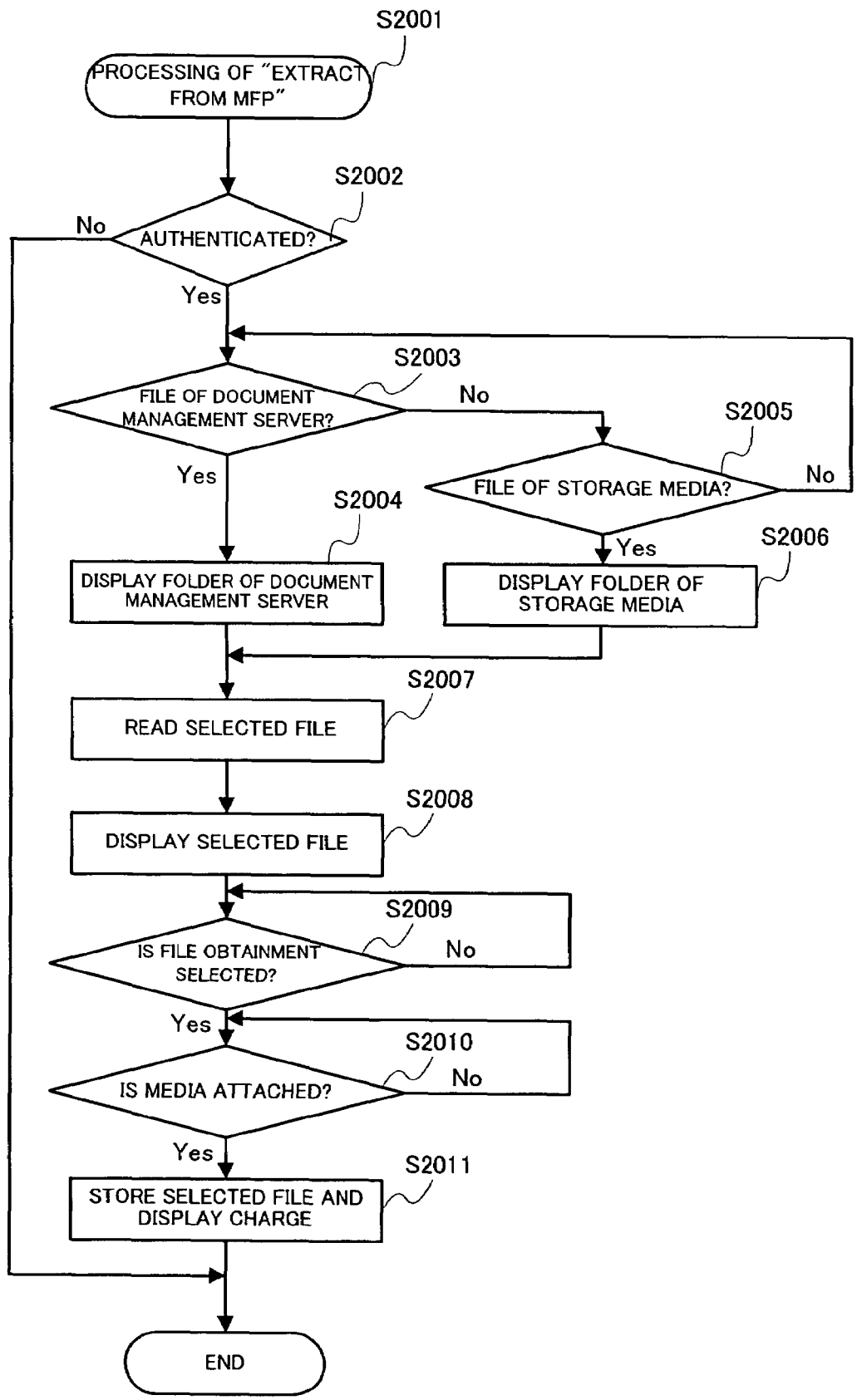
FIG. 20 is a flowchart explaining the processing of "extract from MFP"

The following will explain the function of "extract from MFP" of the MFP 1 using FIG. 20.

When detecting that "reference from MFP" is selected on the aforementioned function selection screen, the control section 10 starts processing of "extract from MFP" (step S2001), and determines whether authentication is OK (step S2002). Then, when determining that authentication is OK (step S2002: Yes), the MFP 1 gains access to the document management server 5 and displays folder information.

When "the electronic file saved in the document management server" is selected (step S2003: Yes), the MFP 1 gains access to the saving location of the selected file of the document management server 5 and displays folder information of the storage destination (step S2004). On the other hand, when "storage media" is selected (step S2003: No and step S2005: Yes), the MFP 1 gains access to the attached storage media and displays folder information of the storage destination (step S2006). In addition, when neither "electronic file saved in the document management server" nor "storage media" is selected (step S2005: No), the MFP 1 returns the screen to the screen displayed after authentication is OK.

After that, when a folder selection is input, the MFP 1 reads (A) the electronic file saved in the selected electronic folder of the document management server 5 or (B) the electronic file saved on the storage media attached to the MFP 1 (step S2007). Moreover, the MFP 1 displays the contents of the electronic file by previewing (step S2008). When it is selected that the file is obtained after displaying the contents of the file (step S2009: Yes), the control section 10 of the MFP 1 determines whether the storage media that stores the file is attached (step S2010). Then, when the control section 10 of the MFP 1 determines that the media is attached (step S2010: Yes), the MFP 1 goes to the next step. On the other hand, when the control section 10 of the MFP 1 determines that no media is attached (step S2010: No), the MFP 1 returns the screen to the screen for determining whether the media is attached. After that, the MFP 1 receives billing information from the document management server 5, displays a charge on the display screen, and stores the electronic file whose obtainment is selected in step S2009 in the storage media (step S2011).

After the MFP 1 receives billing information of any of the functions (services) of "register", "print", "delete", "reference", and "extract", and displays the charge on the display screen, the document management server 5 performs logoff.

An explanation will be next given of the procedure of using the document management server 5 from the computer 3.

First of all, an explanation will be given of processing from start-up of software to selection of each function.

(Login)

The user starts up the software of the document management system installed to the computer 3. Then, the computer 3 displays a login screen and a password input screen, and waits for an input of login information. For example, when the screen for authenticating the user is displayed on a monitor connected to the computer 3, namely, login information, that is, "user ID", and "password" are input, the computer 3 transmits the relevant login information to the document management server 5, and waits for an authentication result. When receiving that authentication is OK, the computer 3 displays the function selection screen as illustrated in, for example, FIG. 15B on the monitor. In addition, when receiving a notification that authentication is NG, the computer 3 displays a screen that urges the user to input login information without displaying the screen for operating the function.

(Function Selection)

When receiving a notification that authentication is OK, the computer 3 displays a function selection screen on the display and waits for user input. On the function selection screen, there are arranged function buttons for selecting the respective functions of "register", "print", "delete", "reference", and "extract". When each of the function buttons is depressed, function selection information is notified to the document management server 5 via the network 4. After that, the operation screen corresponding to each function to be described later is displayed on the display. The detailed description of each function will be given as follows.

First, the function of "register from PC" will be explained. "Register from PC" is a function that saves a file saved in the computer 3 in the document management server 5.

Figure 21:
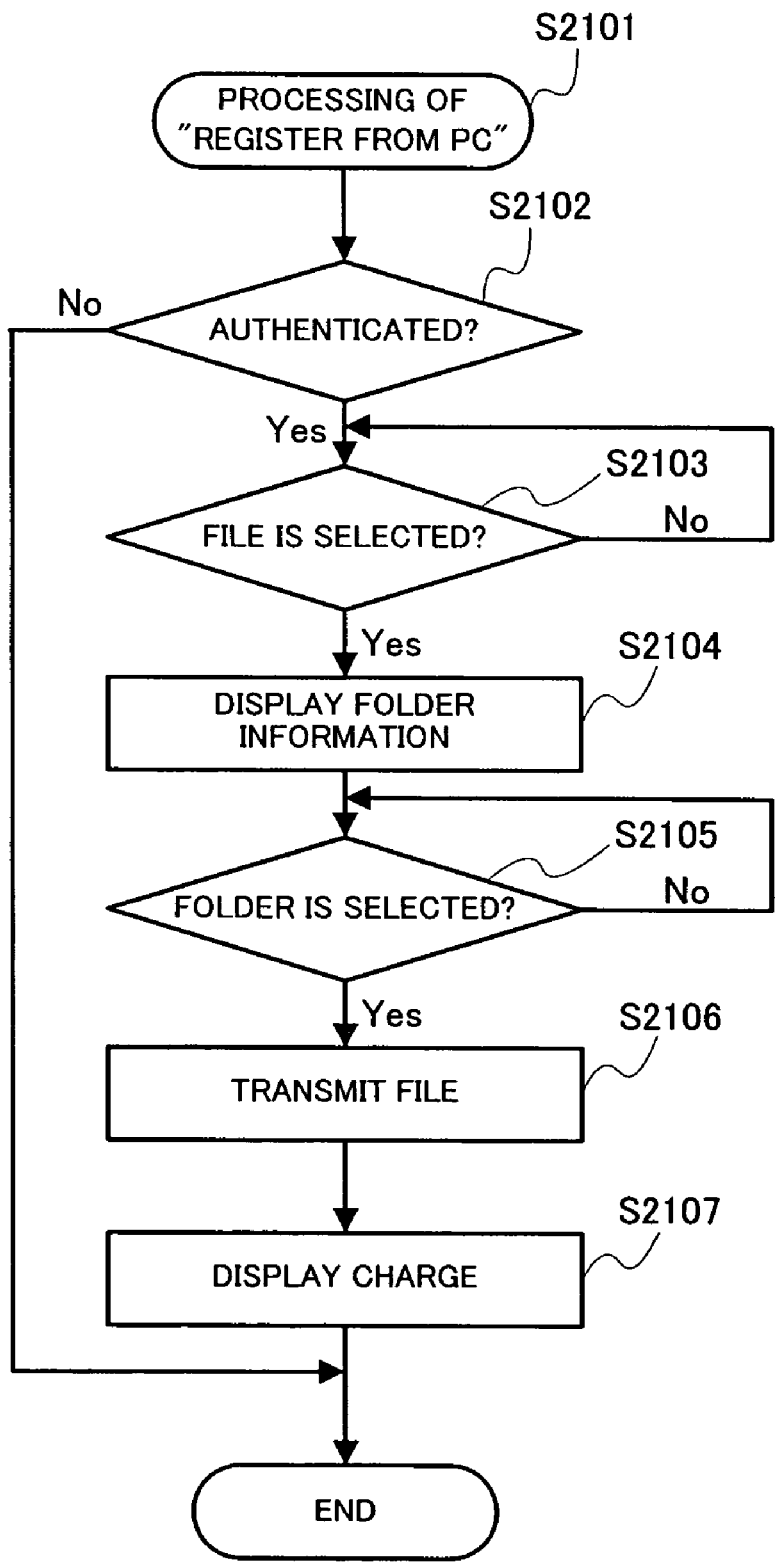
FIG. 21 is a flowchart explaining the processing of "register from PC"

The following will explain the function of "register from PC" of the MFP 1 using FIG. 21.

When "register from PC" is selected on the aforementioned function selection screen, the computer 3 starts processing of "register from PC" (step S2101) and determines whether authentication is OK (step S2102). Then, when authentication is OK (step 2102: Yes), the computer 3 displays a screen for selecting a file in the computer 3. Then, when the file is selected (step S2103: Yes), the computer 3 gains access to the document management server 5 and displays the folder of the document management server 5 (step S2104). After that, the computer 3 determines whether a folder of a storage destination is selected (step S2105). Then, when determining that the folder is selected (step S2105: Yes), the computer 3 transmits the file selected in step S2103 to the folder of the document management server 5 selected in step S2105 (step S2106). After transmitting the file, the computer 3 receives billing information from the document management server 5 and displays the received billing information on the display screen (step S2107).

In addition, at the time of using the function of "register from PC", various kinds of setting screens that can set the saved file to make it possible to set a file registration option, similar to the aforementioned "register from MFP." The following registration options may be settable. Namely, the registration option includes sharing of document (access right is given to all members), history management (file history is managed), registration expiration date (expiration date of the file to be stored is set), mail distribution (mail attached to the file is distributed simultaneously with the registration of the file), acknowledgement (mail with a link of the file is distributed to all members set in the ACL of the relevant file simultaneously with saving the file, and when the member receives the mail and accesses the link destination, acknowledgement mail is sent thereto), registration state information notification ("registration state information mail" is set to be transmitted simultaneously with saving the file, and when there is an operation of the relevant file, such mail is notified to all members set in the ACL), and the like.

Moreover, when the history management is selected as the registration option, the history of the file saved in the document management server 5 can be managed. In other words, at the time of registering the aforementioned selected file, when a predetermined operation (for example, a right click of a mouse) is input in a state that the file saved in the document management server 5 is selected, a list of the document history is displayed.

An explanation will be next given of the function of "reference from PC." "Reference from PC" is a function that displays the file saved in the document management server 5 on the display of the computer 3.

Figure 22:
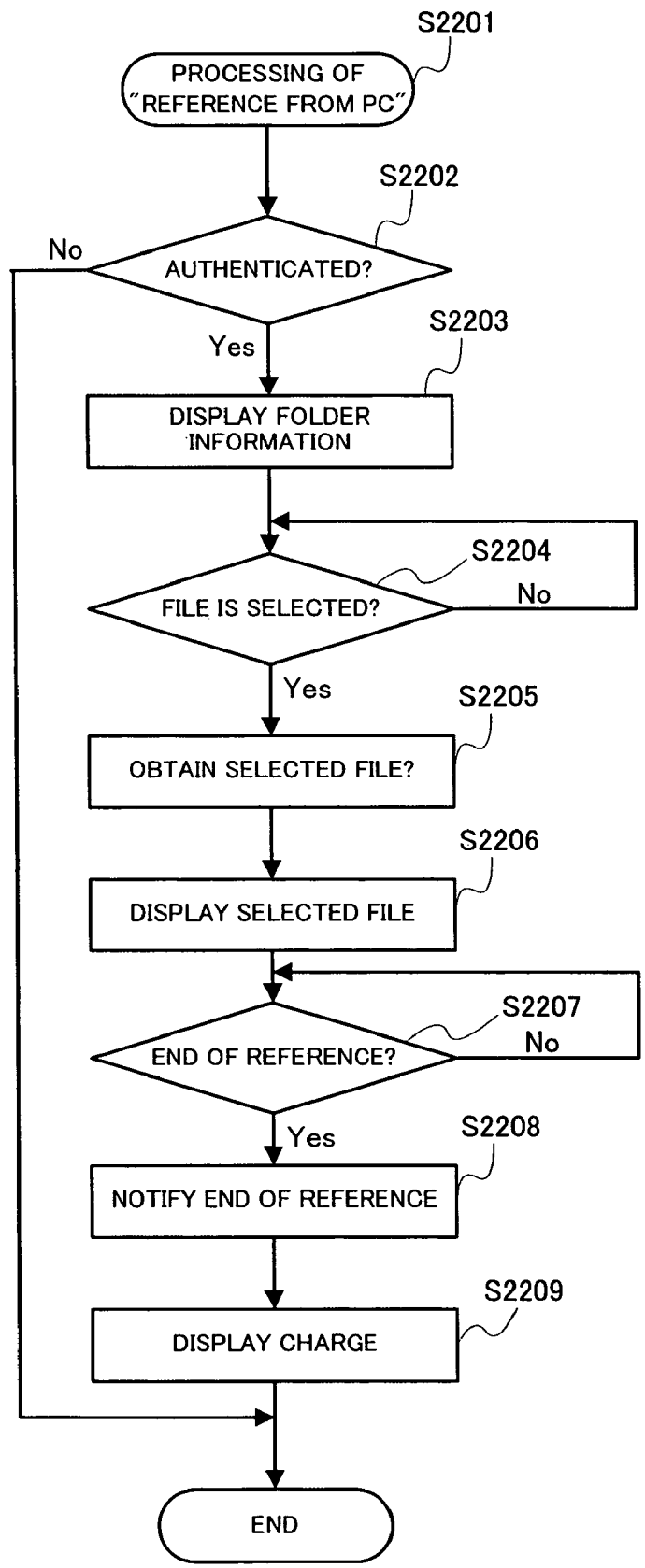
FIG. 22 is a flowchart explaining the processing of "reference from PC"

The following will explain the function of "reference from PC" of the MFP 1 using FIG. 22.

When detecting that "reference from PC" is selected on the aforementioned function selection screen, the computer 3 starts processing of "reference from PC" (step S2201), and determines whether authentication is OK (step S2202). Then, when determining that authentication is OK (step 2202: Yes), the computer 3 displays a screen for selecting a file. Namely, the MFP 1 displays a list of referential electronic folders authenticated in step S2202 (step S2203). On the other hand, when determining that authentication is NG (step S2202: No), processing of "reference from PC" is ended. Then, the computer 3 determines whether the file is selected (step S2204). After that, when determining that the file is selected (step S2204: Yes), the computer 3 obtains the file from the document management server 5 (step S2205). On the other hand, when determining that no file is selected (step S2204: No), the computer 3 returns the screen to the file selection screen. Then, the computer 3 starts up software such as a predetermined viewer to display the contents of the file obtained in step S2205 (step S2206). The computer 3 determines whether a signal indicating the end of file reference is received (step S2207). Then, when determining that the signal indicating the end of file reference is received (step S2207: Yes), the computer 3 notifies the document management server 5 of the end of file reference (step S2208). On the other hand, when determining that no signal indicating the end of file reference is received (step S2207: No), the computer 3 returns the screen to the file contents displaying screen. After that the computer 3 receives billing information from the document management server 5 and displays a charge on the display screen (step S2209).

Additionally, at the time of using the function of "reference from PC", various kinds of setting screens that can set the file as illustrated in FIGS. 15G to 15J are displayed. The same registration option as used in the aforementioned function of "registration from PC" can be set. Namely, sharing of document, history management, registration expiration date, mail distribution, acknowledgement, registration state information notification, and the like may be set. Also, likewise, when the member of organization membership selects the history management as the registration option, he/she can cyclically manage the file saved in the document management server 5. Namely, similar to "the time of registering the file from PC", at the time of referencing the aforementioned selected file, when a predetermined operation (for example, a right click of a mouse) is input in a state that the file saved in the document management server 5 is selected, a list of the document history is displayed.

An explanation will be next given of the function of "extract from PC." "Extract from PC" is a function that saves the file saved in the document management server 5 in the computer 3.

Figure 23:
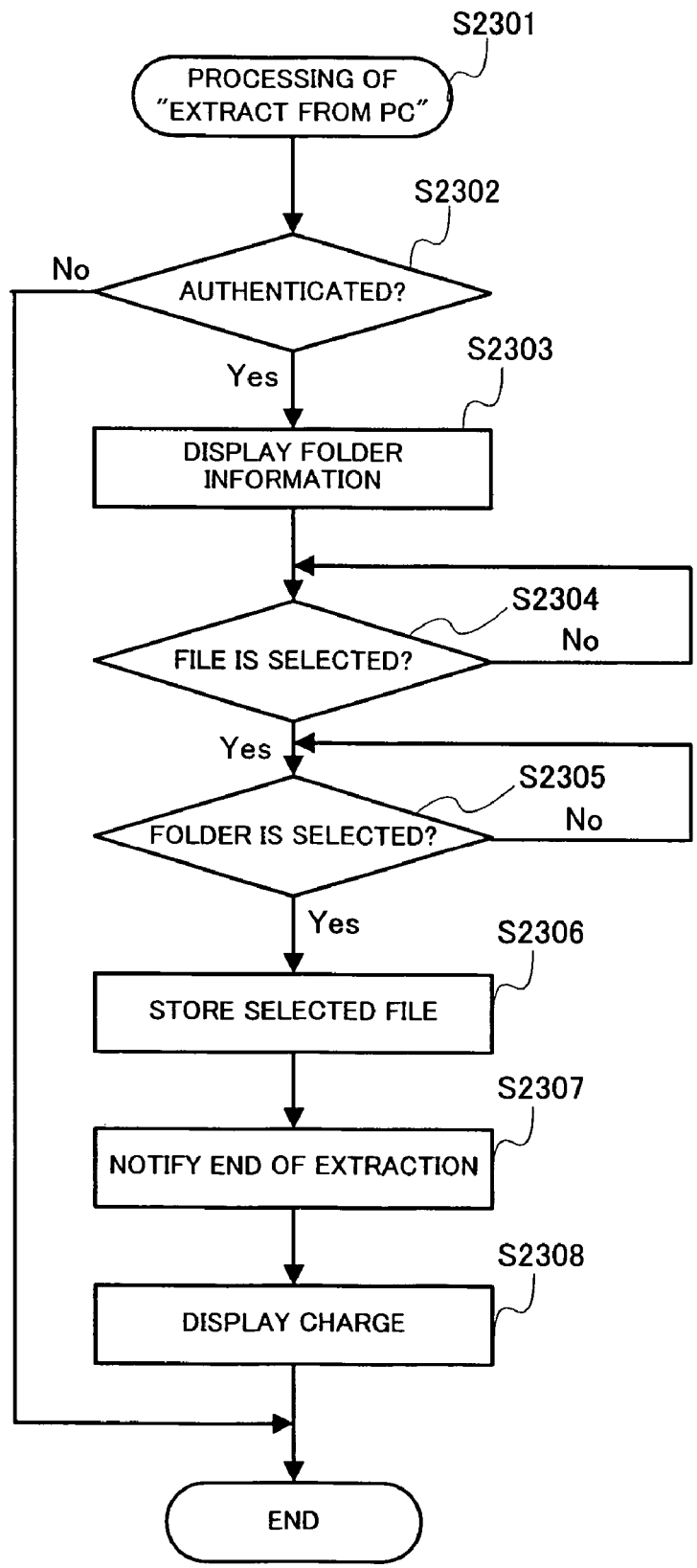
FIG. 23 is a flowchart explaining the processing of "extract from PC"

The following will explain the function of "extract from PC" of the MFP 1 using FIG. 23.

When detecting that "extract from PC" is selected on the aforementioned function selection screen, the computer 3 starts processing of "extract from PC" (step S2301), and determines whether authentication is OK (step S2302). Then, when determining that authentication is OK (step 2302: Yes), the computer 3 accesses the document management server 5 and displays folder information (step S2303). On the other hand, when determining that authentication is NG (step S2302: No), processing of "extract from PC" is ended. Sequentially, the computer 3 displays a screen for selecting a file. Namely, the MFP 1 displays a list of referential folders authenticated in step S2302. Then, the computer 3 determines whether the file is selected (step S2304). After that, when determining that the file is selected (step S2304: Yes), the computer 3 displays a screen where a folder that stores the file can be selected or receives an input of a folder of a storage destination, to determine whether any such folder is selected (step S2305). On the other hand, when determining that no file is selected (step S2304: No), the computer 3 returns the screen to the file selection screen. When determining that a folder is selected (step S2305: Yes), the computer 3 stores the file in the folder selected from the document management server 5 (step S2306). On the other hand, when determining that no folder is selected (step S2305: No), the computer 3 returns the screen to the folder selection screen. After obtaining the relevant electronic file, the computer 3 notifies the document management server 5 of the completion of obtaining the file (step S2307). After that, the computer 3 receives billing information from the document management server 5 and displays a charge on the display screen (step S2308).

An explanation will be next given of the function of "delete from PC." "Delete from PC" is a function that deletes the file saved in the document management server 5.

Figure 24:
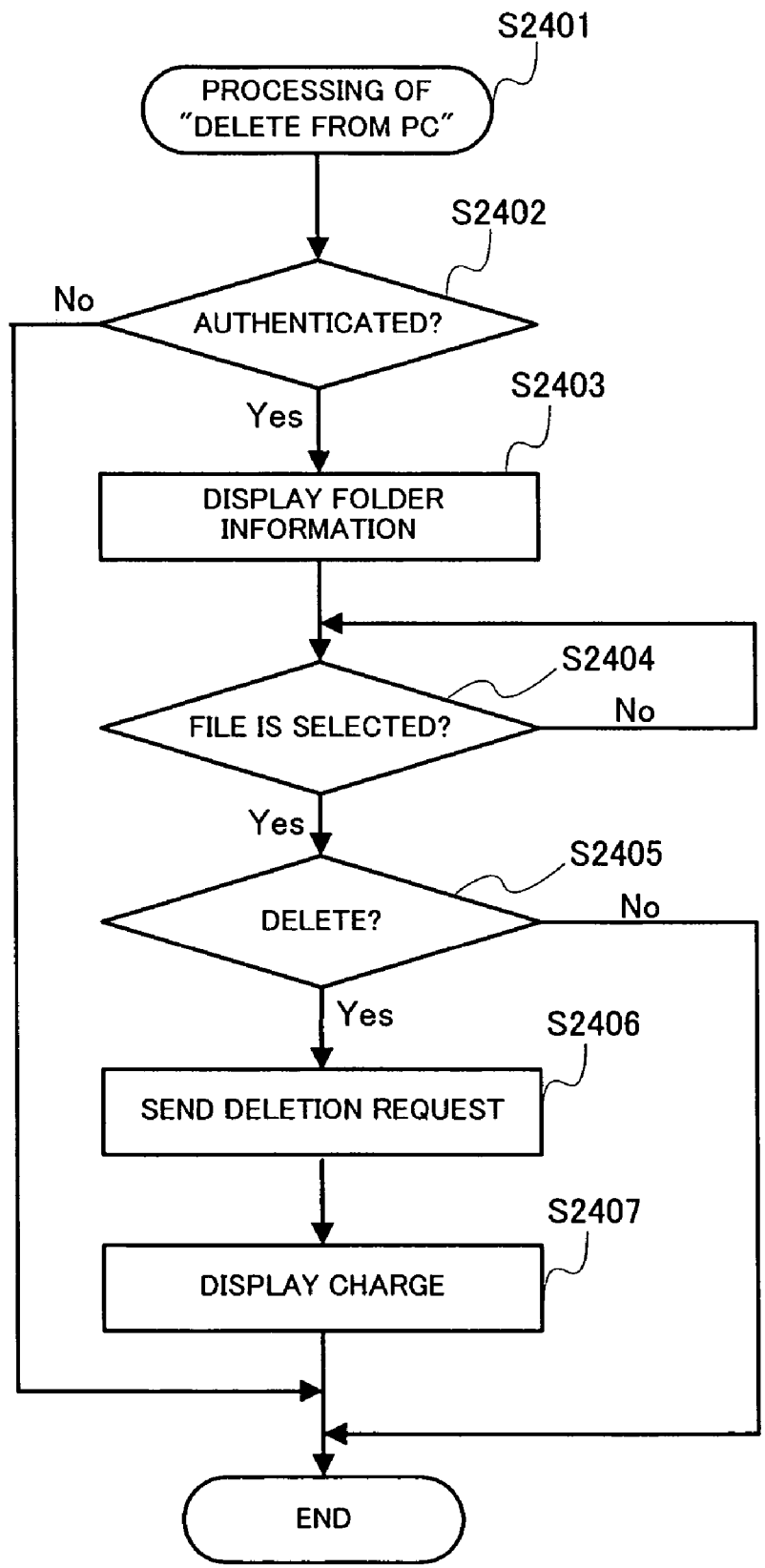
FIG. 24 is a flowchart explaining the processing of "delete from PC"

The following will explain the function of "delete from PC" of the MFP 1 using FIG. 24.

When detecting that "delete from PC" is selected on the aforementioned function selection screen, the computer 3 starts processing of "delete from PC" (step S2401), and determines whether authentication is OK (step S2402). When determining that authentication is OK (step 2402: Yes), the computer 3 accesses the document management server 5 and displays folder information (step S2403). On the other hand, when determining that authentication is NG (step S2402: No), processing of "delete from PC" is ended. Sequentially, the computer 3 displays a screen for selecting a file. Namely, the MFP 1 displays a list of referential folders authenticated in step S2402. Then, the computer 3 determines whether the file is selected (step S2404). When determining that the file is selected (step S2404: Yes), the computer 3 displays a screen for confirming whether the file should be really deleted and waits for user input. Then, the computer 3 determines whether deletion on the confirmation screen is designated (step S2405), and when determining that the deletion is designated (step S2405: Yes), the computer 3 sends a request for deleting the file to the document management server 5 (step S2406). Then, after the relevant electronic file is deleted by the document management server 5, the computer 3 receives billing information from the document management server 5 and displays a charge on the display screen (step S2407). On the other hand, when determining that the deletion is not designated (step S2405: No), the computer 3 ends the processing of "delete from PC."

(Logoff)

When receiving billing information of each of services of "register", "print", "reference", and "extract", the computer 3 displays the function selection screen shown in FIG. 15C and waits for user operation. When the user desires to log off, software may be ended.

In addition, the document management server 5 in the present document management system includes an authentication section that authenticates a member of the membership organization, and provides authentication to the user of the computer 3 when the user uses each function (register, reference, print) of the document management system. This makes it possible for the document management server 5 to obtain the history of using information of the member of the membership organization and suitably charge the membership organization.

For example, at the time of registering the file to the document management server 5 and printing the file, when the user uses each function of registration and printing, the document management server 5 generates billing information for each function of registration and printing. Also, even in a case where the storage media is attached to the MFP 1 and the file saved in the storage media is printed, when the print function is selected from the computer 3, authentication to the document management server 5 is performed.

Moreover, in the case where the print function is used by the MFP 1, when printing of all pages is completed, the MFP 1 sends a notification indicating the completion of print function to the document management server 5. When receiving the notification of completion, the document management server 5 generates billing information. As mentioned above, since billing information is not generated every time when a page is printed, printing is performed speedily. However, when the network cable of the MFP 1 is disconnected in the course of operation, a charge cannot be appropriately made. In order to prevent this problem, when printing of each page is completed, the MFP 1 may send a notification indicating the completion of page printing to the document management server 5. This makes it possible to appropriately make a charge although the printing speed drops.

Moreover, for example, when the document management system is used from the computer 3, a standard browser installed into the computer 3 is not used. Dedicated software using the present document management system is provided. This is because the document managing server 5 obtains situations where the computer 3 uses each function of the document management system to make a charge for each function at the time of using each function.

Still moreover, at the time of using the "reference" function, when the reference function is completed, the computer 3 sends a notification indicating the completion of reference function to the document management server 5. The document management server 5 generates billing information upon reception of the notification of completion. However, when the reference function is used for a long time, for example, the MFP 1 will be occupied. In order to prevent this problem, the MFP 1 may send a notification to the document management server 5 every utilization time of the reference function (for example, every 10 seconds) to make a charge according to the utilization time of the reference function.

Furthermore, time for which the reference function can be used may be limited (for example, up to three minutes). Still furthermore, the reference function may be ended when the operation (for example, movement, rotation, enlargement, reduction, etc.) of the reference function is not input for a fixed time (for example, up to three minutes).

An explanation will be next given of a preferable embodiment of the function of "register from MFP."

An explanation will be given of error processing when the function of "register from MFP" in connection with the file from the MFP 1 is set and "mail distribution" is set as the registration option.

When detecting an error (e.g., file transmission is interrupted during transmission) in saving the file in the document management server 5 using the function of "register from MFP", the document management server 5 sends a notification indicating error to the MFP 1.

Moreover, when detecting the presence of an error, for example, "Request timeout", the mail distribution manger of the document management server 5 accesses the membership list manager and obtains an e-mail address corresponding to the member who has set the option of "mail distribution." Then, the mail distribution manger of the document management server 5 creates mail for notifying a transmission destination where an error occurs (e.g., a mail distribution to a transmission destination cannot be made, etc.) and sends the created mail and e-mail address information to the mail server. This configuration makes it possible to appropriately notify an error message to the user.

An explanation will be next given of a preferable embodiment of the function of "reference from MFP."

The displayed contents can be rotated every 90 degrees at the time of referring to the displayed contents on LCD 22 of the MFP 1. A method for rotating the displayed contents at 90 degrees may be carried out by the application installed into the MFP 1 or the image processor that handles secondary data. However, the method can be more efficiently carried out by the image processor since conversion of primary data into secondary data is not needed.

Moreover, a standard for which the displayed contents are rotated at 90 degrees may be either up and down or left and right. However, if the contents are rotated at 90 degrees when they are partially displayed on the display panel, the displayed portion is moved outside of the display panel to make it difficult to view. Accordingly, the standard for 90-degree rotation may be set such that the rotation is made with the center of the portion being currently displayed on the display panel.

It is noted that operations, such as enlargement, reduction, and scroll, of the file displayed on the display panel may be appropriately carried out.

Moreover, at the time of using "reference from MFP" or "print from MFP", when a downloaded file cannot be displayed, information indicating an error may be displayed on the display panel. In this case, the user may determine a file extension (identification information) before the download and display the error on the display panel when the determined file extension is not included in the file extensions handled by the document management system.

Moreover, at the time of using the function of "print from MFP", for example, in the case of a spreadsheet, printing of only the first sheet reduces possibility that useless sheet will be printed. Furthermore, at the time of using the function of "reference from MFP", for example, in the case of a JPEG (Joint Photographic Experts Group) file, if it is intended that only the monochrome display instead of the color display can be selected, the operation is made easy. Still furthermore, at the time of using the function of "print", for example, in the case of a document file, there is a case in which a page is unwantedly printed, so that the number of pages to be printed cannot be estimated. Accordingly, when it is determined that the extension is a document file, the number of paper to be printed may be displayed on the screen in advance or a print preview may be displayed thereon.

An explanation will be next given of a preferable embodiment when the user logins the document management server 5 from the MFP 1 or computer 3.

The MFP 1 or computer 3 may include a simple authentication function. Namely, an OK button for transmission to the document management server 5 is configured not to be displayed unless the predetermined number or more of digits of ID or password is not input. This configuration eliminates useless time consumed when the user erroneously inputs the ID or password to press the OK button and accesses to the document management server 5, and resultantly, the user must wait during this time. Moreover, this makes it possible to reduce the network load.

In the present embodiment, at the time of thus using the service of the document management server 5 from the MFP, (1) service selection (register, reference, print, and the like), and (2) a login are performed in order, and a logoff is forcibly performed after completion of the service. This prevents the user to forget the logoff.

Furthermore, in the present embodiment, both the "registration state information mail" and the "self information mail" can be set to the file. However, in the case where both are set thereto, transmission of both mails will lead to transmission of numerous mails having the same effect of a message and apply a load on the network. For this reason, in the case where both the "registration state information mail" and the "self information mail" are set, only either of two may be configured to be transmitted.

Figure 25:
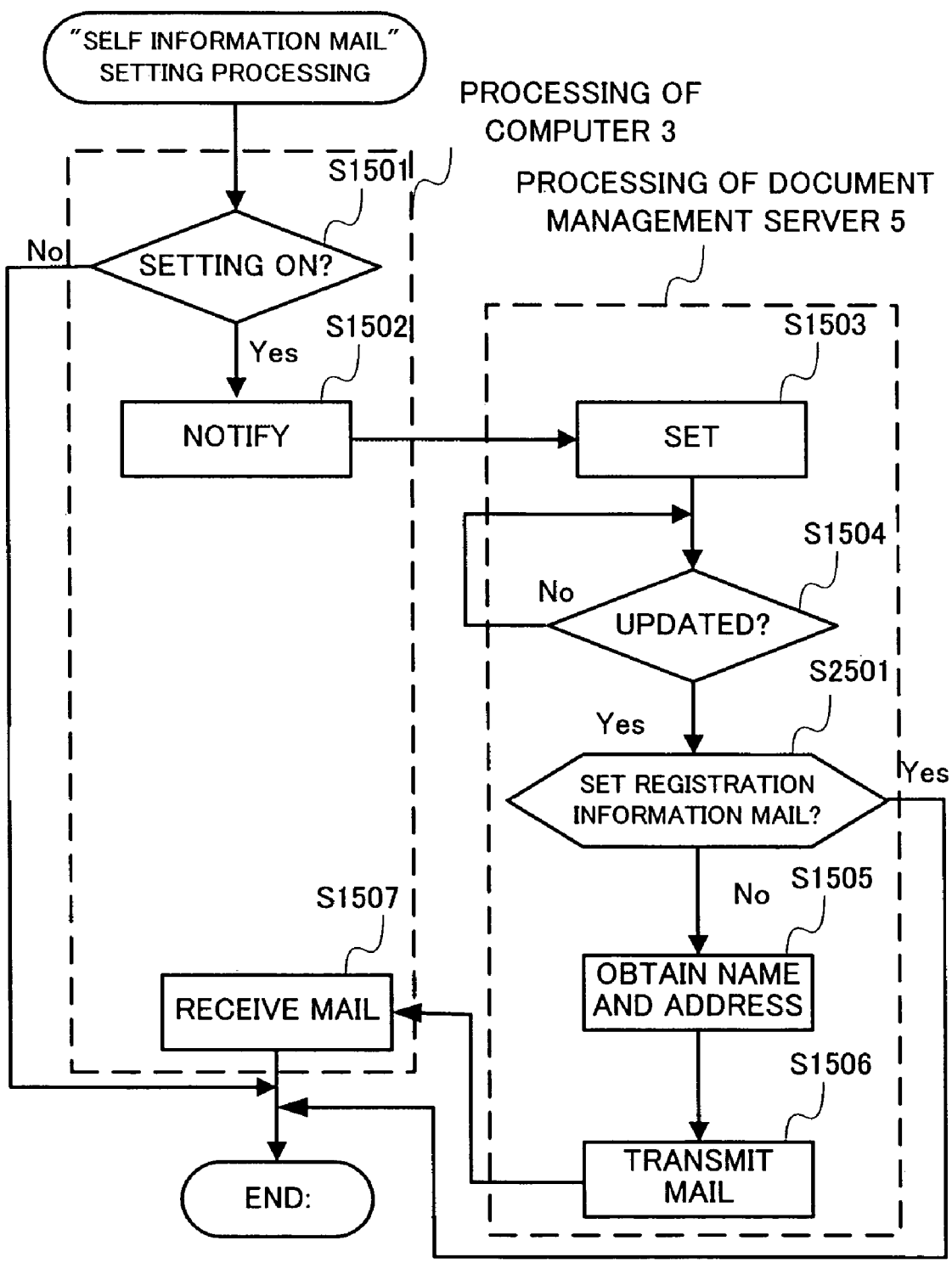
FIG. 25 is a flowchart explaining another example of "self information mail" setting processing.

A specific explanation will be given of processing when both the "registration state information mail" and the "self information mail" are set using FIG. 25. In this example, when the "self information mail" is set to update the file, the document management server 5 determines whether the "registration state information mail" is set in connection with the updated file (step S2501). When the "registration state information mail" is set (step S2501: Yes), the document management server 5 ends the "self information mail setting processing." In this case, the mail contents of both the "registration state information mail" and the "self information mail" are preferably the same. In the case of such setting, even if only either of the "registration state information mail" and the "self information mail" is transmitted, information necessary for the user is notified since both contents are the same, and this makes it possible to prevent user's confusion caused by two same mails.

Figure 26:
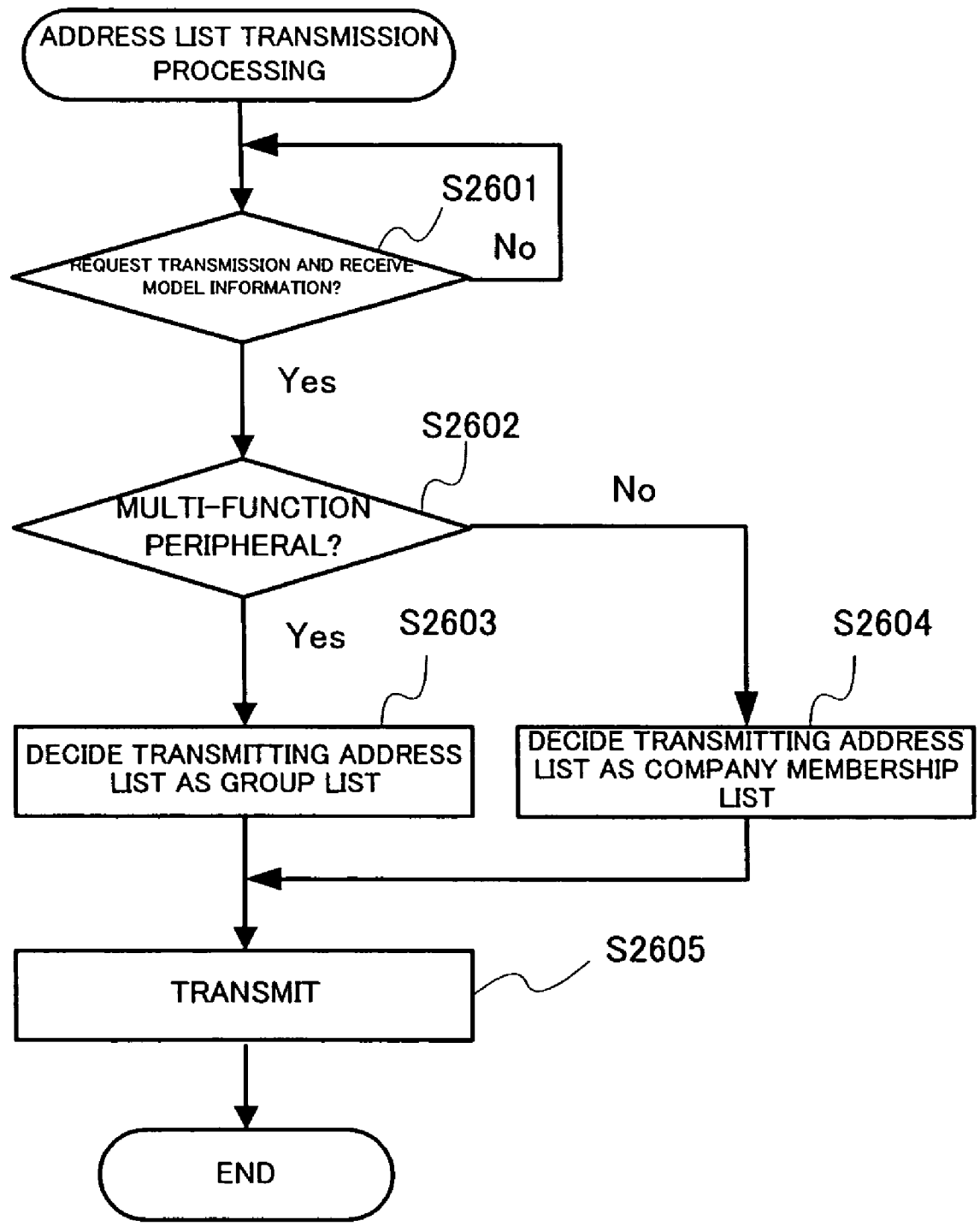
FIG. 26 is a flowchart explaining "address list transmission" processing.

An explanation will be next given of address list transmission processing for transmitting an address list in response to a request from the user using FIG. 26.

First, the control section 110 of the document management server 5 determines whether information of address list transmission request and model information of the MFP 1 or computer 3 are received by user operation (step S2601). When determining that information of transmission request and model information are received (step S2601: Yes), the control section 110 determines whether the received model information is model information of the MFP 1 or that of the computer 3 (step S2602).

Then, when determining that the received model information is model information of the MFP 1 (step S2602: Yes), the control section 110 decides a transmitting address list as a group list (step S2603). On the other hand, when it is not determined that the received model information is model information of the MFP 1 (step S2602: No), the control section 110 decides a transmitting address list as a membership organization list (step S2604). Then, the control section 110 transmits the decided address list to the MFP 1 or computer 3 (step S2505) and ends this processing.

As mentioned above, in the case where the model information is the MFP 1, since the group list is transmitted as the address list, it is possible to provide the address list according to the terminal which the user uses. This eliminates the problem in which the transmitted address list is difficult to view even in the MFP 1 having a small display screen of the LCD 22.

Figure 27:
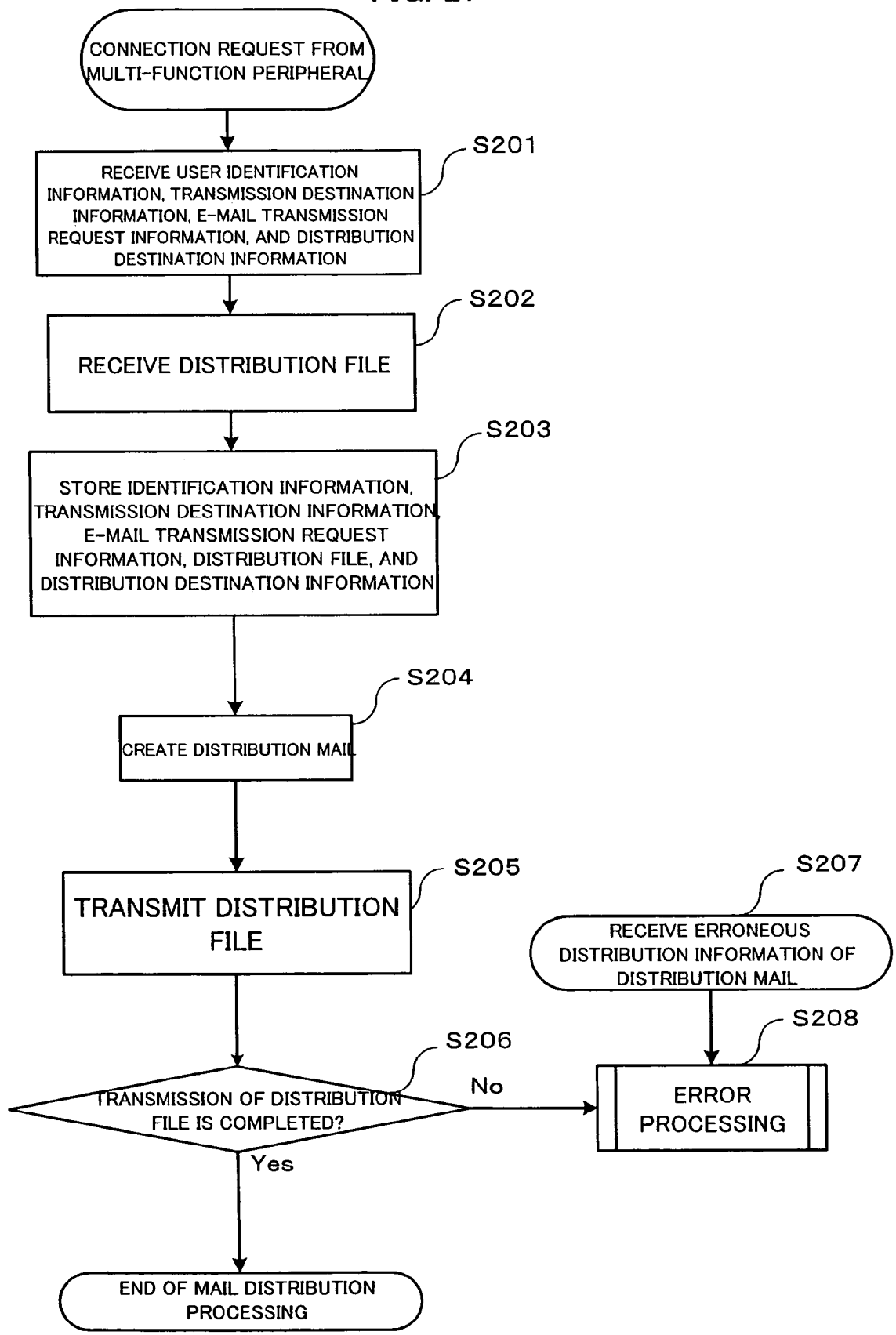
FIG. 27 is a flowchart explaining the processing operation of "mail distribution"

An explanation will be next given of an operation of the document management server 5, which executes mail distribution processing according to the "mail distribution" of the present embodiment with reference to a flowchart of FIG. 27. The mail distribution processing is started according to a request for connection to the Web server connected to the document management server 5 from the MFP 1 when the user inputs address information of a desired transmission destination by the MFP 1. After success of connection to the Web server, the document management server 5 receives user ID (user identification information) input by the user using the MFP 1, an e-mail address (transmission destination information) corresponding to the user ID, e-mail transmission request information, and an e-mail address of a distribution destination of a distribution file (distribution destination information) by use of HTTP (Hyper Text Transfer Protocol) (step S201).

Sequentially, the document (distribution file) created by the MFP 1 is attached to an e-mail and the e-mail with the attachment of the document is transmitted to the document management server 5.

The document management server 5 periodically inquires of the mail server about the presence or absence of a reception of a new mail, and stores the e-mail with the attachment of the document (distribution file) arrived at the mail server in the file storage section 113 (step S202).

When normally receiving the distribution file from the mail server, the document management server 5 stores the received user ID, the e-mail address corresponding to the user ID, the e-mail transmission request information, and the e-mail address of transmission destination in the management information storage section 114 to be associated with one another as illustrated in FIG. 8B (step S203).

Referring back to FIG. 27, the document management server 5 creates an e-mail to which a document is attached using an e-mail address of the distribution destination as an e-mail destination in order to transmit the document (distribution file) to the e-mail address of distribution destination (step S204).

Next, when the mail server completes preparation, the document management server 5 transmits the distribution file thereto (step S205).

Moreover, if the distribution destination information matches a mail address of the user who can share and view the folder and file in the document management server 5, it is possible to transmit link information, which allows the document to be viewed, without attaching the document (distribution file).

Next, the document management server 5 determines whether a signal indicating completion of transmission is received from the mail server (step S206). When receiving no signal (step S206: No), the document management server 5 executes error processing to be described later (step S208). When normally receiving the signal (step S206: Yes), the document management server 5 ends the mail distribution processing. However, there is a case in which the e-mail address of the distribution destination input by the user using the MFP 1 is incorrect due to erroneous input and the like and resultantly the mail server transmits the distribution mail to the incorrect or non-existing distribution destination. In this case, the document management server 5 cannot transmit the distribution mail to the distribution destination and the transmitted distribution mail is returned to the mail server. Even when determining that the distribution mail is returned to the mail server (step S207), the document management server 5 executes error processing to be described later (step S208).

Figure 28:
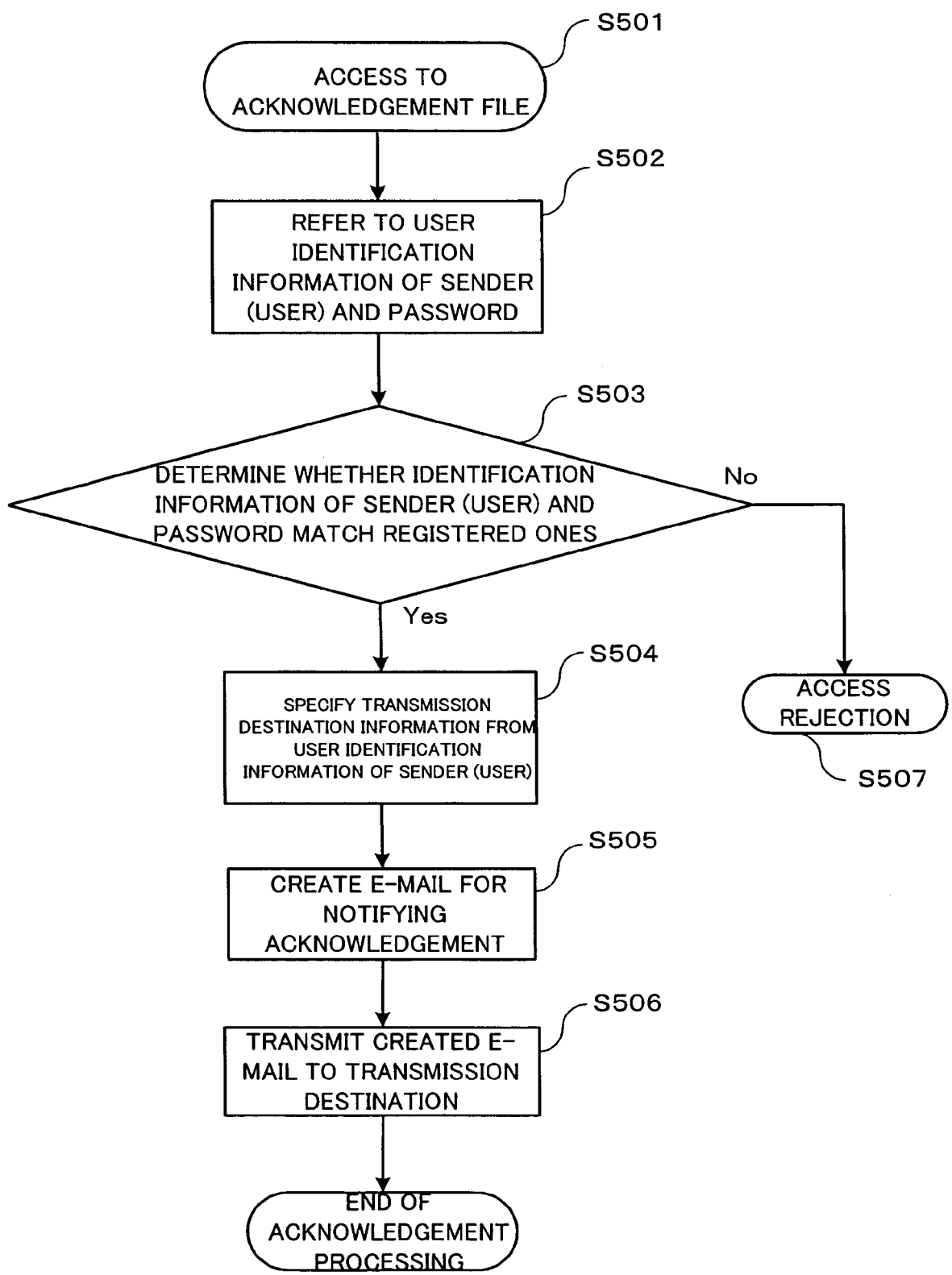
FIG. 28 is a flowchart explaining the processing operation of "acknowledgement"

An explanation will be next given of an operation of the document management server 5, which executes acknowledgement processing according to the "acknowledge" of the present embodiment with reference to a flowchart of FIG. 28. It is possible to add link information to be described later to the distribution mail transmitted by the above-explained mail distribution processing. The e-mail to which the link information is added may be transmitted as a new e-mail different from the distribution mail.

In the link information, there is described URL indicating a file location on a specific Web server to which a recipient, who has received the distribution mail, can gain access via the network. Additionally, in the link information, there is a description in which the recipient gains access to the URL and transmits information, such as user ID of a sender (user identification information) and distribution destination information (for example, electronic mail address) that specifies a distribution destination of the distribution mail, simultaneously.

The document management server 5 starts acknowledgment processing when the recipient of the distribution mail gains access to a file in the aforementioned link information destination (step S501). At this time, the Web server connected to the document management server 5 refers to the user ID of the sender of the distribution file sent simultaneously with the access and the distribution destination information that specifies the distribution destination of the distribution mail (step S502). The document management server 5 determines whether data matching the referenced user ID and distribution destination information are stored in the file storage section 113 (step S503). At this time, when there is no data matching the user ID and distribution destination information referenced in step S502 (step S503: No), the document management server 5 transmits an instruction, which indicates rejection of access to the file on the Web server, to the Web server connected to the document management server 5 (step S507). On the other hand, when there is the matching data (step S503: Yes), the document management server 5 specifies an e-mail address of the sender associated with the user referenced in step S502 from among various information stored in the management information storage section 114 as shown in FIG. 8B (step S504). The document management server 5 uses the e-mail address specified in step S504 as an e-mail destination and creates an e-mail with an attachment of a document indicating that the recipient of the distribution file has confirmed the reception (step S505). For example, an electronic mail as shown in FIG. 10B is created. The document management server 5 transmits this created e-mail to the sender of the distribution file via the mail server (step S506). At this time, the document management server 5 ends the acknowledgement processing upon receiving the signal indicating completion of transmission from the mail server.

Figure 29:
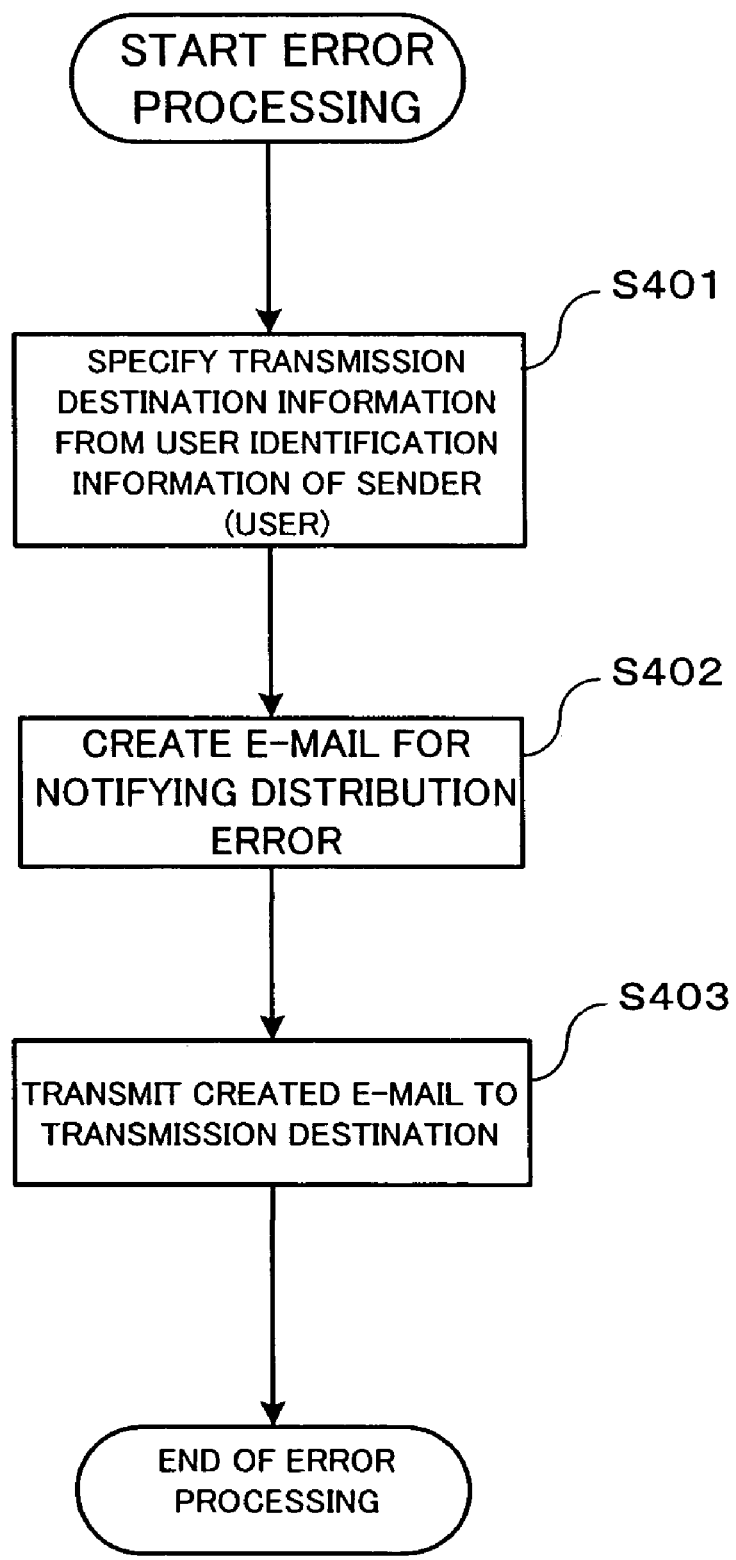
FIG. 29 is a flowchart explaining the processing operation of "error processing"

An explanation will be next given of an operation of the document management server 5 in connection with error processing in the present embodiment with reference to a flowchart of FIG. 29.

As mentioned above, in some cases, the document management server 5 cannot receive the signal indicating completion of transmission from the mail server even when the document management server 5 requests the transmission to the distribution destination of the mail server and transmits the distribution file.

Moreover, there is a case in which the e-mail address of the distribution destination input by the user using the MFP 1 is incorrect due to erroneous input. At this time, the mail server transmits the distribution mail to the incorrect or non-existing distribution destination and the transmitted distribution mail is returned to the mail server.

Figure 30:
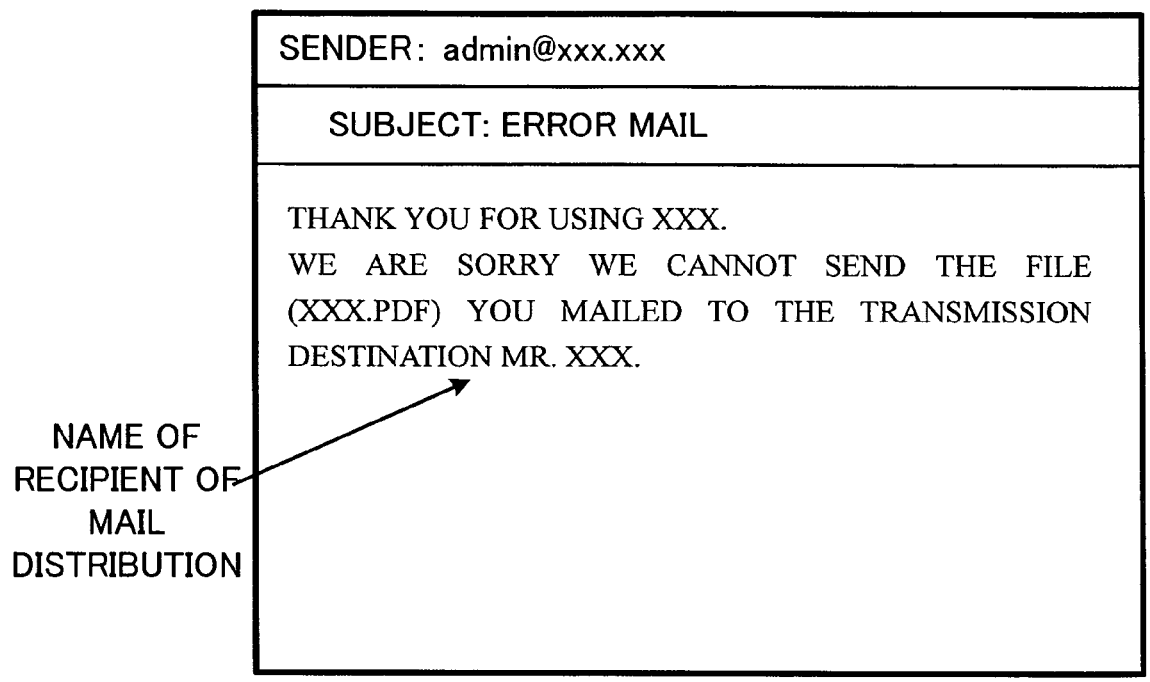
FIG. 30 is a view illustrating one example of e-mail to be created for "error notification"

In the above two cases, the document management server 5 starts error processing. At this time, the document management server 5 specifies an e-mail address of the sender associated with the user ID of the sender stored in the file storage section 113 based on the user ID of the sender (user identification information) (step S401). The document management server 5 uses the e-mail address specified in step S401 as an e-mail destination and creates an e-mail with an attachment of a document indicating that the distribution file cannot be transmitted (step S402). For example, an electronic mail as shown in FIG. 30 is created. The document management server 5 transmits this created e-mail to the sender of the distribution file via the mail server (step S403). At this time, the document management server 5 ends the error processing upon receiving a signal indicating completion of transmission from the mail server.

Figure 31:
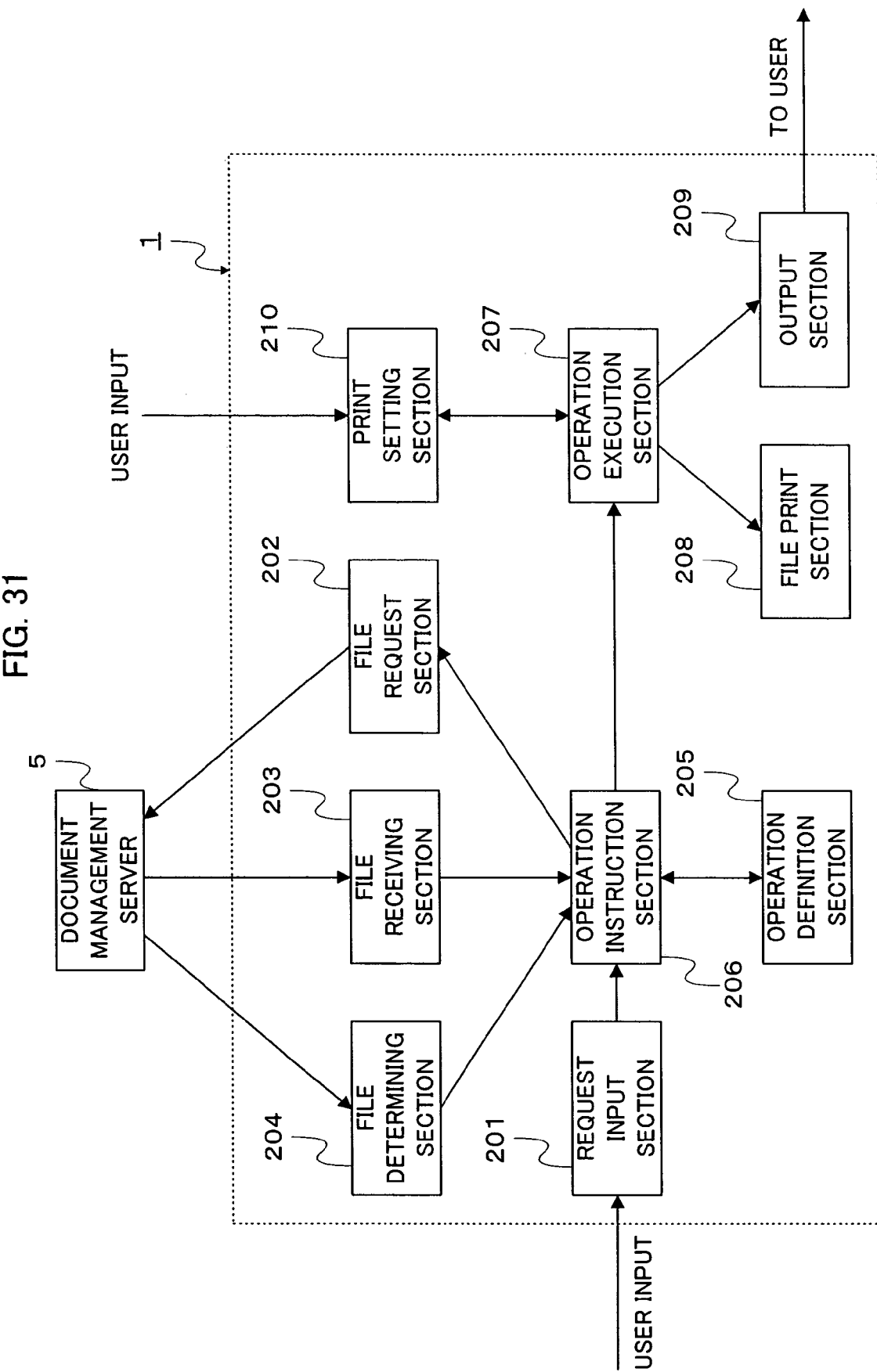
FIG. 31 is a view explaining an operation that a control section of an information terminal apparatus (MFP) performs.

An explanation will be next given of an operation that the control section 10 of the MFP 1 according to the present embodiment performs using FIG. 31. It is noted that the contents to be explained below give details on the operation the MFP 1 performs in the aforementioned "print from MFP."

The control section 10 includes a request input section 201, a file request section 202, a file receiving section 203, a file determining section 204, an operation definition section 205, an operation instruction section 206, an operation execution section 207, a file print section 208, an output section 209, and a print setting section 210.

The request input section 201 receives information input from the user using the touch panel 23 connected to the I/F 15. Also, the request input section 201 receives information input from the computer 3 connected to the network 4. For example, the request input section 201 receives a request for printing an electronic file stored in the document management server 5 using the MFP 1 from the computer 3 connected to the network 4.

The file request section 202 requests the document management server 5 to transmit an electronic file designated from the electronic files stored in the document management server 5 to the MFP 1 using the communication function that the communications section 16 has.

The file receiving section 203 receives the electronic file requested by the file request section 202 using the communication function that the communications section 16 has. Or, the file receiving section 203 receives information indicating the absence of the relevant electronic file when there is no electronic file requested by the file request section 202 in the document management server 5.

When the file receiving section 203 receives the electronic file, the file determining section 204 extracts information for identifying the relevant electronic file from the relevant electronic file and determines a file format of the relevant electronic file. After that, the file determining section 204 inputs the determined result to the operation instruction section 206.

In the present embodiment, the file determining section 204 uses a filename extension portion of the relevant electronic file as information for identifying the relevant electronic file to be extracted from the electronic file. Also, when lowercase alphabetic characters are used in a character string of the extension portion, the file determining section 204 determines that this is equivalent to the case when uppercase alphabetic characters are used.

It is noted that the file determining section 204 may determine the file format of the relevant electronic file by distinguishing the uppercase and lowercase alphabetic characters.

Generally, in the filename extension portion of the electronic file, a predetermined character string is used by depending on an application software (specifically, for example, spreadsheet software, word processing software, etc.) to be used. Accordingly, the character string of the relevant extension portion is determined, thereby making it possible to determine a file format of the electronic file and application software for which the electronic file is used.

For example, it is assumed that the file name of the electronic file is "abc.txt." In this case, the extension portion corresponds to a portion after a dot mark "." (namely, in this case "txt"). Then, the file determining section 204 can determine that the electronic file has a file format created by application software (in this case, for example, text editor, etc.) corresponding to the extension portion "text."

It is noted that information for identifying the relevant electronic file, which the file determining section 204 extracts from the electronic file, is not limited by the present invention. For example, when the file of the electronic file is "abc.txt", there may be used a method in which the file format is determined by the top one character of the file name ("a" in this case).

The operation definition section 205 prestores information indicating that predetermined processing is performed in accordance with the file format of the electronic file that the file determining section 204 determines. In addition, information that the operation definition section 205 stores is stored in the storage device such as HDD 13 and the like.

For example, FIG. 32 is a view illustrating an example of information that the operation definition section 205 stores. As illustrated in this figure, when the extension portion is "xyz", the operation definition section 205 stores formation that defines an operation in which "an electronic file is opened by spreadsheet software to print only the first sheet."

It is noted that information to be stored in the operation definition section 205 is not limited to logical-related information indicating a predetermined operation defined as in this figure. For example, such information may be composed of an executable statement indicating a specific operational instruction, a mathematical expression, and the like.

The operation instruction section 206 provides an instruction of a predetermined operation to the operation execution section 207 based on the file format of the electronic file determined by the file determining section 204 and information stored in the operation definition section 205.

For example, it is assumed that the file name of the electronic file is "abc.txt." The file determining section 204 determines that the relevant electronic file has a file format indicated by the extension portion "txt". On the other hand, the file determining section 204 inputs information, which indicates that the operation corresponding to the extension portion "txt" is that "file is opened by the text editor and printed", from the operation definition section 205. In this case, the operation instruction section 206 instructs the operation execution section 207 to open the file "abc.txt" by the text editor and print the file.

The operation execution section 207 performs the operation instructed by the operation instruction section 206. Also, the operation execution section 207 is configured in such a way that predetermined application software can be executed in advance to execute a predetermined operation defined by the operation definition section 205. For example, when an operation "file is opened by the text editor and printed" is defined as one of operations defined by the operation definition section 205, the operation execution section 207 is configured in such a way to start the text editor to be executed in advance. Namely, in this case, in the MFP 1, the text editor is preinstalled into the HDD 13 and the like and the operation execution section 207 starts the text editor to be executed.

For example, it is assumed that the operation execution section 207 inputs information indicating "the electronic file "abc.txt" is opened by the text editor and printed" that is instructed by the operation instruction section 206. In this case, first, the operation execution section 207 starts the preinstalled text editor and opens the electronic file "abc.txt." Next, the operation execution section 207 inputs data contents contained in the electronic file "abc.txt" to the file print section 208 to print the data contents.

The file print section 208 inputs print data to the printer device included in the print section 18 to print the print data on paper.

The output section 209 displays the operation result obtained by the operation execution section 207 on the LCD connected to the I/F 15 in accordance with the instruction of the operation execution section 207. Or, the output section 209 outputs the operation result to the computer 3 connected to the network 4. Namely, the user can recognize the operation state of the MFP 1 by the message displayed on the LCD 22 connected to the I/F 15 or the message output to the computer 3 connected to the network 4.

The print setting section 210 receives an input of print setting, which is input by the user using the input device connected to the I/F 15, in order that the file print section 208 causes the printer section 18 to perform printing. Moreover, the print setting section 210 inputs information, indicating the contents of the print setting, to the operation execution section 207. Then, the file print section 208 causes the printer section 18 to perform printing in accordance with the contents of the print setting.

For example, it is assumed that the user inputs information of the print setting indicating that the electronic file is printed on paper with a predetermined paper size (for example, A4 paper in vertical orientation, A3 paper in horizontal orientation, etc.). In this case, the print setting section 210 inputs information of the relevant print setting to the operation execution section 207. Then, the operation execution section 207 changes the paper size to a predetermined paper size to cause the file print section 208 to print the relevant electronic file.

Figure 33:
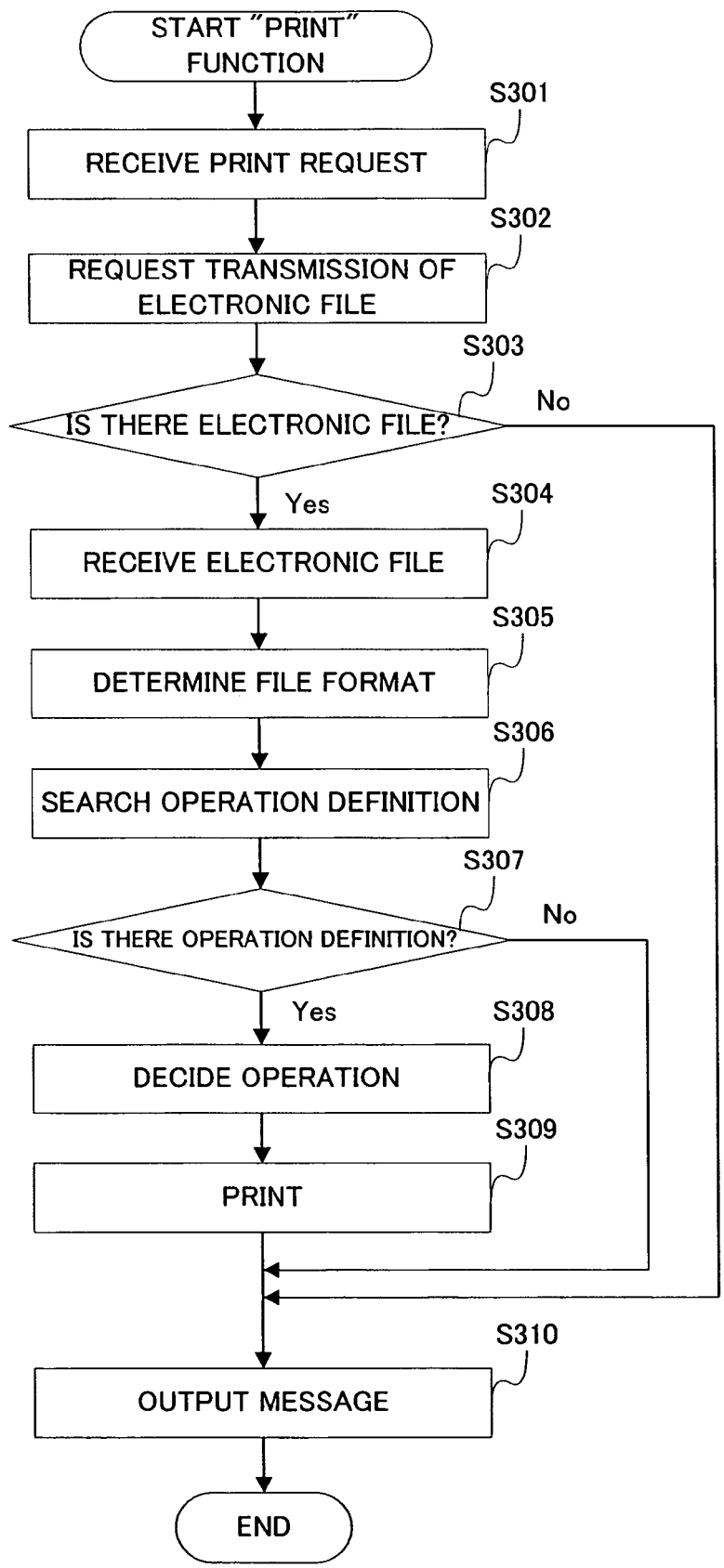
FIG. 33 is a flowchart illustrating the operation of the information terminal apparatus (MFP)

An explanation will be next given of an operation of the MFP 1 according to the present embodiment. FIG. 33 is a flowchart explaining the operation that the control section 10 of the MFP 1 according to the present embodiment performs. Additionally, in the present embodiment, the MFP 1 prints the electronic file stored in the document management server 5 based on information predefined by the operation definition section 205. The detailed explanation will be given as follows.

First, the request input section 201 receives a request for printing the electronic file stored in the document management server 5 from the computer 3 connected to the network 4 (step S301). For example, the user outputs a request for printing the electronic file stored in the document management server 5 using the MFP 1 from an operation screen of the computer 3 connected to the network 4. Moreover, when receiving the print request of the relevant electronic file, the request input section 201 inputs the print request to the operation instruction section 206.

When the print request is input, the operation instruction section 206 instructs the file request section 202 to obtain the electronic file requested to be printed from the document management server 5.

When the instruction is input by the operation instruction section 206, the file request section 202 requests the document management server 5 to transmit the electronic file requested to be printed to the MFP 1 (step S302).

Then, the file request section 202 determines whether there is the requested file in the document management server 5 (step S303). When the file request section 202 determines that there is the requested file in the document management server 5 (step S303: Yes), the file receiving section 203 receives the file from the document management server 5. Or, when the file request section 202 determines that there is no requested file in the document management server 5 (step S303: No), the file receiving section 203 receives information indicating the absence of the file.

Then, when there is no requested file in the document management server 5 (step S303: No), the file receiving section 203 notifies the operation instruction section 206 that no file requested to be printed is stored in the document management server 5 (step S310). The operation instruction section 206 reads an operation definition for which the file requested to be printed is absent from the operation definition section 205 and obtains information indicating the corresponding predetermined operation definition.

For example, when there is no electronic file requested to be printed, the file receiving section 203 inputs a blank (absence) as a character string indicating the extension portion. Then, when the character string indicating the extension portion is the blank (absence), the operation definition of "notify the absence of file" as shown in FIG. 32 is stored in the operation definition section 205. Accordingly, the operation instruction section 206 instructs the operation execution section 207 to perform the operation of, for example, "notify the absence of file." Or, when the absence of the electronic file requested to be printed is input from the file receiving section 203, the operation instruction section 206 may be configured in advance in such a way to perform a predetermined operation, e.g., "notify the absence of file."

On the other hand, when there is the electronic file in the document management server 5 (step S303: Yes), the file receiving section 203 receives the relevant electronic file from the document management server 5 (step S304). After that, the file receiving section 203 inputs the received electronic file to the operation instruction section 206.

Moreover, the file determining section 204 extracts information for identifying the relevant electronic file from the electronic file and determines a file format of the relevant electronic file (step S305).

For example, it is assumed that the file name of the electronic file is "abc.txt." In this case, the file determining section 204 extracts the extension portion "txt" of the electronic file and determines that the extracted extension is a file format created by the corresponding application software (in this case, for example, text editor). After that, the file determining section 204 inputs the determination result including information, which indicates the extension portion, to the operation instruction section 206.

Additionally, the extension portion of the electronic file may include various kinds of marks such as number, under bar "_", "#", "$", etc. in addition to the character.

The operation instruction section 206 searches a corresponding operation definition from information stored in the operation definition section 205 based on the determination result input from the file determining section 204 (step S306). After that, the operation instruction section 206 obtains the corresponding predetermined operation definition from the operation definition section 205. Or, the operation instruction section 206 obtains information indicating the absence of corresponding operation definition from the operation definition section 205 (step S307).

When there is no corresponding operation definition (step S307: No), the operation instruction section 206 causes the output section 209 to output a message indicating the absence of the electronic file to the operation execution section 207 (step S310), and ends print processing.

When there is the corresponding operation definition (step S307: Yes), the operation instruction section 206 decides an operation to be instructed to the operation execution section 207 based on the corresponding operation definition (step S308). After that, the operation instruction section 206 provides the instruction of the operation to the operation execution section 207.

When the operation is instructed by the operation instruction section 206, the operation execution section 207 performs the operation according to the relevant instruction (step S309). Namely, in this case, the operation execution section 207 causes the file print section 208 to print the contents of the electronic file. After that, the operation execution section 207 causes the output section 209 to display the message indicating that the contents of the electronic file are printed (step S310), and ends the print processing.

More specifically, the following will explain the operation when the computer 3 connected to the network 4 makes a request for printing an electronic file with a file name of "abc.xyz" among the electronic files stored in the document management server 5.

First, when receiving the print request of the electronic file, "abc.xyz", (step S301), the request input section 201 inputs the print request to the operation instruction section 206. The operation instruction section 206 causes the file request section 202 to obtain the electronic file, "abc.xyz", from the document management server 5. The file request section 202 requests the document management server 5 to transmit the electronic file "abc.xyz" (step S302).

When there is the electronic file, "abc.xyz", in the document management server 5 (step S303: Yes), the file receiving section 203 receives the electronic file, "abc.xyz", (step S304) and inputs the received electronic file, "abc.xyz", to the operation instruction section 206. On the other hand, the file determining section 204 extracts character string data, "abc.xyz", indicating the extension portion of the electronic file, "abc.xyz", to determine a file format (step S305), and input the result to the operation instruction section 206. Or, when there is no electronic file "abc.xyz" (step S303: No), the file receiving section 203 receives information indicating the absence of the electronic file, "abc.xyz", and inputs the result to the operation instruction section 206.

Moreover, when there is the electronic file "abc.xyz" (step S303: Yes), the operation instruction section 206 searches a predetermined operation definition, which corresponds to the file format in which the character string indicating the extension portion is "xyz", from the operation definition section 205 (step S306). At this time, when information stored in the operation definition section 205 is the contents shown in FIG. 32, the operation instruction section 206 obtains information, which is the corresponding operation definition, that is, "the file is opened by the spreadsheet software to print only the first sheet", from the operation definition section 205 (step S307: Yes). After that, the operation instruction section 206 decides an operation to be instructed to the operation execution section 207 (step S308) and instructs the operation execution section 207 to open the electronic file, "abc.xyz", using the spreadsheet software and further print only the first sheet contained in the electronic file, "abc.xyz." The operation execution section 207 opens the electronic file, "abc.xyz", using the spreadsheet software and further extracts data of the first sheet contained in the electronic file, "abc.xyz." and causes the file print section 208 to print the extracted data as print data (step S309). The file print section 208 cases the print section 18 to print data. Then, the operation execution section 207 causes the output section 209 to display the message indicating that only the first sheet contained in the electronic file, "abc.xyz.", (step S310), and ends the print processing.

Or, when there is no electronic file, "abc.xyz", (step S303: No), the operation instruction section 206 searches a predetermined operation definition from the operation definition section 205 (step S310). The operation instruction section 206 obtains information indicating that "absence of file is displayed" from the operation definition section 205. After that, the operation instruction section 206 decides an operation to be instructed to the operation execution section 207 (step S308) and causes the output section 209 to output a message indicating that the electronic file "abc.xyz" is not stored in the document management server 5. Then, the operation execution section 207 causes the output section 209 to output the message indicating that the electronic file "abc.xyz" is not stored in the document management server 5 (step 310), and ends the processing.

Additionally, the operation instruction section 206 may instruct the file print section 208 to process all or partial data of the relevant electronic file and print the processed data, in addition to instructing the print section 208 to extract all or partial data of the electronic file and print the extracted data. For example, in printing an electronic file created in a predetermined file format, the operation instruction section 206 may extract a file name, a print date, a user name who has performed printing, etc., from the relevant electronic file and create a print record to print the electronic file.

As mentioned above, the MFP 1 prints the electronic file stored in the document management server 5 to be associated with the file format of the electronic file.

Moreover, it is possible to further improve the aforementioned print processing. For example, when the file print section 208 causes the print device included in the print section 18 to perform printing on a predetermined printing paper, the operation execution section 207 may notify the user of information of the number papers to be printed or the number of pages to be printed before execution of printing.

For example, it is assumed that the number of pages is notified before printing when the filename extension portion of the electronic file to be printed is "xyx." In this case, information of the contents shown in FIG. 34 may be stored as an operation definition to be stored in the operation definition section 205. Then, the operation execution section 207 causes the output section 209 to display the number of pages and determines whether printing should be performed by user selection before instructing the print section to perform printing. For example, the operation execution section 207 causes the output section 209 to output a message that confirms whether printing should be performed and determines the printing depending on a response (e.g., selection of Yes/No) input from by the user. After that, when determining that printing should be performed, the operation execution section 207 causes the file print section 208 to perform printing. Or, an image that shows a print image may be displayed (previewed) before printing is performed.

Moreover, in the present embodiment, the MFP 1 prints the electronic file stored in the document management server 5 based on information predefined in the operation defining section 205. However, the operation performed by the MFP 1 is not limited to this. For example, the MFP 1 may display (refer to), extract, or delete the electronic file stored in the document management server 5 and cause the document management server 5 to operate the electronic file. Then, for instance, in displaying the contents of the electronic file stored in the document management server 5, user settable items (e.g., designation of the number of colors to be displayed, designation of paper size, etc.) may be decided based on information indicated by the filename extension portion of the relevant electronic file. In this case, the MFP 1 may include the print setting section 210, which receives print setting for which the file print section 208 causes the print section 18 to perform printing (or display setting for which the output section 209 performs outputting), and the operation execution section 207 may decide user settable print setting (or display setting) items based on the file format of the electronic file determined by the file determining section 204. Furthermore, the print setting section 210 may be connected to the display device that displays the user settable print setting (or display setting) items.

For example, when the filename extension portion of the electronic file to be displayed is "JPG", data contained in the relevant electronic file is assumed to be displayed. Moreover, it is also assumed that information to be stored in the operation definition section 205 is the contents shown in FIG. 32. In this case, the operation instruction section 206 obtains information, which is the corresponding operation definition, that is, "make it impossible to select color display and possible to select only monochrome and instruct an image viewer to display data." The operation instruction section 206 makes it impossible for the operation execution section 207 to select color display and makes it possible for the operation execution section 207 to select only monochrome display and further instructs the image viewer to display data. Then, the operation execution section 207 causes the output section 209 to non-display an item for selecting color display among from items, which are settable by the print setting section 210, and to display an item for displaying monochrome display, and further causes the image viewer to display data of the relevant electronic file. As mentioned above, it is possible to decide user settable print setting (or display setting) items based on the file format of the electronic file determined by the file determining section 204.

An explanation will be next given of a preferable embodiment of the function of "reference from MFP." of the MFP 1.

The display capacity of the LCD 22 of the MFP 1 is small as compared with that of the general PC in view of the point that the main function of the MFP 1 lies in printing and the point of the device size. Accordingly, it is necessary to easily display the document on the display having the limited capacity.

Figure 35A:
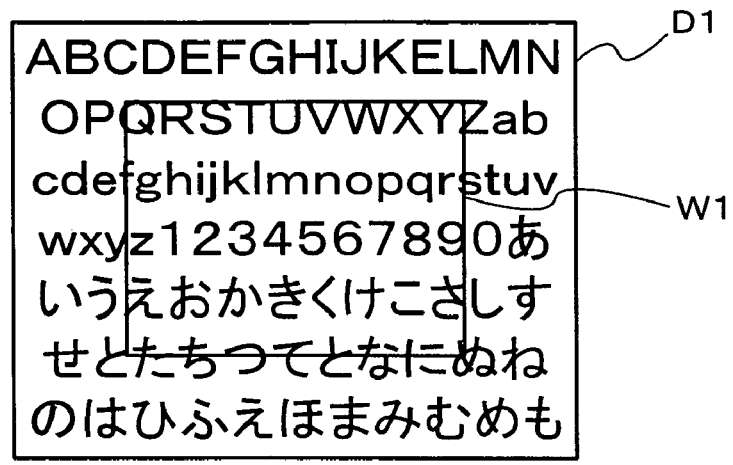
FIG. 35A is a view illustrating a relationship between a document displayed on an LCD of the MFP and a window.
Figure 35B:
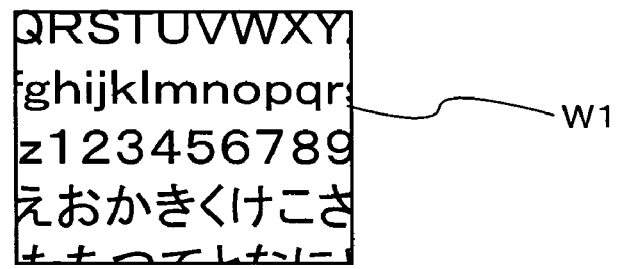
FIG. 35B is a view illustrating a display example of a document displayed in a window.

In order to attain this object, a window W1 is formed on a displaying document D1 as illustrated in FIG. 35A, and the contents of the window W1 are displayed as illustrated in FIG. 35B.

The change in size of the window W1 is arbitrarily possible by the operation of the touch panel 23, and a display magnification of the document is changed based on the window size.

Figure 35C:
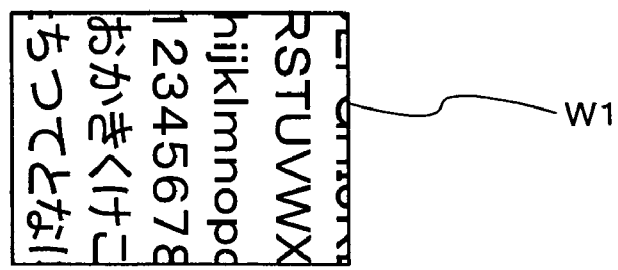
FIG. 35C is a view illustrating a display example of a window when the document is rotated rightward by 90 degrees.
Figure 35D:
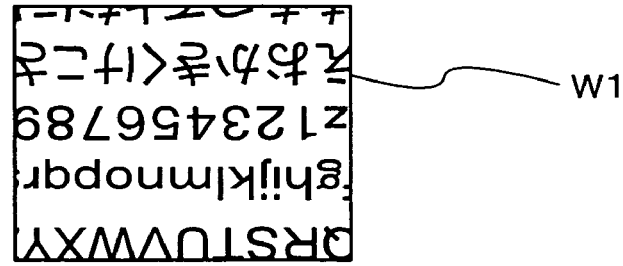
FIG. 35D is a view illustrating a display example of a window when the document is rotated further rightward by 90 degrees.

Moreover, the displayed contents can be rotated every 90 degrees as illustrated in FIGS. 35C and 35D. The 90-degree rotation may be performed by the application installed into the MFP 1 or the image processor (partially configuring the control section 10 of the main processor) that handles secondary data. However, the use of the image processor is more efficient since conversion of primary data into secondary data is not needed.

Moreover, a standard for which the displayed contents are rotated at 90 degrees may be any directions (for example, upper right). However, if the contents are rotated at 90 degrees when they are partially displayed on the display panel, the displayed portion is moved outside of the display panel to make it difficult to view. Accordingly, the standard for 90-degree rotation may be set such that the rotation is made with the center of the display portion (window portion) displayed on the LCD 22.

It is noted that operations, such as enlargement, reduction, and scroll, of the file displayed on the display panel may be appropriately carried out.

Furthermore, at the time of using the function of "reference from MFP" or "print from MPF, it is useless to download the file, which cannot be processed. In order to this waste, the extension (identification information) of the file may be checked before downloading the file. If the extension is not registered as a predetermined extension, it is efficient that an error is displayed at this time point.

In this case, every time when the application software is installed, the control section 10 stores the software and the file name extension of the electronic file that the software can process in the HDD 13 to be associated with each other as illustrated in FIG. 36. Then, a file with which no software is associated is not downloaded and an error massage is displayed.

This configuration makes it possible to suppress the useless download.

As explained above, according to the present embodiment, it is possible to select the display of the contents of the document and the print thereof. Also, it is possible to display (reference) the document stored in the document management server 5 by the MFP 1.

The document management server 5 according to the embodiment of present invention can be implemented using a general computer system instead of a dedicated system. For example, the relevant program is installed into a general-purpose computer from a storage medium (flexible disk, CD-ROM, and the like), which stores a program for executing the aforementioned processing, thereby making it possible to configure the document management server 5 that executes the aforementioned processing.

Then, means for supplying these programs is arbitrarily used. As mentioned above, the programs can be supplied by the predetermined storage medium. In addition to this, the programs may be supplied via, for example, a communication line, a communication network, a communication system, and the like. In this case, for example, the relevant program may be provided in such a way that the program is placed on a bulletin board system (BBS) of the communication network and superimposed on a carrier wave via the network. Then, the program thus provided is started and executed in the same way as that of the other application under control of OS, thereby making it possible to execute the aforementioned processing.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2005-160767 filed on May 31, 2005, Japanese Patent Application No. 2005-160772 filed on May 31, 2005, Japanese Patent Application No. 2005-160766 filed on May 31, 2005, Japanese Patent Application No. 2005-160765 filed on May 31, 2005, and Japanese Patent Application No. 2005-160771 filed on May 31, 2005 and including specification, claims, drawings and summary of the above applications. The disclosures of the above Japanese Patent Applications are incorporated herein by reference in their entirety.

What is claimed is:

1. A document management server that stores a plurality of files, comprising:
    a file storing section that stores files;
    a user information storage section that stores, for each of the files, user information defining relations between the file and users who are permitted to operate the file;
    a first setting section which sets first setting information defining that when a user operates a file, a first notification information notifying that the file is operated is transmitted to users excepting the user among users who are permitted to operate the file based on the user information stored in the user information storage section;
    a second setting section which sets second setting information defining a file and a user to whom second notification information notifying that the file is operated is transmitted; and
    a transmitting section that transmits the first and second notification information which indicates that a respective file was operate, based on the first and second setting information when a file is operated,
    wherein the first notification information has the same contents as the second notification information; and
    when a same user exists between users who are to be informed of the first notification information based on the first setting information and a user who is to be informed of the second notification information based on the second setting information, the transmitting section transmits either of the first notification information and the second notification information.

2. The document management server according to claim 1, wherein the user information storage section comprises an address list storage section that stores a basic address list and an edit address list that is edited to an address of a user who has a predetermined relationship with the user from an address of the basic address list,
    the document management server further comprising:
    a receiving section that receives address acquisition request information for requesting acquisition of an address and model information of and from an information terminal connected via a network by user; and a deciding section that decides an address list to be transmitted to the information terminal from the address lists stored in the address list storage section based on the received model information when the receiving section receives the address acquisition request information and the model information, and wherein the transmitting section transmits the address list decided by the deciding section to the information terminal.

3. The document management server according to claim 2, wherein the deciding section decides whether an address list to be transmitted to the information terminal should be a combination of both the basic address list and the edit address list or only the edit address list.

4. The document management server according to claim 2, further comprising:

an address list setting section that sets an address list to be transmitted to the information terminal, and wherein the deciding section decides an address list to be transmitted to the information terminal from the address list stored in the address list storage section based on the model information received by the receiving section and the address setting section.

5. The document management server according to claim 2, wherein the receiving section receives a transmitting file and information for specifying a sender of the file; and wherein the transmitting section further comprises a transmission success or failure determining section that determines whether transmission of the file succeeds and transmits a message, which indicates success or failure of file transmission determined by the transmission success or failure determining section, to the address of the sender specified by the user identification information.

6. The document management server according to claim 2, wherein the user information storage section stores multiple user identification information and notification addresses to be associated with each other; and wherein the transmitting section obtains a notification address corresponding to the user identification information stored in the user information storage section and transmits a message, which indicates success or failure of file transmission determined by the transmission success or failure determining section, to the obtained notification address.

7. The document management server according to claim 2, wherein the receiving section receives address information of a distribution destination, and the document management server further comprising:

a determining section that determines whether the address information of the distribution destination is a predetermined user; and a creating section that creates a mail with link information that allows the specified file to be viewed when the determining section determines that the address information of the distribution destination is a predetermined user, and creates a mail to which the specified file is attached when the determining section determines that the address information of the distribution destination is a non-predetermined user.

8. The document management server according to claim 7, wherein the creating section comprises an acknowledgement information generating section that generates acknowledgement information for receiving a notification of completion of reception of the file;

wherein the transmitting section further comprises an acknowledgement transmitting section that transmits the file, the acknowledgement information generated by the acknowledgement information generating section, and the mail created by the mail creating section to the notification address;

wherein the receiving section receives the acknowledgement information that notifies completion of reception of the file; and wherein the acknowledgement transmitting section transmits a message, which indicates that the file is received at the transmission destination, to the notification address of a user who transmits the acknowledgement information.

9. A document managing method comprising:

a user information storing step of storing user information of a user, who can operate a file;

a first setting step of setting a notification of a file to be sent to a user excepting users, who operate the file, among users stored in the user information storage section when the file is operated;

a second setting step of setting a notification to be sent to a user when a predetermined file is operated by user setting; and a transmitting step of transmitting first and second notification information, which indicates that a respective file is operated, to the users set by the first and second setting steps based on the first and second setting steps when the predetermined file is operated, wherein the first notification has the same contents as the second notification; and when a same user exists between users set by the first setting step and users set by the second setting step, the transmitting step transmits notification information of either of users to the user.

10. A program causing a computer to function as:

a user information storage section that stores user information of a user, who can operate a file;

a first setting section that sets a notification of a file to be sent to a user excepting users, who operate the file, among users stored in the user information storage section when the file is operated;

a second setting section that sets a notification to be sent to a user when a predetermined file is operated by user setting; and a transmitting section that transmits first and second notification information, which indicates that a respective file is operated, to the users set by the first and second setting sections based on the first and second setting sections when the predetermined file is operated, wherein the first notification has the same contents as the second notification; and when a same user exists between users set by the first setting section and a user set by the second setting section, the transmitting section transmits notification information of either of users to the user.

* * * * *